US012760841B2

(12) United States Patent
Thobe

(10) Patent No.: US 12,760,841 B2
(45) **Date of Patent: *Oct. 13, 2026**

(54) SYSTEMS AND METHODS FOR TRANSPORTING FUEL AND CARBON DIOXIDE IN A DUAL FLUID VESSEL

(71) Applicant: MARATHON PETROLEUM COMPANY LP, Findlay, OH (US)

(72) Inventor: Zachary D. Thobe, Findlay, OH (US)

(73) Assignee: Marathon Petroleum Company LP, Findlay, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/978,409

(22) Filed: Dec. 12, 2024

(65) Prior Publication Data

US 2025/0109824 A1 Apr. 3, 2025

Related U.S. Application Data

(60) Continuation of application No. 18/633,116, filed on Apr. 11, 2024, now Pat. No. 12,203,598, which is a (Continued)

(51) Int. Cl.
*F17C 1/12* (2006.01)
*B60P 3/22* (2006.01)
(Continued)

(52) U.S. Cl.
CPC .............. *F17C 1/12* (2013.01); *B60P 3/2245* (2013.01); *B60P 3/225* (2013.01); *B60P 3/243* (2013.01);
(Continued)

(58) Field of Classification Search
CPC .. B60P 3/243; B60P 3/2245; F17C 2221/013; F17C 2203/0629; F17C 2201/018; F17C 1/12
See application file for complete search history.

(56) References Cited

U.S. PATENT DOCUMENTS 2,447,741 A 8/1948 Baufre
2,626,627 A 1/1953 Jung et al.
(Continued)

FOREIGN PATENT DOCUMENTS

AU 2010241217 11/2010
AU 2013202839 5/2014
(Continued)

OTHER PUBLICATIONS

Alexandrakis et al., “Marine Transportation for Carbon Capture and Sequestration (CCS)”, Department of Civil and Environmental Engineering, Thesis, Massachusetts Institute of Technology, Jun. 2010.
(Continued)

*Primary Examiner* — Jason K Niesz
(74) *Attorney, Agent, or Firm* — Ray Quinney & Nebeker P.C.; Paul N. Taylor

(57) ABSTRACT

Embodiments of systems and methods for transporting fuel and carbon dioxide (CO2) in a dual-fluid vessel thereby minimizing transportation between locations are disclosed. In an embodiment, the dual-fluid vessel has an outer shell with two or more inner compartments, positioned within the outer shell, including a first inner compartment for storing CO2 and a second inner compartment for storing fuel. The dual-fluid vessel may connect or attach to a transportation vehicle to thereby allow transportation of the fuel and CO2. Insulation may provide temperature regulation for the fuel and CO2 when positioned in the respective first and second inner compartments. One or more ports having an opening in and through the outer shell and a fluid pathway to one or more of the first inner compartment or the second inner compartment may provide fluid communication through the opening and fluid pathway for loading/offloading the fuel and/or CO2.

20 Claims, 24 Drawing Sheets

Related U.S. Application Data continuation of application No. 18/227,472, filed on Jul. 28, 2023, now Pat. No. 12,000,538, which is a continuation of application No. 18/129,926, filed on Apr. 3, 2023, now Pat. No. 11,774,042, which is a division of application No. 18/082,656, filed on Dec. 16, 2022, now Pat. No. 11,655,940, which is a continuation-in-part of application No. 17/739,488, filed on May 9, 2022, now Pat. No. 11,578,836, and a continuation-in-part of application No. 17/652,530, filed on Feb. 25, 2022, now Pat. No. 11,578,638, said application No. 17/739,488 is a continuation-in-part of application No. 17/652,530, filed on Feb. 25, 2022, now Pat. No. 11,578,638.

(60) Provisional application No. 63/377,822, filed on Sep. 30, 2022, provisional application No. 63/267,567, filed on Feb. 4, 2022, provisional application No. 63/265,554, filed on Dec. 16, 2021, provisional application No. 63/200,581, filed on Mar. 16, 2021.

(51) Int. Cl.
*B60P 3/24* (2006.01)
*F17C 5/00* (2006.01)
*F17C 7/02* (2006.01)

(52) U.S. Cl.
CPC ................ *F17C 5/002* (2013.01); *F17C 7/02* (2013.01); *F17C 2201/018* (2013.01); *F17C 2203/0333* (2013.01); *F17C 2203/0629* (2013.01); *F17C 2205/0326* (2013.01); *F17C 2205/0338* (2013.01); *F17C 2221/012* (2013.01); *F17C 2221/013* (2013.01); *F17C 2221/033* (2013.01); *F17C 2227/0135* (2013.01); *F17C 2227/0355* (2013.01); *F17C 2250/03* (2013.01); *F17C 2250/043* (2013.01); *F17C 2250/0439* (2013.01); *F17C 2250/0443* (2013.01); *F17C 2270/0102* (2013.01); *F17C 2270/0171* (2013.01); *F17C 2270/0173* (2013.01)

(56) References Cited

U.S. PATENT DOCUMENTS 2,864,252 A 12/1958 Schaschl
3,087,311 A * 4/1963 Rousseau ................. F17C 3/08 62/47.1
3,303,525 A 2/1967 Peoples
3,398,071 A 8/1968 Bagno
3,504,686 A 4/1970 Cooper et al.
3,593,555 A 7/1971 Grosko
3,608,869 A 9/1971 Woodle
3,670,468 A 6/1972 Cordell
3,672,180 A 6/1972 Davis
3,725,669 A 4/1973 Tatum
3,807,433 A 4/1974 Byrd
3,809,113 A 5/1974 Grove
3,814,148 A 6/1974 Wostl
3,925,592 A 12/1975 Webb
3,961,493 A 6/1976 Nolan, Jr.
4,010,779 A 3/1977 Pollock et al.
4,073,303 A 2/1978 Foley, Jr.
4,109,677 A 8/1978 Burnside
4,202,351 A 5/1980 Biche
4,229,064 A 10/1980 Vetter et al.
4,242,533 A 12/1980 Cott
4,289,163 A 9/1981 Pierson
4,294,378 A 10/1981 Rabinovich
4,315,602 A 2/1982 Kubacak
4,320,775 A 3/1982 Stirling et al.
4,357,576 A 11/1982 Hickam et al.
4,420,008 A 12/1983 Shu
4,457,037 A 7/1984 Rylander
4,481,474 A 11/1984 Gerrit
4,488,570 A 12/1984 Jiskoot
4,630,685 A 12/1986 Huck et al.
4,690,587 A 9/1987 Petter
4,744,305 A 5/1988 Lim et al.
4,784,324 A 11/1988 DeWitt
4,788,093 A 11/1988 Murata et al.
4,794,331 A 12/1988 Schweitzer, Jr.
4,848,082 A 7/1989 Takahashi
4,897,226 A 1/1990 Hoyle et al.
4,904,932 A 2/1990 Schweitzer, Jr.
4,964,732 A 10/1990 Cadeo et al.
5,046,705 A 9/1991 Williams
5,050,064 A 9/1991 Mayhew
5,072,380 A 12/1991 Randelman et al.
5,095,977 A 3/1992 Ford
5,129,432 A 7/1992 Dugger
5,191,537 A 3/1993 Edge
5,305,631 A 4/1994 Whited
5,367,882 A 11/1994 Lievens et al.
5,383,243 A 1/1995 Thacker
5,423,607 A 6/1995 Jones
5,469,830 A 11/1995 Gonzalez
5,516,967 A 5/1996 Pandey
5,533,912 A 7/1996 Fillinger
5,562,133 A 10/1996 Mitchell
5,595,709 A 1/1997 Klemp
5,603,360 A 2/1997 Teel
5,627,749 A 5/1997 Waterman et al.
5,628,351 A 5/1997 Ramsey, Jr. et al.
5,660,602 A 8/1997 Collier, Jr.
5,661,623 A 8/1997 McDonald
5,783,916 A 7/1998 Blackburn
5,814,982 A 9/1998 Thompson et al.
5,832,967 A 11/1998 Andersson
5,873,916 A 2/1999 Cemenska et al.
5,887,974 A 3/1999 Pozniak
5,895,347 A 4/1999 Doyle
5,906,648 A 5/1999 Zoratti et al.
5,906,877 A 5/1999 Popper et al.
5,939,166 A 8/1999 Cheng et al.
5,956,587 A 9/1999 Chen
5,956,875 A 9/1999 Aughenbaugh
5,962,774 A 10/1999 Mowry
5,973,593 A 10/1999 Botella
5,993,054 A 11/1999 Tan et al.
6,022,421 A 2/2000 Bath
6,050,844 A 4/2000 Johnson
6,065,903 A 5/2000 Doyle
6,077,340 A 6/2000 Doyle
6,077,418 A 6/2000 Iseri et al.
6,098,601 A 8/2000 Reddy
6,111,021 A 8/2000 Nakahama et al.
6,149,351 A 11/2000 Doyle
6,186,193 B1 2/2001 Phallen et al.
6,220,747 B1 4/2001 Gosselin
6,243,483 B1 6/2001 Petrou et al.
6,328,877 B1 12/2001 Bushman
6,333,374 B1 12/2001 Chen
6,346,813 B1 2/2002 Kleinberg
6,383,237 B1 5/2002 Langer et al.
6,427,384 B1 8/2002 Davis, Jr.
6,478,353 B1 11/2002 Barrozo
6,612,551 B1 9/2003 Roy
6,679,302 B1 1/2004 Mattingly et al.
6,719,921 B2 4/2004 Steinberger et al.
6,799,883 B1 10/2004 Urquhart et al.
6,834,531 B2 12/2004 Rust
6,840,292 B2 1/2005 Hart et al.
6,851,916 B2 2/2005 Schmidt
6,980,647 B1 12/2005 Daugherty et al.
6,987,877 B2 1/2006 Paz-Pujalt et al.
7,032,629 B1 4/2006 Mattingly et al.
7,091,421 B2 8/2006 Kukita et al.
7,121,040 B2 10/2006 Wiese
7,168,464 B2 1/2007 Diggins

(56) References Cited

U.S. PATENT DOCUMENTS

| | | | | |
|---|---|---|---|---|
| 7,186,321 | B2 | 3/2007 | Benham | |
| 7,255,136 | B2 | 8/2007 | Templet et al. | |
| 7,258,710 | B2 | 8/2007 | Caro et al. | |
| 7,275,366 | B2 | 10/2007 | Powell et al. | |
| 7,294,913 | B2 | 11/2007 | Fischer et al. | |
| 7,385,681 | B2 | 6/2008 | Ninomiya et al. | |
| 7,444,996 | B2 | 11/2008 | Potier | |
| 7,459,067 | B2 | 12/2008 | Dunn et al. | |
| 7,564,540 | B2 | 7/2009 | Paulson | |
| 7,631,671 | B2 | 12/2009 | Mattingly et al. | |
| 7,685,943 | B2 | 3/2010 | Caro et al. | |
| 7,729,561 | B1 | 6/2010 | Boland et al. | |
| 7,749,308 | B2 | 7/2010 | McCully | |
| 7,810,988 | B2 | 10/2010 | Kamimura et al. | |
| 7,815,744 | B2 | 10/2010 | Abney et al. | |
| 7,832,338 | B2 | 11/2010 | Caro et al. | |
| 7,879,204 | B2 | 2/2011 | Funahashi | |
| 8,075,651 | B2 | 12/2011 | Caro et al. | |
| 8,113,473 | B2 | 2/2012 | Bradley | |
| 8,122,659 | B2 | 2/2012 | Davidson | |
| 8,282,265 | B2 | 10/2012 | Breithhaupt | |
| 8,299,811 | B2 | 10/2012 | Wing | |
| 8,312,584 | B2 | 11/2012 | Hodde | |
| 8,327,631 | B2 | 12/2012 | Caro et al. | |
| 8,368,405 | B2 | 2/2013 | Siebens | |
| 8,376,432 | B1 | 2/2013 | Halger et al. | |
| 8,402,746 | B2 | 3/2013 | Powell et al. | |
| 8,413,484 | B2 | 4/2013 | Lubkowitz | |
| 8,414,781 | B2 | 4/2013 | Berard | |
| 8,577,518 | B2 | 11/2013 | Linden et al. | |
| 8,597,380 | B2 | 12/2013 | Buchanan | |
| 8,616,760 | B2 | 12/2013 | Williams et al. | |
| 8,632,359 | B2 | 1/2014 | Grimm | |
| 8,647,162 | B2 | 2/2014 | Henriksson et al. | |
| 8,748,677 | B2 | 6/2014 | Buchanan | |
| 8,808,415 | B2 | 8/2014 | Caro et al. | |
| 8,912,924 | B2 | 12/2014 | Scofield et al. | |
| 8,979,982 | B2 | 3/2015 | Jordan et al. | |
| 9,038,855 | B2 | 5/2015 | Lurcott et al. | |
| 9,089,806 | B2 | 7/2015 | Powell et al. | |
| 9,162,944 | B2 | 10/2015 | Bennett et al. | |
| 9,175,235 | B2 | 11/2015 | Kastner | |
| 9,222,480 | B2 | 12/2015 | Younes et al. | |
| 9,310,016 | B2 | 4/2016 | Hodde | |
| 9,329,066 | B2 | 5/2016 | Skarping | |
| 9,363,462 | B2 | 6/2016 | Yoel | |
| 9,388,350 | B2 | 7/2016 | Buchanan | |
| 9,497,956 | B2 | 11/2016 | Dubose | |
| 9,518,693 | B2 | 12/2016 | Hodde | |
| 9,530,121 | B2 | 12/2016 | Brauer et al. | |
| 9,550,247 | B2 | 1/2017 | Smith | |
| 9,643,135 | B1 | 5/2017 | Mazzei et al. | |
| 9,945,333 | B2 | 4/2018 | Kopinsky | |
| 10,001,240 | B1 | 6/2018 | Dray et al. | |
| 10,012,340 | B1 | 7/2018 | Dray et al. | |
| 10,024,768 | B1 | 7/2018 | Johnsen | |
| 10,094,508 | B1 | 10/2018 | Dray et al. | |
| 10,132,220 | B2 | 11/2018 | Tonsich | |
| 10,134,042 | B1 | 11/2018 | Prasad et al. | |
| 10,168,255 | B1 | 1/2019 | Johnsen | |
| 10,196,243 | B1 | 2/2019 | Wells | |
| 10,197,206 | B1 | 2/2019 | Dray et al. | |
| 10,223,596 | B1 | 3/2019 | Edwards et al. | |
| 10,247,643 | B1 | 4/2019 | Johnsen | |
| 10,261,279 | B1 | 4/2019 | Potter | |
| 10,287,940 | B2 | 5/2019 | Tonsich | |
| 10,288,062 | B2 | 5/2019 | Nagura et al. | |
| 10,345,221 | B1 | 7/2019 | Silverman | |
| 10,364,718 | B2 | 7/2019 | Eddaoudi et al. | |
| 10,386,260 | B2 | 8/2019 | Dudek | |
| 10,405,475 | B2 | 9/2019 | Goda | |
| 10,408,377 | B1 | 9/2019 | Dray et al. | |
| 10,422,260 | B2 | 9/2019 | Tonsich | |
| 10,486,946 | B1 | 11/2019 | Wells | |
| 10,501,385 | B1 | 12/2019 | Buckner et al. | |
| 10,513,957 | B2 | 12/2019 | Sharp | |
| 10,550,748 | B2 | 2/2020 | Sharp | |
| 10,563,555 | B2 | 2/2020 | Hamad | |
| 10,570,581 | B2 | 2/2020 | Faivre | |
| 10,605,144 | B2 | 3/2020 | Kobayashi | |
| 10,619,539 | B2 | 4/2020 | Tonsich | |
| 10,633,830 | B2 | 4/2020 | Shibamori | |
| 10,655,774 | B1 | 5/2020 | Dray et al. | |
| 10,657,443 | B2 | 5/2020 | Araujo et al. | |
| 10,688,686 | B2 | 6/2020 | Fadhel et al. | |
| 10,756,459 | B2 | 8/2020 | Jongsma | |
| 10,833,434 | B1 | 11/2020 | Tassell, Jr. | |
| 10,883,483 | B2 | 1/2021 | Chalk | |
| 10,900,399 | B2 | 1/2021 | Tonsich | |
| 10,943,357 | B2 | 3/2021 | Badawy et al. | |
| 10,948,471 | B1 | 3/2021 | MacMullin et al. | |
| 10,953,960 | B1 | 3/2021 | Sharp | |
| 10,960,958 | B2 | 3/2021 | Sharp | |
| 10,962,437 | B1 | 3/2021 | Nottrott et al. | |
| 10,970,927 | B2 | 4/2021 | Sharp | |
| 10,990,114 | B1 | 4/2021 | Miller | |
| 10,997,707 | B1 | 5/2021 | Katz et al. | |
| 11,010,608 | B2 | 5/2021 | Adam et al. | |
| 11,027,304 | B2 | 6/2021 | Donaldson | |
| 11,066,971 | B1 | 7/2021 | Sharp | |
| 11,112,308 | B2 | 9/2021 | Kreitinger et al. | |
| 11,125,391 | B2 | 9/2021 | Al Khowaiter et al. | |
| 11,132,008 | B2 | 9/2021 | Miller | |
| 11,164,406 | B2 | 11/2021 | Meroux et al. | |
| 11,215,095 | B2 | 1/2022 | Tonsich | |
| 11,221,107 | B2 | 1/2022 | Du et al. | |
| 11,247,184 | B2 | 2/2022 | Miller | |
| 11,320,519 | B2 | 5/2022 | Koivuranta | |
| 11,325,687 | B1 | 5/2022 | Sharp | |
| 11,332,070 | B2 | 5/2022 | Holden et al. | |
| 11,345,455 | B2 | 5/2022 | Sharp | |
| 11,371,405 | B2 | 6/2022 | Sharp | |
| 11,416,012 | B2 | 8/2022 | Miller | |
| 11,428,600 | B2 | 8/2022 | Dankers et al. | |
| 11,428,622 | B2 | 8/2022 | Borin et al. | |
| 11,441,088 | B2 | 9/2022 | Robbins | |
| 11,447,877 | B1 | 9/2022 | Ell | |
| 11,559,774 | B2 | 1/2023 | Miller | |
| 11,565,221 | B2 | 1/2023 | Miller | |
| 11,578,631 | B2 | 2/2023 | Tonsich | |
| 11,578,638 | B2 | 2/2023 | Thobe | |
| 11,578,836 | B2 | 2/2023 | Thobe | |
| 11,596,910 | B2 | 3/2023 | Miller | |
| 11,607,654 | B2 | 3/2023 | Miller | |
| 11,655,748 | B1 | 5/2023 | Thobe | |
| 11,655,940 | B2 | 5/2023 | Thobe | |
| 11,662,750 | B2 | 5/2023 | Miller | |
| 11,686,070 | B1 | 6/2023 | Jordan et al. | |
| 11,687,858 | B2 | 6/2023 | Rentz | |
| 11,715,950 | B2 | 8/2023 | Miller et al. | |
| 11,720,526 | B2 | 8/2023 | Miller et al. | |
| 11,739,679 | B2 | 8/2023 | Thobe | |
| 11,746,552 | B2 | 9/2023 | Murrin et al. | |
| 11,752,472 | B2 | 9/2023 | Miller | |
| 11,754,225 | B2 | 9/2023 | Thobe | |
| 11,761,366 | B2 | 9/2023 | Thobe | |
| 11,774,042 | B2 * | 10/2023 | Thobe | B67D 7/048 141/220 |
| 11,788,541 | B2 | 10/2023 | Kvachnev | |
| 11,789,453 | B2 | 10/2023 | Chowdhary | |
| 11,794,153 | B2 | 10/2023 | Miller | |
| 11,807,945 | B2 | 11/2023 | Ell | |
| 11,808,013 | B1 | 11/2023 | Jordan et al. | |
| 11,815,227 | B2 | 11/2023 | Thobe | |
| 11,842,538 | B2 | 12/2023 | Saxena | |
| 11,920,504 | B2 | 3/2024 | Thobe | |
| 11,965,317 | B2 | 4/2024 | Jordan | |
| 11,987,336 | B2 | 5/2024 | Sharp | |
| 11,988,336 | B2 | 5/2024 | Thobe | |
| 12,000,538 | B2 * | 6/2024 | Thobe | B60P 3/225 |
| 12,006,014 | B1 | 6/2024 | Ernst | |
| 12,011,697 | B2 | 6/2024 | Miller | |
| 12,012,082 | B1 | 6/2024 | Pittman, Jr. | |
| 12,012,883 | B2 | 6/2024 | Thobe | |

(56) References Cited

U.S. PATENT DOCUMENTS 12,043,361 B1 7/2024 Ernst
12,043,905 B2 7/2024 Ell
12,043,906 B2 7/2024 Ell
12,066,843 B2 8/2024 Miller
12,071,205 B2 8/2024 Sharp
12,087,002 B1 9/2024 Miller et al.
12,109,543 B2 10/2024 Miller
12,128,369 B2 10/2024 Miler
12,129,559 B2 10/2024 Ell
12,163,625 B2 12/2024 Thobe
12,180,597 B2 12/2024 Ell
12,203,598 B2 * 1/2025 Thobe .................. B60P 3/2245
2001/0013517 A1 8/2001 Hart
2002/0014068 A1 2/2002 Mittricker et al.
2002/0178806 A1 12/2002 Valentine
2002/0185180 A1 12/2002 Smith
2003/0041518 A1 3/2003 Wallace et al.
2003/0121481 A1 7/2003 Dodd et al.
2003/0158630 A1 8/2003 Pham et al.
2003/0167660 A1 9/2003 Kondou
2003/0178994 A1 9/2003 Hurlimann et al.
2003/0188536 A1 10/2003 Mittricker
2003/0197622 A1 10/2003 Reynard et al.
2003/0227821 A1 12/2003 Bae et al.
2004/0057334 A1 3/2004 Wilmer et al.
2004/0058597 A1 3/2004 Matsuda
2004/0067126 A1 4/2004 Schmidt
2004/0125688 A1 7/2004 Kelley et al.
2004/0249105 A1 12/2004 Nolte et al.
2004/0251313 A1 12/2004 Burgess
2004/0265653 A1 12/2004 Buechi et al.
2005/0007450 A1 1/2005 Hill et al.
2005/0058016 A1 3/2005 Smith et al.
2005/0146437 A1 7/2005 Ward
2005/0150820 A1 7/2005 Guo
2005/0154132 A1 7/2005 Hakuta et al.
2005/0176482 A1 8/2005 Raisinghani et al.
2005/0284333 A1 12/2005 Falkiewicz
2006/0125826 A1 6/2006 Lubkowitz
2006/0263283 A1 11/2006 Egan
2006/0278304 A1 12/2006 Mattingly et al.
2007/0175511 A1 8/2007 Doerr
2007/0181083 A1 8/2007 Fulton
2008/0012236 A1 1/2008 Reilly
2008/0092625 A1 4/2008 Hinnrichs
2008/0113884 A1 5/2008 Campbell et al.
2008/0115834 A1 5/2008 Geoffrion et al.
2008/0149481 A1 6/2008 Hurt
2008/0283083 A1 11/2008 Piao
2009/0009308 A1 1/2009 Date et al.
2009/0107111 A1 4/2009 Oliver
2009/0154288 A1 6/2009 Heathman
2009/0175738 A1 7/2009 Shaimi
2009/0183498 A1 7/2009 Uchida et al.
2009/0188565 A1 7/2009 Satake
2009/0197489 A1 8/2009 Caro
2009/0278839 A1 11/2009 Geis
2010/0031825 A1 2/2010 Kemp
2010/0049410 A1 2/2010 McKee
2010/0058666 A1 3/2010 Kim
2010/0175316 A1 7/2010 Kubacak
2010/0198775 A1 8/2010 Rousselle
2011/0265449 A1 11/2011 Powell
2012/0027298 A1 2/2012 Dow
2012/0092835 A1 4/2012 Miller
2012/0143560 A1 6/2012 Tabet et al.
2012/0153042 A1 6/2012 Oedekoven
2012/0185220 A1 7/2012 Shippen
2012/0276379 A1 11/2012 Daniels et al.
2012/0304625 A1 12/2012 Daikoku
2013/0035824 A1 2/2013 Nakamura
2013/0048094 A1 2/2013 Ballantyne
2013/0062258 A1 3/2013 Ophus
2013/0125323 A1 5/2013 Henderson
2013/0176656 A1 7/2013 Kaisser
2013/0186671 A1 7/2013 Theis
2013/0201025 A1 8/2013 Kamalakannan et al.
2013/0245524 A1 9/2013 Schofield
2013/0293884 A1 11/2013 Lee et al.
2013/0299500 A1 11/2013 McKinnon
2013/0317959 A1 11/2013 Joos
2014/0002639 A1 1/2014 Cheben et al.
2014/0008926 A1 1/2014 Allen
2014/0062490 A1 3/2014 Neuman et al.
2014/0090379 A1 4/2014 Powell et al.
2014/0121622 A1 5/2014 Jackson et al.
2014/0133824 A1 5/2014 Yoel
2014/0158616 A1 6/2014 Govind et al.
2014/0158632 A1 6/2014 Govind et al.
2014/0171538 A1 6/2014 Daniels et al.
2014/0172513 A1 6/2014 MacLean
2014/0176344 A1 6/2014 Littlestar
2014/0190691 A1 7/2014 Vinegar
2014/0194657 A1 7/2014 Wadhwa et al.
2014/0299039 A1 10/2014 Trollux
2014/0345370 A1 11/2014 Marotta
2014/0356707 A1 12/2014 Kwon et al.
2015/0081165 A1 3/2015 Yamashita et al.
2015/0144468 A1 5/2015 Skolozdra
2015/0183102 A1 7/2015 Breschi et al.
2015/0198518 A1 7/2015 Borin et al.
2015/0244087 A1 8/2015 Wing
2015/0269288 A1 9/2015 Moore
2015/0323119 A1 11/2015 Giunta
2016/0071059 A1 3/2016 Petering
2016/0091467 A1 3/2016 Morris
2016/0139355 A1 5/2016 Petersen
2016/0169098 A1 6/2016 Makita
2016/0169436 A1 6/2016 Sander et al.
2016/0175634 A1 6/2016 Radian
2016/0238194 A1 * 8/2016 Adler ........................ F17C 5/00
2016/0252650 A1 9/2016 Hirst, Sr.
2016/0363249 A1 12/2016 Disher
2016/0369930 A1 12/2016 Poe et al.
2017/0051472 A1 2/2017 Mochimaru
2017/0088401 A1 3/2017 Clements et al.
2017/0122174 A1 5/2017 Patel
2017/0131728 A1 5/2017 Lambert et al.
2017/0140237 A1 5/2017 Voeller et al.
2017/0158303 A1 6/2017 Michaelis et al.
2017/0180012 A1 6/2017 Tingler et al.
2017/0248569 A1 8/2017 Lambert et al.
2017/0253737 A1 9/2017 Auld et al.
2017/0253738 A1 9/2017 Auld et al.
2017/0253806 A1 9/2017 Auld et al.
2017/0254481 A1 9/2017 Cadogan et al.
2017/0259229 A1 9/2017 Chou et al.
2017/0306428 A1 10/2017 Helgason et al.
2017/0326474 A1 11/2017 Olovsson
2017/0367346 A1 12/2017 Rees et al.
2018/0002617 A1 1/2018 Umansky et al.
2018/0003116 A1 1/2018 Fersman et al.
2018/0037452 A1 2/2018 Gray et al.
2018/0080356 A1 3/2018 Fukui
2018/0098137 A1 4/2018 Saha
2018/0119882 A1 5/2018 Allidieres et al.
2018/0143734 A1 5/2018 Ochenas et al.
2018/0186528 A1 7/2018 Tonn
2018/0218214 A1 8/2018 Pestun
2018/0223202 A1 8/2018 Fransham et al.
2018/0245313 A1 8/2018 Shibamori et al.
2018/0259064 A1 9/2018 McLemore
2018/0312391 A1 11/2018 Borg
2019/0016963 A1 1/2019 Auld et al.
2019/0121373 A1 4/2019 Panigrahi
2019/0136060 A1 5/2019 Helgason et al.
2019/0264592 A1 8/2019 Tonsich
2019/0270500 A1 9/2019 Hamaoka
2019/0295189 A1 9/2019 Strasser
2019/0338203 A1 11/2019 Umansky et al.
2019/0359899 A1 11/2019 Umansky et al.
2019/0362147 A1 11/2019 Adam
2019/0367732 A1 12/2019 Helgason et al.
2019/0368054 A1 12/2019 Gummow et al.

(56) References Cited

U.S. PATENT DOCUMENTS

| | | | |
|---|---|---|---|
| 2019/0368156 | A1 | 12/2019 | Faivre |
| 2020/0033252 | A1 | 1/2020 | Borin et al. |
| 2020/0118413 | A1 | 4/2020 | Kanukurthy et al. |
| 2020/0232191 | A1 | 7/2020 | Prior |
| 2020/0235559 | A1 | 7/2020 | Neuenschwander |
| 2020/0240302 | A1 | 7/2020 | Tonsich |
| 2020/0240588 | A1 | 7/2020 | Al Khowaiter |
| 2020/0245551 | A1 | 8/2020 | Hoffman et al. |
| 2020/0245552 | A1 | 8/2020 | Hoffman et al. |
| 2020/0245553 | A1 | 8/2020 | Hoffman et al. |
| 2020/0292445 | A1 | 9/2020 | Morimoto |
| 2020/0325742 | A1 | 10/2020 | Astudillo et al. |
| 2021/0053011 | A1 | 2/2021 | Sugiyama et al. |
| 2021/0062697 | A1 | 3/2021 | Yokoyama et al. |
| 2021/0073692 | A1 | 3/2021 | Saha et al. |
| 2021/0076006 | A1 | 3/2021 | O'Neill et al. |
| 2021/0095380 | A1 | 4/2021 | Borin et al. |
| 2021/0123211 | A1 | 4/2021 | Miller et al. |
| 2021/0138399 | A1 | 5/2021 | Yokoyama et al. |
| 2021/0192938 | A1 | 6/2021 | Doerr et al. |
| 2021/0197151 | A1 | 7/2021 | Miller |
| 2021/0207772 | A1 | 7/2021 | Norton et al. |
| 2021/0215925 | A1 | 7/2021 | Kim et al. |
| 2021/0216852 | A1 | 7/2021 | Reece et al. |
| 2021/0232163 | A1 | 7/2021 | Miller |
| 2021/0232741 | A1 | 7/2021 | Ogiso et al. |
| 2021/0348281 | A1 | 11/2021 | da Costa |
| 2021/0362637 | A1 | 11/2021 | Hanis et al. |
| 2021/0381920 | A1 | 12/2021 | Jacobsz et al. |
| 2022/0001969 | A1 | 1/2022 | Pugnetti |
| 2022/0010707 | A1 | 1/2022 | Sharma et al. |
| 2022/0048606 | A1 | 2/2022 | Singh |
| 2022/0081261 | A1 | 3/2022 | Karbassi |
| 2022/0087099 | A1 | 3/2022 | Hoffman et al. |
| 2022/0154427 | A1 | 5/2022 | Misaki |
| 2022/0178114 | A1 | 6/2022 | Takahama |
| 2022/0183208 | A1 | 6/2022 | Sibley |
| 2022/0186470 | A1 | 6/2022 | Chiba et al. |
| 2022/0213603 | A1 | 7/2022 | Al Eid et al. |
| 2022/0221368 | A1 | 7/2022 | Bergeron |
| 2022/0228345 | A1 | 7/2022 | Case et al. |
| 2022/0266196 | A1 | 8/2022 | Sharp |
| 2022/0282651 | A1 | 9/2022 | Reynolds et al. |
| 2022/0290411 | A1 | 9/2022 | Anahara et al. |
| 2022/0343229 | A1 | 10/2022 | Gruber et al. |
| 2022/0401899 | A1 | 12/2022 | Miller |
| 2022/0404272 | A1 | 12/2022 | Kendall et al. |
| 2022/0405870 | A1 | 12/2022 | Conway |
| 2023/0012038 | A1 | 1/2023 | Iyer |
| 2023/0012673 | A1 | 1/2023 | Fukuyama et al. |
| 2023/0015077 | A1 | 1/2023 | Kim |
| 2023/0061824 | A1 | 3/2023 | Ell |
| 2023/0078852 | A1 | 3/2023 | Campbell et al. |
| 2023/0129513 | A1 | 4/2023 | Miller |
| 2023/0259080 | A1 | 8/2023 | Whikehart et al. |
| 2023/0259088 | A1 | 8/2023 | Borup et al. |
| 2023/0332532 | A1 | 10/2023 | Thobe |
| 2023/0333577 | A1 | 10/2023 | Miller |
| 2023/0333578 | A1 | 10/2023 | Miller |
| 2023/0338897 | A1 | 10/2023 | Bednar |
| 2023/0341092 | A1 | 10/2023 | Thobe |
| 2023/0347303 | A1 | 11/2023 | Miller |
| 2023/0358023 | A1 | 11/2023 | Jordan et al. |
| 2023/0360151 | A1 | 11/2023 | Swamy |
| 2023/0366510 | A1 | 11/2023 | Thobe |
| 2023/0383416 | A1 | 11/2023 | Ell |
| 2023/0383417 | A1 | 11/2023 | Ell |
| 2023/0383418 | A1 | 11/2023 | Ell |
| 2023/0392536 | A1 | 12/2023 | Thobe |
| 2023/0398473 | A1 | 12/2023 | Tonsich |
| 2023/0399817 | A1 | 12/2023 | Jordan |
| 2023/0399818 | A1 | 12/2023 | Jordan |
| 2023/0407488 | A1 | 12/2023 | Ell |
| 2023/0415106 | A1 | 12/2023 | Miller |
| 2024/0003016 | A1 | 1/2024 | Ell |
| 2024/0060189 | A1 | 2/2024 | Ell |
| 2024/0071073 | A1 | 2/2024 | Rajora |
| 2024/0141506 | A1 | 5/2024 | Ell |
| 2024/0166492 | A1 | 5/2024 | Thobe |
| 2024/0209988 | A1 | 6/2024 | Thobe |
| 2024/0217498 | A1 | 7/2024 | Pittman, Jr. |
| 2024/0255102 | A1 | 8/2024 | Thobe |
| 2024/0269626 | A1 | 8/2024 | Miller |
| 2024/0271556 | A1 | 8/2024 | Thobe |
| 2024/0278762 | A1 | 8/2024 | Pittman, Jr. |
| 2024/0278894 | A1 | 8/2024 | Ernst |
| 2024/0286726 | A1 | 8/2024 | Ernst |
| 2024/0301811 | A1 | 9/2024 | Thobe |
| 2024/0327992 | A1 | 10/2024 | Ell |
| 2024/0327993 | A1 | 10/2024 | Ell |
| 2024/0367762 | A1 | 11/2024 | Sharp |

FOREIGN PATENT DOCUMENTS

| | | | |
|---|---|---|---|
| AU | 2009202785 | B | 11/2014 |
| CA | 2447358 | | 4/2005 |
| CA | 2702151 | | 10/2007 |
| CA | 2637421 | | 1/2010 |
| CA | 2642295 | | 1/2010 |
| CA | 2736733 | | 10/2011 |
| CA | 2958443 | | 4/2017 |
| CA | 2995532 | | 4/2017 |
| CA | 2916141 | | 6/2017 |
| CN | 2092562 | | 1/1992 |
| CN | 200958686 | | 10/2007 |
| CN | 100348970 | | 11/2007 |
| CN | 102997052 | | 3/2013 |
| CN | 202898548 | U | 4/2013 |
| CN | 103106764 | | 5/2013 |
| CN | 103497804 | | 1/2014 |
| CN | 102997061 | | 5/2015 |
| CN | 204824775 | | 12/2015 |
| CN | 205640252 | | 10/2016 |
| CN | 104372350 | B | 2/2017 |
| CN | 106764463 | | 1/2019 |
| CN | 208306600 | | 1/2019 |
| CN | 110513604 | | 11/2019 |
| CN | 210176958 | | 3/2020 |
| CN | 111537157 | | 8/2020 |
| CN | 114001278 | | 2/2022 |
| CN | 113719746 | | 11/2022 |
| CN | 115325460 | A | 11/2022 |
| CN | 114877263 | | 4/2023 |
| CN | 220458389 | U | 2/2024 |
| DE | 3001364 | | 7/1981 |
| EP | 2458573 | | 5/2012 |
| EP | 2586304 | A1 | 5/2013 |
| EP | 2602609 | | 6/2013 |
| EP | 3076461 | | 10/2016 |
| EP | 3101411 | | 12/2016 |
| EP | 3112011 | | 1/2017 |
| EP | 2994626 | | 1/2018 |
| EP | 3285759 | | 2/2018 |
| ES | 2398302 | | 3/2013 |
| FR | 2388762 | | 11/1978 |
| FR | 2689241 | | 10/1993 |
| GB | 123654 | | 3/1919 |
| GB | 1179978 | | 2/1970 |
| GB | 1585439 | | 3/1981 |
| GB | 2097687 | | 11/1982 |
| GB | 2545207 | | 6/2017 |
| GB | 2559149 | | 4/2022 |
| IN | 202141001384 | | 1/2021 |
| IT | 201900008235 | | 12/2020 |
| JP | 4209998 | | 7/1992 |
| JP | 2004125039 | | 4/2004 |
| JP | 2007204023 | | 8/2007 |
| JP | 2008097832 | | 4/2008 |
| JP | 2009209905 | | 9/2009 |
| JP | 2012002159 | | 11/2014 |
| JP | 2016078893 | | 5/2016 |
| JP | 2021030945 | A | 3/2021 |
| KR | 20110010316 | | 2/2011 |
| KR | 20130038986 | | 4/2013 |

(56) References Cited

FOREIGN PATENT DOCUMENTS

| | | | |
|---|---|---|---|
| KR | 20200007444 | A | 1/2020 |
| KR | 102129951 | | 7/2020 |
| KR | 102169280 | | 10/2020 |
| KR | 102281640 | | 7/2021 |
| RU | 2760879 | | 12/2021 |
| RU | 217534 | U1 | 4/2023 |
| WO | 1996006685 | | 5/1996 |
| WO | 1997006004 | | 2/1997 |
| WO | 1997006298 | | 2/1997 |
| WO | 1998003711 | | 1/1998 |
| WO | 199917606 | | 4/1999 |
| WO | 2000063108 | | 10/2000 |
| WO | 2002030551 | | 4/2002 |
| WO | 2002082181 | | 10/2002 |
| WO | 2003003002 | | 1/2003 |
| WO | 2003066423 | | 8/2003 |
| WO | 2004003293 | | 1/2004 |
| WO | 2004092307 | | 10/2004 |
| WO | 2005018300 | | 3/2005 |
| WO | 2007107652 | | 9/2007 |
| WO | 2007112335 | | 10/2007 |
| WO | 2007149851 | | 12/2007 |
| WO | 2009013544 | | 1/2009 |
| WO | 2009055024 | | 4/2009 |
| WO | 2010002274 | | 1/2010 |
| WO | 2010042704 | | 4/2010 |
| WO | 2010103260 | | 9/2010 |
| WO | 2011127535 | | 10/2011 |
| WO | 2013112274 | | 8/2013 |
| WO | 2014089443 | | 6/2014 |
| WO | 2014173672 | | 10/2014 |
| WO | 2015061868 | | 5/2015 |
| WO | 2015153607 | | 10/2015 |
| WO | 2016004107 | | 1/2016 |
| WO | 2016026043 | | 2/2016 |
| WO | 2016146404 | | 9/2016 |
| WO | 2017074985 | | 5/2017 |
| WO | 2017083778 | | 5/2017 |
| WO | 2017087731 | | 5/2017 |
| WO | 2017152269 | | 9/2017 |
| WO | 2018005141 | | 1/2018 |
| WO | 2018/031520 | | 2/2018 |
| WO | 2018102378 | | 6/2018 |
| WO | 2019/226348 | | 5/2019 |
| WO | 2020044026 | | 3/2020 |
| WO | 2020118020 | | 6/2020 |
| WO | 2020132632 | | 6/2020 |
| WO | 2020223803 | | 11/2020 |
| WO | 2020237112 | | 11/2020 |
| WO | 2021062563 | | 4/2021 |
| WO | 2021100054 | | 5/2021 |
| WO | 2022043197 | | 3/2022 |
| WO | 2022126092 | | 6/2022 |
| WO | 2022149501 | | 7/2022 |
| WO | 2022269052 | | 12/2022 |
| WO | 2023287276 | | 1/2023 |
| WO | 2023021769 | | 2/2023 |
| WO | 2023038579 | | 3/2023 |
| WO | 2023060350 | | 4/2023 |
| WO | 2023137304 | | 7/2023 |
| WO | 2023164683 | | 8/2023 |
| ZA | 9606765 | | 2/1998 |
| ZA | 200610366 | | 1/2008 |

OTHER PUBLICATIONS

Datta et al., "Advancing carbon management through the global commoditization of CO2: the case for dual-use LNG-CO2 shipping", Carbon Management, 2020, vol. 11, No. 6, 611-630.
Ibitoye et al., "Poster Abstract: A Convolutional Neural Network Based Solution for Pipeline Leak Detection", School of Information Technology, Carleton University, Ottawa, Canada, Nov. 2019.
Intelliview, "Thermal Imaging Provides Early Leak Detection in Oil and Gas Pipelines", Petro Industry News, www.Petro-Online.com, Aug./Sep. 2018.
Southwest Research Institute, "Methane Leak Detection", 2021.
Masterduct, "Case Studies: High temp marine grade ship engine exhaust fume hose", retrieved at https://www.masterduct.com/CaseStudies/Hightempshipengineexhaustfumehose.aspx.
ACTI, "Advanced Maritime Emissions Control System (AMECS)", retrieved at https://sustainableworldports.org/wp-content/uploads/presentation-on-AMECS.pdf.
Lloyd's Register, Using technology to trace the carbon intensity of sustainable marine fuels, Feb. 15, 2023.
Borin Manufacturing, Inc., Dart for Test Station, Above Ground Remote Monitoring, Feb. 11, 2021.
Borin Manufacturing, Inc., Commanche Remote Monitoring and Control System, Mar. 24, 2017.
Borin Manufacturing, Inc., Dart for Rectifiers, Remote Monitoring and Control System. Nov. 1, 2017.
Borin Manufacturing, Inc., Stelth 2 Solid-State Reference Electrode for Buried and Concrete Service, Aug. 7, 2015.
Borin Manufacturing, Inc., Stelth 3, Nov. 10, 2016.
Borin Manufacturing, Inc., Stelth Reference Electrodes, Feb. 4, 2016.
Borin Manufacturing, Inc., Stelth Solid-State Reference Electrodes, Nov. 8, 2016.
Borin Manufacturing, Inc., Stelth Reference Electrodes, Oct. 10, 2017.
Borin Manufacturing, Inc., 'Miracle half-cell', Palladium: Borin's new reference electrode chemistry, Aug. 13, 2014.
Borin Manufacturing, Inc., Street Dart, For Test Station, Ground Level Remote Monitoring, Mar. 2017.
International Search Report and Written Opinion for international application No. PCT/US2024/021099 mailed on Aug. 2, 2024.
Neutrik XXR-2 XX Series, https://www.parts-express.com/Neutrik-XXR-2-XX-Series-Color-Coding_Ring-Red, 2022.
Hou, Qingmin, An FBG Strain Sensor-Based NPW Method for Natural Gas Pipeline Leakage Detection, Hindawi, Mathematical Problems in Engineering,vol. 2021, Article ID 5548503, pp. 1-8.
Annex to Form PCT/ISA/206, Communication Relating to the Results of the Partial International Search for international application No. PCT/US2024/021101 mailed Aug. 13, 2024.
Sadovnychiy, Sergiy et al. "Geographical information system applications for pipeline right of way aerial surveillance", International Conference on Geographical Information Systems Theory, Applications and Management, vol. 2, Scitepress, 2017.
Paschal, Kayla, "Utility Right of Way Management: Potential for Expanded Integrated Vegetation Management in California", 2014.
International Search Report and Written Opinion for international application No. PCT/US2024/021101 mailed on Oct. 9, 2024.
Skelton et al., Onboard Refueling Vapor Recovery Systems Analysis of Widespread Use,Nescaum, Boston MA, Aug. 20, 2007.
Membrane Technology and Research, Inc., Gasoline Vapor Recovery, 2018.
Jordan Technologies, Aereon, Recovering More Vapor = Increased Profits, 2015.
EPFL, Capturing CO2 from trucks and reducing their emissions by 90%, Dec. 23, 2019.
Sharma, Shivom et al., Carbon Dioxide Capture from Internal Combustion Engine Exhaust Using Temperature Swing Adsorption, Front. Energy Res., Sec. Carbon Capture, Utilization and Storage, Dec. 16, 2019.
Information Disclosure Declaration by Kyle E. Miller, Dec. 18, 2020.
Cott Manufacturing Company, FinkLet®/FinkPlate® Cathodic Proection Test Stations, Wayback Machine, May 22, 2000.

* cited by examiner

600B

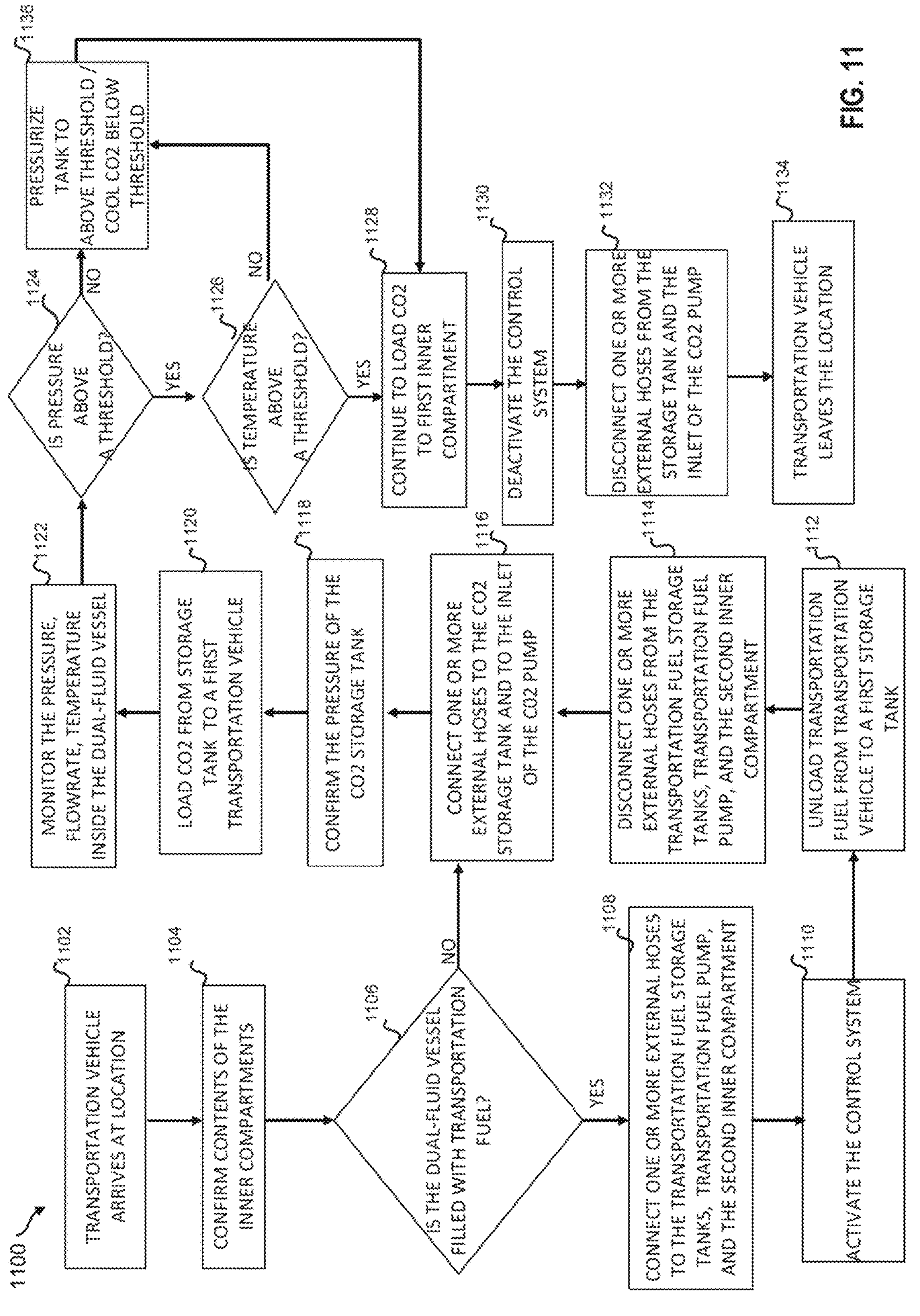
1100
TRANSPORTATION VEHICLE ARRIVES AT LOCATION
1102
CONFIRM CONTENTS OF THE INNER COMPARTMENTS
1104
IS THE DUAL-FLUID VESSEL FILLED WITH TRANSPORTATION FUEL?
1106
YES
NO
CONNECT ONE OR MORE EXTERNAL HOSES TO THE TRANSPORTATION FUEL STORAGE TANKS, TRANSPORTATION FUEL PUMP, AND THE SECOND INNER COMPARTMENT
1108
ACTIVATE THE CONTROL SYSTEM
1110
UNLOAD TRANSPORTATION FUEL FROM TRANSPORTATION VEHICLE TO A FIRST STORAGE TANK
1112
DISCONNECT ONE OR MORE EXTERNAL HOSES FROM THE TRANSPORTATION FUEL STORAGE TANKS, TRANSPORTATION FUEL PUMP, AND THE SECOND INNER COMPARTMENT
1114
CONNECT ONE OR MORE EXTERNAL HOSES TO THE CO2 STORAGE TANK AND TO THE INLET OF THE CO2 PUMP
1116
CONFIRM THE PRESSURE OF THE CO2 STORAGE TANK
1118
LOAD CO2 FROM STORAGE TANK TO A FIRST TRANSPORTATION VEHICLE
1120
MONITOR THE PRESSURE, FLOWRATE, TEMPERATURE INSIDE THE DUAL-FLUID VESSEL
1122
IS PRESSURE ABOVE A THRESHOLD?
1124
YES
NO
PRESSURIZE TANK TO ABOVE THRESHOLD / COOL CO2 BELOW THRESHOLD
1138
IS TEMPERATURE ABOVE A THRESHOLD?
1126
YES
NO
CONTINUE TO LOAD CO2 TO FIRST INNER COMPARTMENT
1128
DEACTIVATE THE CONTROL SYSTEM
1130
DISCONNECT ONE OR MORE EXTERNAL HOSES FROM THE STORAGE TANK AND THE INLET OF THE CO2 PUMP
1132
TRANSPORTATION VEHICLE LEAVES THE LOCATION
1134
FIG. 11

SYSTEMS AND METHODS FOR TRANSPORTING FUEL AND CARBON DIOXIDE IN A DUAL FLUID VESSEL

CROSS-REFERENCE TO RELATED APPLICATION

This application is a continuation of U.S. Non-Provisional application Ser. No. 18/633,116, filed Apr. 11, 2024, titled "SYSTEMS AND METHODS FOR TRANSPORTING FUEL AND CARBON DIOXIDE IN A DUAL FLUID VESSEL," which is a continuation of U.S. Non-Provisional application Ser. No. 18/227,472, filed Jul. 28, 2023, titled "SYSTEMS AND METHODS FOR TRANSPORTING FUEL AND CARBON DIOXIDE IN A DUAL FLUID VESSEL," now U.S. Pat. No. 12,000,538, issued Jun. 4, 2024, which is a continuation of U.S. Non-Provisional application Ser. No. 18/129,926, filed Apr. 3, 2023, titled "SYSTEMS AND METHODS FOR TRANSPORTING FUEL AND CARBON DIOXIDE IN A DUAL FLUID VESSEL," now U.S. Pat. No. 11,774,042, issued Oct. 3, 2023, which is a divisional of U.S. Non-Provisional application Ser. No. 18/082,656, filed Dec. 16, 2022, titled "SYSTEMS AND METHODS FOR TRANSPORTING FUEL AND CARBON DIOXIDE IN A DUAL FLUID VESSEL," now U.S. Pat. No. 11,655,940, issued May 23, 2023, which claims priority to, and the benefit of, U.S. Provisional Application No. 63/265,554, filed Dec. 16, 2021, titled "SYSTEMS AND METHODS FOR TRANSPORTING FUEL AND CO2 IN A DUAL FLUID VESSEL," and U.S. Provisional Application No. 63/377,822, filed Sep. 30, 2022, titled "SYSTEMS AND METHODS FOR TRANSPORTING FUEL AND CO2 IN A DUAL FLUID VESSEL," the disclosures of which are incorporated herein by reference in their entireties.

U.S. Non-Provisional application Ser. No. 18/082,656 is a continuation-in-part of U.S. Non-Provisional application Ser. No. 17/739,488, filed May 9, 2022, titled "SCALABLE GREENHOUSE GAS CAPTURE SYSTEMS AND METHODS," now U.S. Pat. No. 11,578,836, issued Feb. 14, 2023, which is a continuation-in-part of U.S. Non-Provisional application Ser. No. 17/652,530, filed Feb. 25, 2022, titled "SCALABLE GREENHOUSE GAS CAPTURE SYSTEMS AND METHODS," now U.S. Pat. No. 11,578,638, issued Feb. 14, 2023, which claims priority to related to U.S. Provisional Application No. 63/200,581, filed Mar. 16, 2021, titled "SCALABLE GREENHOUSE GAS CAPTURE SYSTEMS AND METHODS," and U.S. Provisional Application No. 63/267,567, filed Feb. 4, 2022, titled "SCALABLE GREENHOUSE GAS CAPTURE SYSTEMS AND METHODS," the disclosures of which are incorporated herein by reference in their entireties.

U.S. Non-Provisional application Ser. No. 18/082,656 is a continuation-in-part of U.S. Non-Provisional application Ser. No. 17/652,530, filed Feb. 25, 2022, titled "SCALABLE GREENHOUSE GAS CAPTURE SYSTEMS AND METHODS," now U.S. Pat. No. 11,578,638, issued Feb. 14, 2023, which claims priority to and the benefit of U.S. Provisional Application No. 63/200,581, filed Mar. 16, 2021, titled "SCALABLE GREENHOUSE GAS CAPTURE SYSTEMS AND METHODS," and U.S. Provisional Application No. 63/267,567, filed Feb. 4, 2022, titled "SCALABLE GREENHOUSE GAS CAPTURE SYSTEMS AND METHODS," the disclosures of which are incorporated herein by reference in their entireties.

FIELD OF INVENTION

The present disclosure relates to systems and methods for backhaul transportation of fuel and carbon dioxide. More specifically, the present disclosure relates to methods and systems for transporting fuel and carbon dioxide using a dual-fluid vessel.

BACKGROUND

Certain gases, such as carbon dioxide, carbon monoxide, nitrogen dioxide, sulfur dioxide, benzene, formaldehyde, polycyclic hydrocarbons, other particulate matter, etc., when released to the atmosphere are purported to adversely contribute to climate change and have been labeled as greenhouse gases. To mitigate perceived climate change or meet private, public, country, state, or global commitments/policies, much worldwide attention and focus has been placed on reducing the release of these greenhouse gases to atmosphere, e.g., as shown via The Paris Agreement. Greenhouse gases, such as carbon dioxide, are directly released to atmosphere through the combustion of fossil fuels, for example, in a vehicle or other vehicles that utilize fossil fuels. Further, atmospheric carbon dioxide may absorb heat that could otherwise be directed to space. The residence time of atmospheric carbon dioxide paired with accumulation may be cause for global focus.

Currently, the majority of motorist vehicles sold and in use are internal combustion engine motorist vehicles. Further, internal combustion engine motorist vehicles are affordable and widely available. Further still, the majority of fueling infrastructure within the United States, as well as globally, is constructed to support or provide fuel to internal combustion engine motorist vehicles. While other motorist vehicle options exist, such as fuel cell or electric based motorist vehicles, such options are costly and currently lack range and the extensive infrastructure typically associated with internal combustion engine motorist vehicles.

To offset greenhouse gas emissions produced by motorist vehicles or other vehicles, a user may purchase an alternative fuel vehicle (e.g., fuel cell or battery electric vehicles). However, manufacturing such vehicles produces some level of greenhouse gases and, as noted, may not be affordable or widely available. Further, both manufacturing of electric vehicles and components, as well as the production of the electricity to charge electric vehicles may produce some level of greenhouse gases. Additionally, the raw materials (e.g., lithium, nickel, manganese, cobalt, etc.) for such electric and other alternative powered vehicles or devices may create economic in-balances due to source geology and supply/demand fundamentals. In addition, infrastructure to fuel or charge such vehicles is not extensive or widely available and will require significant capital deployment. As an alternative, the motorist or user may purchase credits to offset any greenhouse gas emissions produced by operating the internal combustion motor vehicle. Such credits may be used to plant trees that capture an equivalent amount or portion of greenhouse gases from the air or other certified sources. However, such greenhouse gas offsetting programs are limited and may not fully mitigate the full scope of greenhouse gas emissions and the land-use impact is largely unknown. One viable alternative for directly reducing greenhouse gas emissions is to capture carbon dioxide produced by and found in the combustion products emitted from an internal combustion engine vehicle, while the vehicle is in motion. Many innovations exist relating to carbon capture, particularly around on-board vehicle carbon capture. While such innovations are available, no solution is known to exist for the efficient off-loading and transfer and/or transport of the captured carbon dioxide, whether in liquid or gas form.

Further, captured carbon dioxide is typically incompatible with other fluids and must be transported in a specialized and separate transportation vessel. Typically, two separate transportation vehicles would be used for such transportation, e.g., one to transport liquid fuel and one to transport carbon.

SUMMARY

Applicant has recognized that transporting captured greenhouse gas emissions using a specialized and separate vehicle is inefficient, when other fluids, such as fuel, may be delivered to the same location. The additional use of a specialized and separate transportation vehicle for transporting captured carbon increases the number of transportation vehicles used at a location, which impacts emissions produced.

Applicant has recognized the problems noted herein, and the present disclosure is directed to embodiments of systems and methods of dual-fluid transportation of fuel and carbon dioxide (CO2) in a dual-fluid vessel thereby eliminating or reducing the number of transportation vehicles used to transport both fuel and carbon dioxide.

For example, the present disclosure includes embodiments of a dual-fluid vessel configured to connect to a transportation vehicle for transporting a fuel and CO2. The dual-fluid vessel may include an outer shell that has an outer surface. The embodiment may further include two or more inner compartments positioned within the outer shell. The two or more inner compartments may have a first inner compartment that may store CO2 and a second inner compartment that may store fuel. Insulation may be positioned between the outer surface and the two or more inner compartments to provide temperature regulation for the CO2, and in some examples the fuel, when positioned in the respective first and second inner compartments. The dual-fluid vessel may also include one or more ports. Each of the one or more ports may have an opening in and through the outer shell and a fluid pathway to one or more of the first inner compartment or the second inner compartment thereby. The one or more ports may provide fluid communication through the opening and fluid pathway for loading or offloading one or more of the fuel or CO2.

Accordingly, an embodiment of the disclosure, for example, is directed to a dual-fluid transport system. The dual-fluid transport system may transport a fuel and CO2. The system may be configured to store or contain a fuel to be delivered to a location or preselected location. The system may further be configured to store or contain CO2 that may be retrieved at the same location or preselected location and delivered to another location. Two or more storage tanks may be positioned at the location. One or more of the two or more storage tanks may be configured to store the fuel and while another one or more of the two or more storage tanks may be configured to store the CO2.

The system may also include a transportation vehicle for transporting the fuel and CO2. The transportation vehicle may have or include one or more controllers or a control system configured to control offloading and/or loading of the fuel and/or CO2. The one or more controllers or the control system may comprise or include a user interface to allow an operator to select offloading and/or loading operations for the fuel and CO2. The transportation vehicle may further include a fuel pump controlled by the one or more controllers or the control system. The fuel pump may be in fluid communication with a tank storing or containing the fuel. The transportation vehicle may also include a CO2 pump controlled by the one or more controllers or the control system. The CO2 pump may be in fluid communication with a tank storing or containing the CO2. One or more digital gauges may be positioned on the transportation vehicle and/or adjacent and/or proximate one or more of the one or more controllers. The one or more digital gauges may display one or more of pressures, flowrates, thermodynamic characteristics, or compartment level of two or more inner compartments of the transportation vehicle.

The system may further include a dual-fluid vessel configured to connect to a transportation vehicle for transporting the fuel and the CO2. The dual-fluid vessel may include an outer shell that has an outer surface. In an embodiment, the dual-fluid vessel may further include two or more inner compartments positioned within the outer shell. The two or more inner compartments may comprise, at least, a first inner compartment that may store CO2 and a second inner compartment that may store fuel. Insulation may be positioned between the outer surface and the two or more inner compartments to provide temperature regulation for the CO2, and, in some examples, the fuel, when positioned in the respective first and second inner compartments. The dual-fluid vessel may also include one or more ports. Each of the one or more ports may have an opening in and through the outer shell and a fluid pathway to one or more of the first inner compartment or the second inner compartment. The one or more ports may provide fluid communication through the opening and fluid pathway for loading or offloading of one or more of the fuel or CO2.

The system may further include one or more external hoses having a proximal end portion attached to a first adapter and a distal end portion attached to a second adapter. The proximal end portion may be positioned to be in fluid communication between the first compartment or the second compartment via the fuel pump and CO2 pump. The distal end portion may be positioned to be in fluid communication with each of the one or more storage tanks. In an embodiment, the distal end portion of one of the external hoses may comprise a nozzle connector configured to assist with or enable removal of CO2 from the vessel when positioned in the first inner compartment.

In another embodiment, the first inner compartment or the second inner compartment may comprise a bladder. In such an embodiment, the bladder (e.g., for example, the second inner compartment) may be positioned within the other inner compartment (e.g., for example, the first inner compartment). As the bladder is filled with a fluid (e.g., fuel or CO2), the bladder may expand. As fluid (e.g., fuel or CO2) is removed from the bladder, the bladder may retract or contract.

In another embodiment, the fuel may comprise one of an ultra-low sulfur diesel (ULSD), diesel, gasoline, renewable diesel, hydrogen, ammonia, ethanol, or liquefied natural gas (LNG). The transportation vehicle may comprise one of a semi-tractor, a marine vessel, or a rail locomotive.

Another embodiment of the disclosure is directed to dual-fluid vessel configured to connect to a transportation vehicle for transporting a fuel and CO2. The dual-fluid vessel may include an outer shell, including an outer surface. The dual-fluid vessel may include an inner compartment defined by a space within the outer shell and configured to store CO2. The dual-fluid vessel may include a bladder positioned within the inner compartment and configured to store liquid fuel. The dual-fluid vessel may include insulation positioned between the outer surface and the inner compartment to provide temperature regulation for fuel and the CO2. The dual-fluid vessel may include one or more ports each having an opening in and through the outer shell and a fluid pathway to one or more of the inner compartment or the bladder to provide fluid communication through the opening for loading/offloading one or more of the fuel or CO2.

Another embodiment of the disclosure, for example, is directed to a method of offloading or loading a fuel and CO2 at a location. The method may include stationing a transportation vehicle at a location. The transportation vehicle may have or include one or more controllers or a control system configured to control offloading or loading of the fuel and CO2. The one or more controllers or the control system may comprise or include a user interface to allow an operator to select offloading or loading operations of the fuel and CO2. The transportation vehicle may further include a fuel pump controlled by the one or more controllers or the control system. The fuel pump may be in fluid communication with the tank storing or containing fuel. The transportation vehicle may further include a CO2 pump controlled by the one or more controllers or the control system. The CO2 pump may be in fluid communication with the tank storing or containing CO2. The transportation vehicle and/or the one or more controllers or the control system may include and/or be in signal communication with one or more digital gauges. The one or more digital gauges may display one or more of pressures, flowrates, thermodynamic characteristics, or compartment level of the two or more inner compartments.

A dual-fluid vessel may be connected to the transportation vehicle for transporting the fuel and the CO2. The dual-fluid vessel may include an outer shell that has an outer surface. The dual-fluid vessel may further include two or more inner compartments positioned within the outer shell. The two or more inner compartments may have or comprise a first inner compartment that may store CO2 and a second inner compartment may store fuel. Insulation may be positioned between the outer surface and the two or more inner compartments to provide temperature regulation for the CO2 and, in some examples, the fuel, when positioned in the respective first and second inner compartments. The dual-fluid vessel may also include one or more ports. Each of the one or more ports may have an opening in and through the outer shell and a fluid pathway to one or more of the first inner compartment or the second inner compartment. The one or more ports may provide fluid communication through the opening and fluid pathway for loading or offloading one or more of the fuel or CO2.

The method may further include confirming contents in the first inner compartment and the second inner compartment. The method may include subsequent to content confirmation, connecting one or more external hoses having a proximal end portion and a distal end portion. The proximal end portion may be attached to a first adapter may be in fluid communication with the first compartment and the CO2 pump on the transportation vehicle or the second compartment and the fuel pump on the transportation vehicle. The distal end portion attached to a second adapter may be in fluid communication with one or more storage tanks at the location. Each of the storage tanks may contain an amount of fuel or an amount of CO2.

The method may further include activating, via the one or more controllers or the control system, the fuel pump and the CO2 pump to thereby supply power to the fuel pump and CO2 pump. The amount of fuel from the second inner compartment may be pumped to the one or more storage tanks at the location. The amount of CO2 from the one or more storage tanks may be pumped to the first inner compartment. The one or more external hoses may then be disconnected.

Another embodiment of the disclosure is directed to a method of offloading/loading a fuel and CO2 at a location. The method may include stationing a transportation vehicle with a first inner compartment and a second inner compartment of a dual-fluid vessel at a location. The method may include, in response to an amount of fuel in the second inner compartment and an operation to fill or partially fill one or more fuel storage tanks at the location, pumping an amount of fuel from the second inner compartment to the one or more fuel storage tanks at the location to thereby cause the second inner compartment to contract. The method may include, in response to no or a partial amount of CO2 in the first inner compartment, pumping an amount of CO2 from the one or more CO2 storage tanks to the first inner compartment based on the amount of fuel pumped from the second inner compartment and the contents in the first inner compartment.

In another embodiment, the method may further include, subsequent to pumping the amount of fuel from the second inner compartment and if no or traces amount of fuel remains in the second inner compartment, purging the second inner compartment to remove substantially all traces of fuel within the second inner compartment. The method may also include, subsequent to pumping the amount of CO2 to the first inner compartment and in response to a determination that the first inner compartment is partially filled and the second inner compartment is empty or partially filled, pumping an amount of nitrogen into one or more of the first inner compartment or second inner compartment to prevent movement of CO2 within the first inner compartment while the transportation vehicle transports the CO2.

Still other aspects and advantages of these embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF DRAWINGS

These and other features, aspects, and advantages of the disclosure will become better understood with regard to the following descriptions, claims, and accompanying drawings. It is to be noted, however, that the drawings illustrate only several embodiments of the disclosure and, therefore, are not to be considered limiting of the disclosure's scope.

FIG. 11 is a flow diagram that illustrates offloading/loading a fuel and carbon dioxide, to an embodiment of the disclosure.

DETAILED DESCRIPTION

So that the manner in which the features and advantages of the embodiments of the systems and methods disclosed herein, as well as others, which will become apparent, may be understood in more detail, a more particular description of embodiments of systems and methods briefly summarized above may be had by reference to the following detailed description of embodiments thereof, in which one or more are further illustrated in the appended drawings, which form a part of this specification. It is to be noted, however, that the drawings illustrate only various embodiments of the embodiments of the systems and methods disclosed herein and are therefore not to be considered limiting of the scope of the systems and methods disclosed herein as it may include other effective embodiments as well.

In one or more embodiments, as illustrated in FIGS. 1-12, for example, the present disclosure is directed to systems and methods for transporting a fuel and carbon dioxide (CO2) in a dual-fluid vessel. Transporting fuel and CO2 typically includes the utilization of multiple transportation vehicles designed to meet different fluid specifications. Transportation of CO2, for example, may include the utilization of a specialized tank for the CO2 to remain in a liquid state. The present disclosure minimizes the number of trips to transport fuel to a location while also gathering CO2 at the location to transport to various markets for various uses, transportation, or permanent sequestration.

Figure 1:
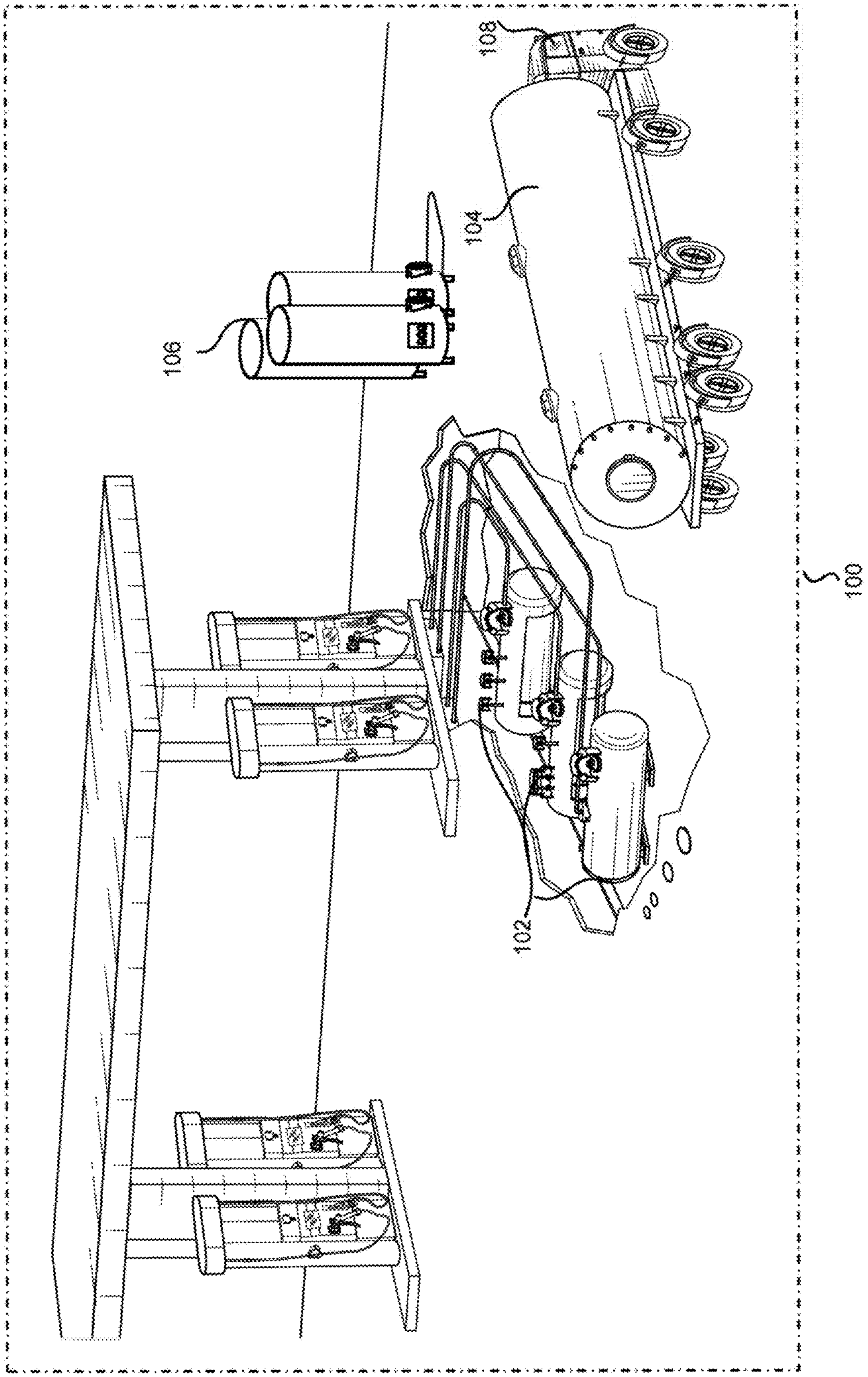
FIG. 1 is a schematic diagram illustration of a dual-fluid transport system for transporting fuel and carbon dioxide, according to an embodiment of the disclosure.

An embodiment of a dual-fluid transport system 100 for transporting a fuel and CO2 is illustrated in FIG. 1. In one or more embodiments, a dual-fluid vessel 104 may be attached to, connected to, and/or positioned on a transportation vehicle 108. As indicated in FIG. 1, the transportation vehicle 108 may be positioned at a location or a preselected location (e.g., a driver, operator, or user may drive the transportation vehicle 108 to the location, for example, to deliver fuel and/or receive CO2). The transportation vehicle 108 may be a semi-tractor, a marine vessel (e.g., a brown water vessel, such as a barge or river barge, or a blue water vessel, such as a marine vessel, ocean vessel, medium range (MR) tankers, general purpose tankers, etc.), or a rail locomotive and/or rail car. The transportation vehicle 108 may be designed or configured to move or transport fluid varying distances from various locations. The distance may be one or more miles from one or more of the various locations. At any one of the location, anchored fuel storage tanks 102 may store fuel and CO2 storage tanks 106 may store CO2. The fuel storage tanks 102 and CO2 storage tanks 106 may connect to the dual-fuel vessel 104 (e.g., during a fueling or CO2 offloading operation) via one or more external hoses. In an embodiment, the fuel storage tanks 102 and/or the CO2 storage tanks 106 may be located above grade, below grade, or some combination thereof. The location may be a retail gas station, a distribution center, a processing plant, a port, a train station, a terminal, a bus terminal, and/or any other hub.

The dual-fuel vessel 104 may include a CO2 pressure relief system and a nitrogen pressure relief system. Nitrogen may be used to purge the dual-fluid vessel 104 of the fuel and/or the CO2 or substantially all traces of the fuel and/or CO2. In some embodiments, the nitrogen may come from one or more storage vessels at the location may be connected to the dual-fluid vessel. For example, subsequent to pumping the fuel from a second inner compartment of the dual-fluid vessel 104 (e.g., from the second inner compartment to the one or more fuel storage tanks) and if, at least trace amounts of fuel remain in the second inner compartment, the nitrogen may be pumped into the second inner compartment to remove substantially all traces of fuel within the second inner compartment. In another example, subsequent to pumping CO2 to a first inner compartment of the dual-fluid vessel 104 (e.g., pumping CO2 from one or more CO2 storage locations to the first inner compartment) and, in response to a determination that the first inner compartment is partially filled and the second inner compartment is empty or partially filled, the nitrogen may be pumped into the first inner compartment and/or second inner compartment to fill one or more of the first inner compartment or second inner compartment to prevent movement of CO2 within the first inner compartment while the transportation vehicle 108 transports the CO2.

The fuel transported to the location and stored in the fuel storage tanks 102 may comprise one or more of ultra-low sulfur diesel (ULSD), diesel, gasoline, renewable diesel, hydrogen, ammonia, ethanol, or liquefied natural gas (LNG), among other fuel types. The CO2 stored in the CO2 storage tanks 106 may comprise a gas or a liquid. To maintain CO2 in a liquid form, the temperature of CO2 may be maintained below the critical point and above the triple point, as well as within a threshold pressure range, as will be understood by one skilled in the art. The CO2 may remain a gas while the CO2 is below the critical point at approximately or about 31 degrees Celsius and below about 73 atmosphere pressure, as will be understood by one skilled in the art.

In some embodiments, the fuel may be offloaded from the dual-fluid vessel 104, using one or more external hoses, to fill the fuel storage tanks 102. An operator and/or a controller may monitor the pressure, temperature, and/or the level of fuel inside the dual-fuel vessel 104 using one or more digital gauges on the transportation vehicle. In other embodiments, a smart control board (e.g., such as one or more controllers) may calculate the amount of fuel and CO2 remaining in the dual-fluid vessel 104. Additionally, one or more controllers or a control system may be positioned and/or configured to monitor and/or measure characteristics (e.g., pressure, temperature, type of fuel, and/or level within the fuel storage tanks 102 via one or more sensors or probes associated with the fuel storage tanks 102) of the fuel storage tanks 102 at the location may have or include to monitor the pressure, temperature, and/or level inside the fuel tanks 102. In an embodiment, the one or more controllers of the fuel storage tanks 102 or the location may connect to and/or be in signal communication with one or more controllers of the transportation vehicle 108 (e.g., to provide information regarding fuel storage tanks 102, such as a level within the fuel storage tanks 102, to the one or more controllers of the transportation vehicle 108).

CO2 may be loaded onto the dual-fluid vessel 104 from the CO2 storage tanks 106 using one or more external hoses. In other embodiments, the CO2 may be from a source other than transportation vehicles, the being picked up from such a source and transported, via the dual-fluid vessel 104, to another location. In an embodiment, one or more controllers may be positioned and/or configured to measure characteristics (e.g., pressure, temperature, and/or level within the CO2 storage tanks 106 via one or more sensors or probes associated with the CO2 storage tanks 106) of the CO2 storage tanks 106. Further, the one or more controllers of the CO2 storage tanks 106 or the location may connect to and/or be in signal communication with one or more controllers of the transportation vehicle 108 (e.g., to provide information regarding CO2 storage tanks 106, such as level within the CO2 storage tanks 106, to the one or more controllers of the transportation vehicle 108).

According to an embodiment of the present disclosure, the semi-tractor 218 may include a dual-fluid vessel 202 configured to connect to the truck trailer 212, as shown in FIG. 2. The dual-fluid vessel 202 may be fixedly or removably attached to the truck trailer 212. In another embodiment, the dual-fluid vessel 202 may be integral or integrated with the truck trailer 212. The semi-tractor 218 may transport the fuel and CO2 (or other emissions stored at a location) from and/or to varying locations. The dual-fluid vessel 202 may have an outer shell 214 including an outer surface 215 and an inner surface 217. The dual-fluid vessel 202 may further include two or more inner compartments such as, at least, a first inner compartment 208 and a second inner compartment 210 positioned within the outer shell 214. The dual-fluid vessel 202 may be configured to store and/or compatible with fuel and CO2. In other embodiments, the dual-fluid vessel 202 may be compatible to store other fluids. For example, rather than or in addition to storing CO2, the dual-fluid vessel 202 may store engine exhaust captured from transportation vehicles.

Figure 2A:
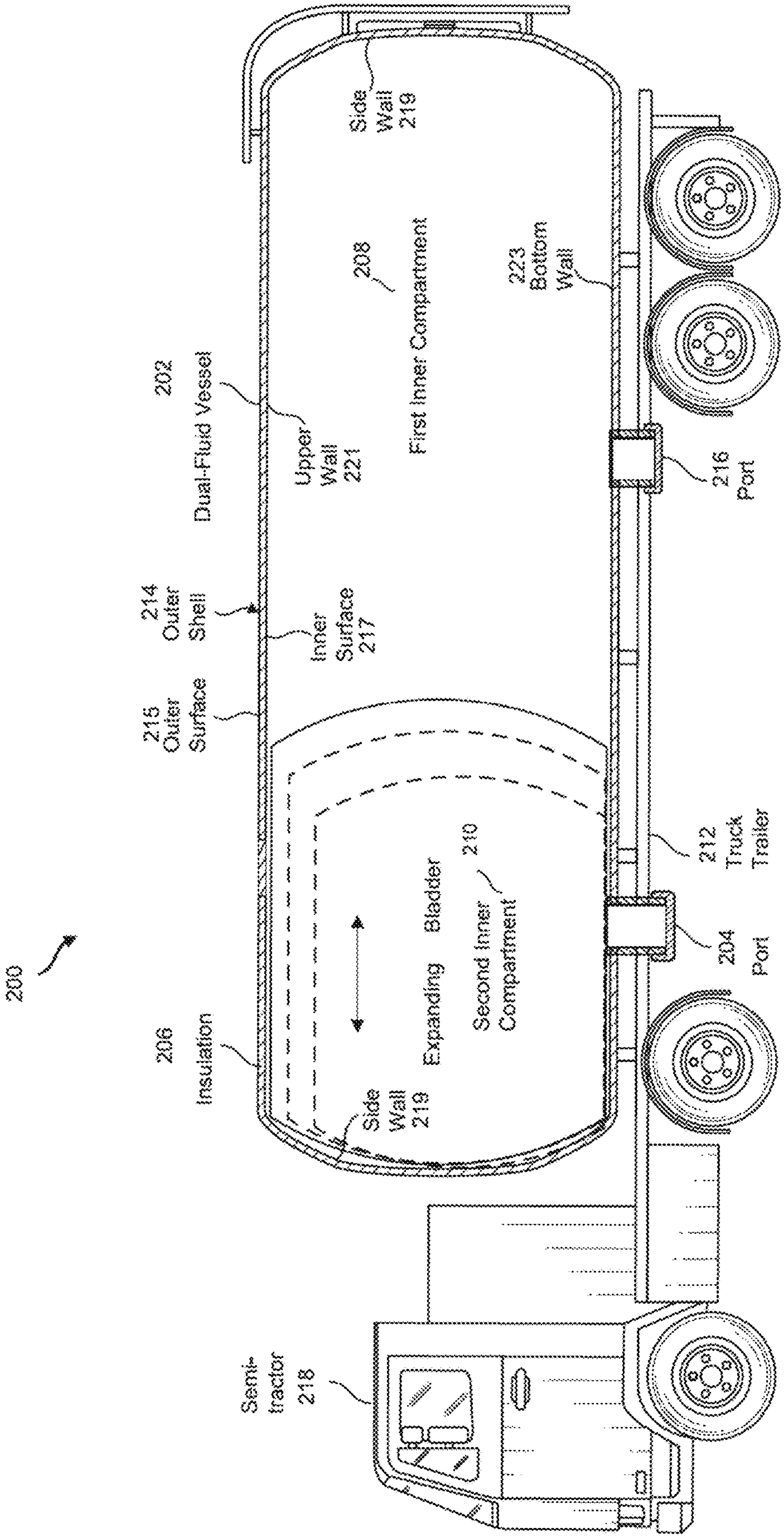
FIG. 2A is a schematic diagram illustration of a semi-tractor with an attached dual-fluid vessel having a horizontal expandable bladder for fuel, according to an embodiment of the disclosure.
Figure 2B:
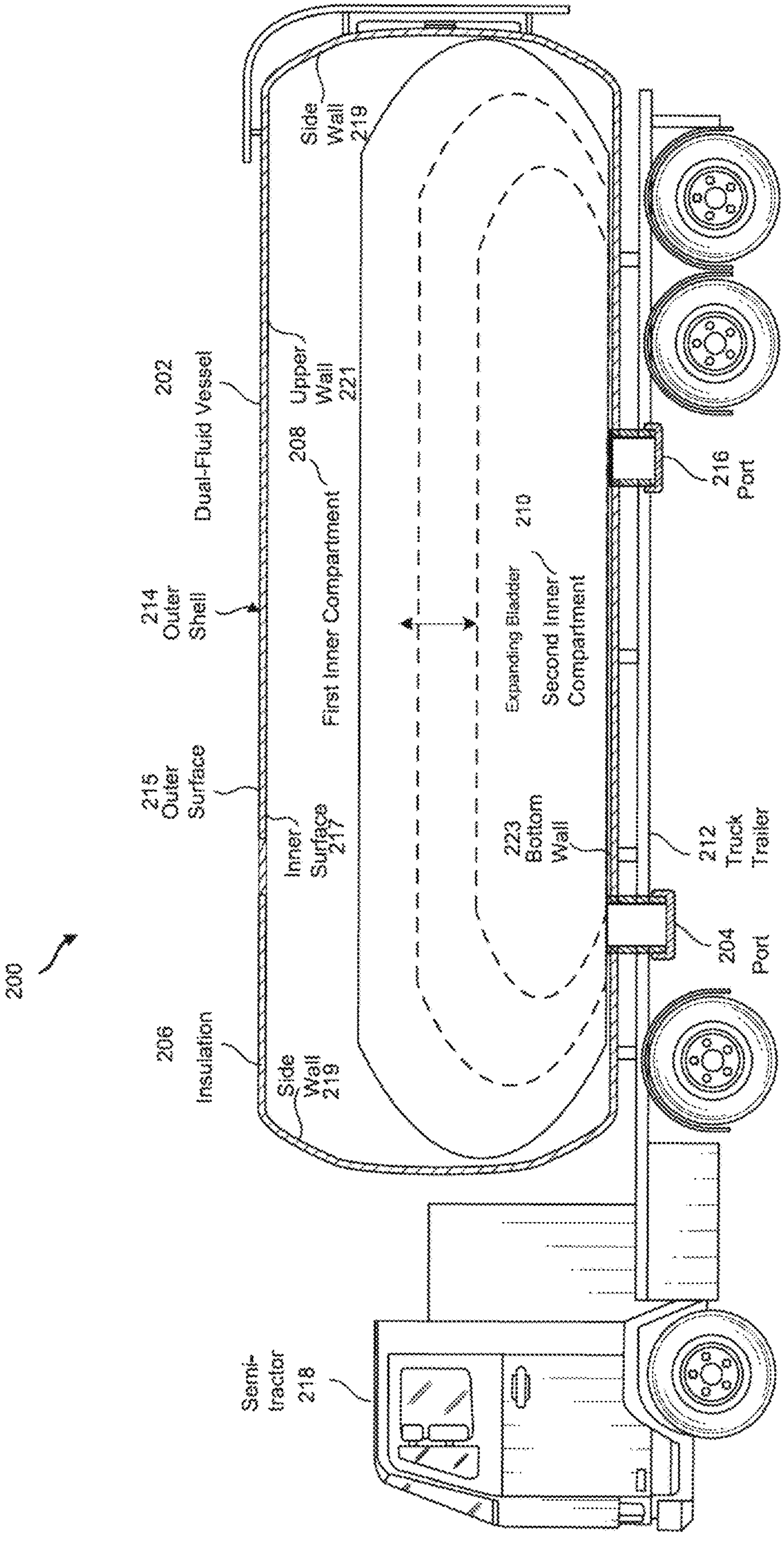
FIG. 2B is a schematic diagram illustration of a semi-tractor with an attached dual-fluid vessel having a vertically expandable bladder for fuel, according to an embodiment of the disclosure.

In some embodiments, the dual-fluid vessel 202, as noted, may be detachable or removable from the truck trailer 212. The second inner compartment 210 may have a portion of surface area secured, attached, or connected to the inner surface 217 of the outer shell 214. A portion of the surface area of the second inner compartment 210 may be secured, attached, or connected to a side wall 219 (e.g., the side wall 219 in proximity to the cab of the semi-tractor 218 or the side wall 219 furthest from the cab of the semi-tractor 218) of the inner surface 217 of the outer shell 214, as illustrated in FIG. 2A. In other embodiments, a portion of the second inner compartment 210 may be secured, attached, or connected to a bottom wall 223 or floor of the inner surface 217 of the outer shell 214, as illustrated in FIG. 2B. Such an attachment or connection between the inner surface 217 of the outer shell 214 and the second inner compartment 210 may be mechanical (e.g., bolts, fasteners, welds, etc.) or adhesive.

The truck trailer 212 and/or the semi-tractor 218 may be designed, for example, to support, store, or contain a maximum of 80,000 pounds (lb.), including or excluding the empty weight of the dual-fluid vessel 202, to meet Department of Transportation (DOT) specifications. In some instances, the truck trailer 212 and/or the semi-tractor 218 may be designed to support, store, or contain a maximum of 120,000 pounds or a maximum weight, including or excluding the empty weight of the dual-fluid vessel 202, that aligns with DOT standards or exceptions. The dual-fluid vessel 202 may be designed to meet the DOT and/or maritime specifications for shipping, rail system, or road transportation.

The dual-fluid vessel 202 may further be designed or configured to minimize shifting of the fluid contained therein during transportation. The outer surface 215 and inner surface 217 of the outer shell 214 of the dual-fluid vessel 202 may be designed to evenly distribute the weight of the fluid during transport. For example, the dual-fluid vessel 202 may have an obround, oblong, spherical, cylindrical, or other shape configured to prevent tipping based on movement of fluid therein.

The first inner compartment 208 may be configured to store CO2. The CO2 may be included, along with other fluids, in captured exhaust from a motorist vehicle that is then compressed. The CO2 may flow through a compressor at a location where the CO2 may be converted into a liquid. The exhaust may also be converted into a liquid through temperature changes and/or through a catalyst. In other embodiments, the captured CO2 may come from a crude CO2 source, e.g., such as a refinery by-product. In some embodiments, the first inner compartment 208 may be compatible with CO2 and/or fuel. In other embodiments, the first inner compartment 208 may be compatible with CO2. The first inner compartment 208 may store and/or be configured to be compatible with fuel.

In one or more embodiments, the first inner compartment 208 may be configured to withstand a selected pressure range. The selected pressure may be at least at or above the critical point of CO2 at a first selected pressure. In one or more embodiments, the first inner compartment 208 may be maintained at a first selected temperature. The first selected temperature may be at or below the critical point of CO2. In other embodiments, the transportation vehicle 200 may also include a refrigeration unit for transporting liquid CO2. The refrigeration unit may be connected to the first inner compartment 208 to hold or maintain the first inner compartment 208 at a first selected pressure and at a temperature below the first selected temperature. The refrigeration unit may be connected to the first inner compartment 208 and second inner compartment 210.

The first inner compartment 208 may fill the entire dual-fluid vessel 202. The first inner compartment 208 may fill a portion of the dual-fluid vessel 202. The liquid CO2 may be high pressure liquid CO2 or low pressure liquid CO2. High pressure liquid CO2 may be produced as described above with compressing the gaseous CO2 to about 70 bars of pressure and then cooling it to about 64 degrees Fahrenheit. Low pressure liquid CO2 may be produced by expanding high pressure CO2 to a lower pressure or by refrigeration to about 21 bars of pressure and temperature of about −0.4 degrees Fahrenheit. In some embodiments, the first inner compartment 208 and second inner compartment 210 may be designed and/or configured (e.g., constructed of a specified material as a specified shape to withstand a pressure range) high pressure liquid CO2 or low pressure liquid CO2. Such a specified material may be designed to expand and contract.

In one or more embodiments, the second inner compartment 210 may store fuel. In some embodiments, the second inner compartment 210 may be a bladder. In such embodiments, the first inner compartment 208 may be defined by the space within the outer shell 214 or the space within the inner surface 217 of the outer shell 214. Further, the bladder may be positioned within the first inner compartment 208. The bladder may be filled with fuel. The bladder may have a portion of the surface area secured within the outer shell 214, thereby causing expansion, during fueling, in one direction in the dual-fluid vessel 202 as shown in FIG. 2A and 2B. The bladder may be comprised of a material including a level of elasticity, thus causing the bladder to expand, during filling, and to fill the dual-fluid vessel 202 including the first inner compartment 208. The bladder may fill the entire dual-fluid vessel 202 when filled (e.g., such that the bladder is adjacent to each side wall 219, the upper wall 221, and the bottom wall 223). The bladder may fill a portion of the dual-fluid vessel 202 (e.g., such as when the bladder is partially filled). The expansion of the bladder may be dependent on the amount of fuel (or, in another embodiment, CO2) in the bladder. The bladder may be made of material compatible with fuel (and/or, in another embodiment, CO2), such that the material does not deteriorate after continued exposure to fuel. The bladder may additionally be compatible with CO2, such that the bladder does not deteriorate and/or become brittle after continued exposure to CO2 and/or nitrogen, particularly CO2 maintained at low temperatures and in a liquid state.

The bladder may be comprised of a rubber material, a polymer material, and/or a plastic material, such as, for example, a woven polyolefin. The dual-fluid vessel 202 may be comprised of a metal, such as stainless steel, aluminum, SA 517 steel, and/or other materials. The thickness of the dual-fluid vessel 202 may be selected based on the operating parameters of liquid CO¬ ¬2 or other fluid to be stored in the dual-fluid vessel 202. The operating parameters may include temperature ranges and/or pressure ranges at which CO2 or other fluids are and/or remain in a liquid state. The thicknesses of the dual-fluid vessel 202 may comprise about 0.1 inches, about 0.2 inches, about 0.3 inches, about 0.4 inches, about 0.5 inches, or about 1 inch or more. The diameter of the dual-fluid vessel 202 may be about 5 feet, about 6 feet, about 7 feet, or about 8 feet at the widest portion of the dual-fluid vessel 202. In another embodiment, the dual-fluid vessel may be an obround shape, an oblong shape, a spherical shape, a cylindrical shape, or another shape configured to withstand a specified pressure and/or maintain a specified pressure range.

In an embodiment, pressure within the first inner compartment 208 may be controlled via a pressure regulation device. The pressure regulation device may be or include an external compressor, pump, or other device configured to increase pressure within a space. The external compressor may be positioned on or proximate the dual-fluid vessel or on the truck trailer 212. In addition, pressure regulation device may include a pressure relief valve. The pressure relief valve may be positioned on the dual-fluid vessel. The pressure relief valve may be automatically and/or manually actuatable. Further, the dual-fluid vessel 202 may include a pressure regulator and/or monitoring device. The pressure regulator and/or monitoring device may substantially continuously monitor pressure within the dual-fluid vessel 202, the first inner compartment 208, and/or the second inner compartment 210. If the pressure within the one or more of the dual-fluid vessel 202, the first inner compartment 208, and/or the second inner compartment 210 is outside of a threshold pressure range (e.g., the pressure at which the liquid within the first inner component and/or second inner component at a current temperature experiences a phase change to a solid or gas), then the compressor may activate to increase pressure within the first inner compartment 208 and/or second inner compartment 210 or the pressure relief valve may bleed or release pressure within the tank to decrease pressure. For example, if liquid CO2 is stored within the first inner compartment 208 at a specified temperature, then, if the pressure moves outside of a correlated pressure range, pressure may be released (e.g., via a relief valve to decrease pressure) or pressure may be increased (e.g., via a compressor or other device to increase pressure).

In other embodiments, when a portion of the fuel in the bladder is offloaded and a CO2 is added to the first inner compartment 208, the dual-fluid vessel 202 may contain fuel in the bladder, while the bladder may be substantially surrounded by CO2. The bladder may contract, rescind in size, or retract as the fuel is removed from the bladder. The bladder may comprise various sizes, based on, for example, the overall size of the dual-fluid vessel 202. In another embodiment, the bladder may be removable from the dual-fluid vessel 202.

In an embodiment, the dual-fluid vessel 202 may also include insulation 206. The insulation 206 may be positioned between the inner surface 217 and the two or more inner compartments, positioned on the outer surface 215 and covered, in an example, by a shell or jacket to protect the insulation from the environment, or positioned between the outer surface 215 and inner surface 217. The insulation 206 may provide temperature regulation for the CO2, and in some examples the fuel, when positioned in the respective first and second inner compartments 208, 210. The insulation may be polyurethane foam or an equivalent material and/or a shell or jacket.

In some embodiments, the dual-fluid vessel 202 may include a vapor barrier. The vapor barrier may provide a barrier for and/or collect vapors formed during transportation and/or potentially emitted during loading and/or offloading. For example, port 204, 216 may include a vapor barrier.

The embodiment of the dual-fluid vessel 202 may further include one or more ports 204, 216. Each port 204, 216 may have an opening in and through the outer shell 214 and a fluid pathway to one or more of the first inner compartment 208 or the second inner compartment 210. The ports 204, 216 may be positioned at other locations along the outer shell 214, such as along one of the sides, at the rear, and/or at the top of the outer shell 214, among other locations. For example, port 204 may be positioned on the side of the dual-fluid vessel 202 to prevent the bladder from obstructing offloading/loading operations. Ports 204, 216 may be located in positions accessible for operators. The ports 204, 216 may provide fluid communication to one or more of the first inner compartment 208 or the second inner compartment 210 thereby to provide fluid communication through the opening and a fluid pathway for loading/offloading one or more of the fuel or CO2, as shown in FIG. 2. In such embodiments, the hose may include or connect to a nozzle configured to offload selected fluids. Based on the type of fluid, specified components may be included downstream of the dual-fluid vessel 202 to pump and/or receive the fluids stored within a corresponding compartment. The ports 204, 216 may form a tight seal with the one or more hoses connected to the dual-fluid vessel 202. The one or more ports 204, 216 may be used to purge the first inner compartment 208 and the second inner compartment 210 of residual material. The ports 204, 216 may include valves or other flow control devices to prevent fluid from flowing therethrough during transportation and/or prior to offloading/loading operations.

In an embodiment, the dual-fluid vessel 202 may comprise a new vessel (e.g., a new vessel constructed with at least two inner compartments) or may comprise a retrofitted vessel. A retrofitted vessel may include an existing vessel configured to transport fuel or other fluids. A second inner compartment (e.g., such as a bladder, flexible compartment, or inflexible compartment) may be added to and/or installed in or on the existing vessel, thus a previous single-use vessel may be converted to a dual-fluid vessel.

Figure 3A:
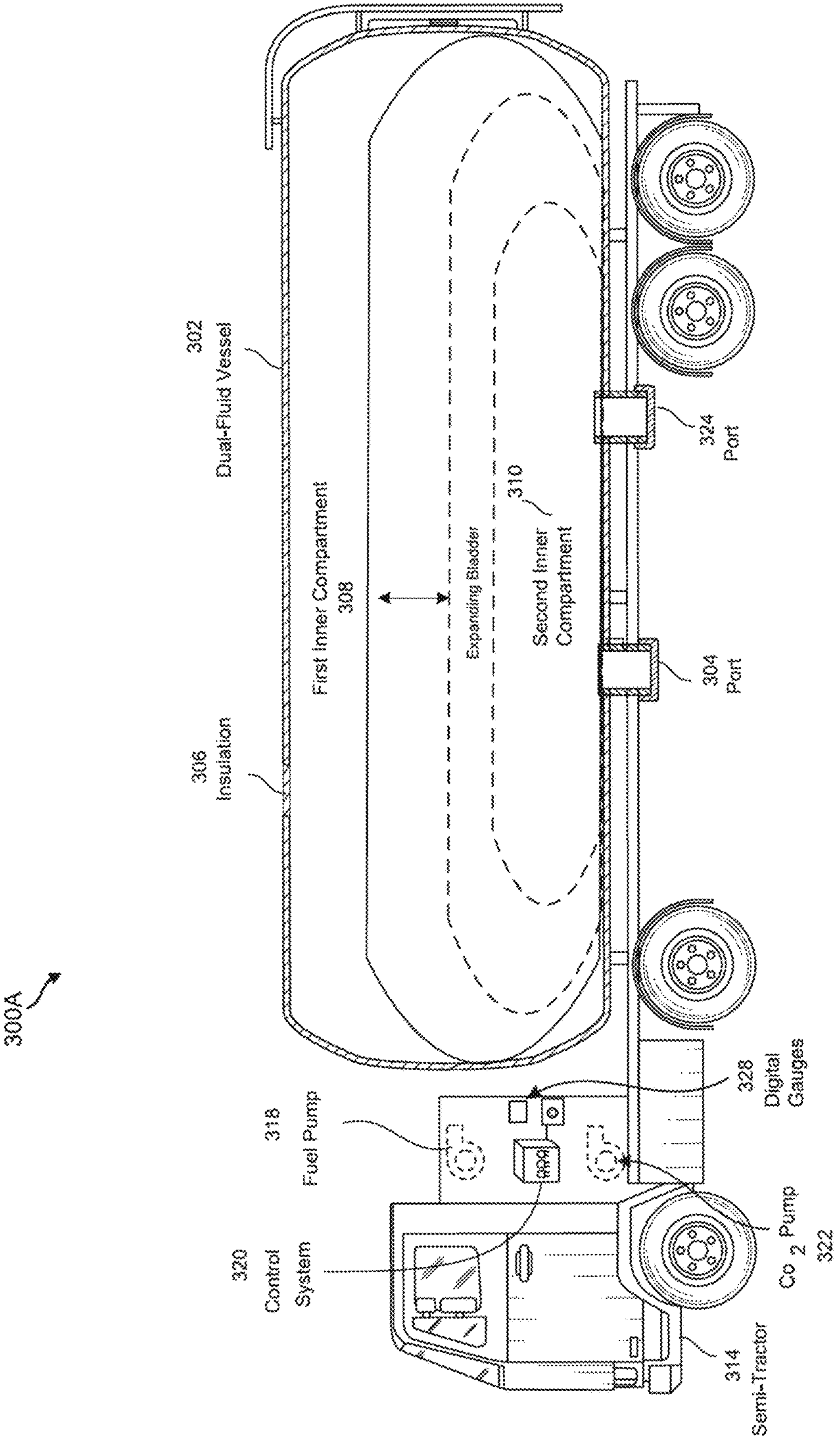
FIG. 3A is a schematic diagram illustration of a semi-tractor with one or more controllers or a control system, pumps, and an attached dual-fluid vessel having a vertically expandable bladder for fuel, according to an embodiment of the disclosure.

As illustrated in FIG. 3A, in one or more embodiments, the system 300A may include a semi-tractor 314. The semi-tractor 314 may further include a fuel pump 318. The fuel pump 318 may be used to pump the fuel into the bladder. Additionally, the fuel pump 318 may be used to remove the fuel from the bladder to fuel tanks at a location.

In some embodiments, the semi-tractor 314 may also include a CO2 pump 322. The CO2 pump 322 may be used to load CO2 from the CO2 storage tanks into the first inner compartment 308. In other embodiments, the CO2 pump 322 may be used offload the CO2 at a location. The fuel pump 318 and CO2 pump 322 may be a diaphragm pump or a mechanical pump, for example, as will be understood by those skilled in the art. The CO2 pump 322 may move CO2 from the CO2 storage tanks into the first inner compartment 308 at a selected pressure. In other embodiments, the selected pressure may displace the fuel, thus causing the fuel to flow out of the bladder. In such embodiments, as the first inner compartment 308 fills with CO2, the pressure of the incoming CO2 may displace the fuel, causing the fuel to flow out of the bladder and into the fuel tanks.

In some embodiments, the bladder may be offloaded using the pressure from filling the first inner compartment 308 with CO2 to displace the fuel out of the bladder into nearby fuel storage tanks. In such embodiments, CO2 is first loaded into the first inner compartment 308. Utilizing the pressure of the CO2 against the bladder, the bladder may contract, rescind in size, or retract as the fuel flows out of the port 304 for the second inner compartment 310. Such embodiments may further include a control valve(s), flow control devices, or other dynamic control devices downstream of the bladder that are connected to the bladder and the fuel storage tanks to control the flow and/or pressure from the displacement of the fuel within the bladder into the fuel storage tanks. In this embodiment, the fuel pump 318 may not be utilized, however the CO2 pump 322 may be utilized to fill the first inner compartment 308 and therefore displace the fuel. In some embodiments, the first compartment may be filled with nitrogen (N2) to completely fill the tank during transport (e.g., such as when the bladder is partially filled and the first inner compartment 308 is partially filled). In another embodiment, offloading/loading operations may occur separately and/or sequentially. In other words, CO2 may be loaded or offloaded first, then a transportation fuel may be offloaded from or loaded onto the dual-fluid vessel 302.

One or more external hoses may be used to connect the CO2 storage tanks to the port 324 to fill the first inner compartment 308 with CO2 using one or more external hoses. Each of the one or more hoses may have a proximal end portion attached to a first adapter and a distal end portion attached to a second adapter. The proximal end portion of the hose may be positioned such that the first inner compartment 308 and the CO2 pump 322 are in fluid communication. In other embodiments, the proximal end portion of the hose may be positioned such that the first inner compartment 308 and an external pump at the location are in fluid communication. The proximal end portion of the hose may be positioned such that the second inner compartment 310 and the fuel pump 318 are in fluid communication. In other embodiments, the proximal end portion of the hose may be positioned such that the second inner compartment 310 and an external pump at the location are in fluid communication. The first adapter may be configured to interlock with the ports 304, 324. The first adapter may, when connected to or interlocked with the port 304, 324, form a tight seal with the port 304, 324 to transport fuel and CO2 at various pressures and temperatures.

The distal end portion of the hose may be positioned such that CO2 may flow therethrough to the CO2 storage tanks of the one or more storage tanks. The distal end portion of the hose may be positioned such that fuel may flow therethrough to the fuel storage tanks of the one or more storage tanks. The second adapter may interlock with an outlet of the fuel storage tanks and the CO2 storage tanks. The second adapter may, when connected to or interlocked with the outlet of the fuel storage tanks or CO2 tanks, form a tight seal with the outlet of the fuel storage tanks or the CO2 storage tanks.

In some embodiments the semi-tractor 314 may further contain or include one or more digital gauges 328. The one or more digital gauges 328 may display one or more of pressures, flowrates, temperature, other thermodynamic properties, and/or the compartment level in the two or more inner compartments. The one or more digital gauges may be positioned adjacent to and/or proximate to (and/or, in an embodiment, in signal communication with) one or more controllers (e.g., one or more controllers 320). The one or more controllers and/or sensors or probes positioned throughout the dual-fluid vessel 302 may provide values for the digital gauges to display.

The embodiment of system 300A may further include one or more controllers 320 or a control system. The one or more controllers 320 may be configured to control the offloading/loading operation of the fuel and CO2. The one or more controllers 320 may include or may be in signal communication with a user interface configured to allow an operator to select offloading/loading operations of the fuel and CO2. The fuel pump 318, in fluid communication with and/or to adjust the flow of the fuel, may be controlled by the one or more controllers 320. Additionally, the CO2 pump 322, in fluid communication with and/or to adjust the flow of the CO2, may also be controlled by the one or more controllers 320. The one or more controllers 320 may include a fail-safe switch to turn off the fuel pump 318 when the bladder reaches a selected capacity. The one or more controllers 320 may further include a fail-safe switch to turn off the fuel pump 318 and the CO2 pump 322 during the offloading and loading process when the compartment level of the first inner compartment 308 or the second inner compartment 310 reaches a selected threshold level(s). In other embodiments, the one or more controllers 320 may control the refrigeration unit. In such embodiments, the CO2 and/or fuel may be in a state (e.g., liquid or gaseous) such that the temperature is maintained within a preselected threshold range. The one or more controllers 320 may be in signal communication to determine the temperature of the CO2 and/or fuel, and if the CO2 and/or fuel is outside of the preselected threshold range, the one or more controllers 320 may cause the refrigeration unit to operate or cease operation (e.g., to cool or cease cooling). In some embodiments, the one or more controllers 320 may control the flow from the nitrogen storage vessels to the first inner compartment 308. In such embodiments, the one or more controllers 320 may be in signal communication with one or more sensors to determine a current capacity of, for example, the first inner compartment 308 and/or second inner compartment 310. If the capacity is outside of a preselected capacity range, then the one or more controllers 320 may cause nitrogen to flow into the first inner compartment 308. Thus, the first inner compartment 308 may be filled in relation to the current capacity of the second inner compartment 310. Such an embodiment may prevent the second inner compartment 310 from moving during transportation.

Figure 3B:
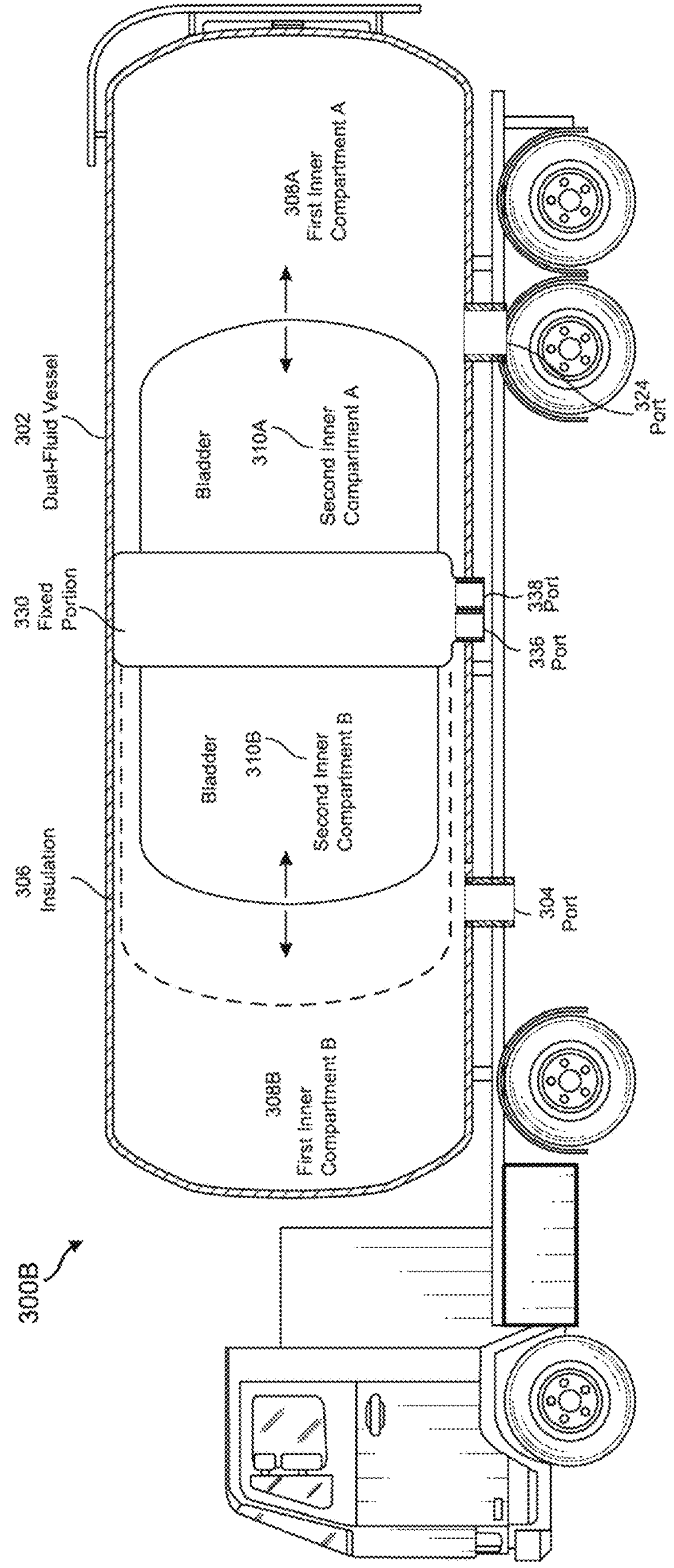
FIG. 3B is a schematic diagram of a semi-tractor with an attached dual-fluid vessel having a fixed portion with a horizontally expandable bladder on each side of the fixed portion, according to an embodiment of the disclosure.

In some embodiments, the system 300B may include a semi-tractor 314 with an attached dual-fluid vessel 302 a second inner compartment A 310A, a second inner compartment B 310B, a first inner compartment A 308A, a first inner compartment B 308B, and a fixed portion 330, as illustrated in FIG. 3B. The second inner compartment A 310A and second inner compartment B310B may be comprised of two expanding bladders is fixed to the fixed portion 330 within the outer surface area of the dual-fluid vessel 302. The fixed portion 330 may be positioned at a center location within the length of the dual-fluid vessel 302. The fixed portion 330 may be positioned to the left of the center location within the length of the dual-fluid vessel 302. The fixed portion 330 may be positioned to the right of the center location within the length of the dual-fluid vessel 302. In an embodiment, the fixed portion 330 may be integrated into the dal-fluid vessel or attached or connected to the inner surface of the outer shell of the dual-fluid vessel 302. The two bladders may expand into the first inner compartment A 308A or first inner compartment B308B. The second inner compartment A 310A may fill the space of the first inner compartment 308A when the bladder is expanded. The second inner compartment B 310B may fill the space of the first inner compartment B 308B when the bladder is expanded. The two bladders may be connected to or may be a part of the fixed portion 330. In other words, the fixed portion 330 and the two bladders may be a single component that may be fixed or attached to the inside of the dual-fluid vessel 302.

The second inner compartment A 310A may be filled independently of the second inner compartment B 310B using port 338. The second inner compartment B 310B may be filled independently of the second inner compartment A 310A using port 336. The first inner compartment A 308A may be filled independently of the first inner compartment B 308B using port 324. The first inner compartment B 308B may be filled independently of the first inner compartment A 308A using port 304.

Figure 3C:
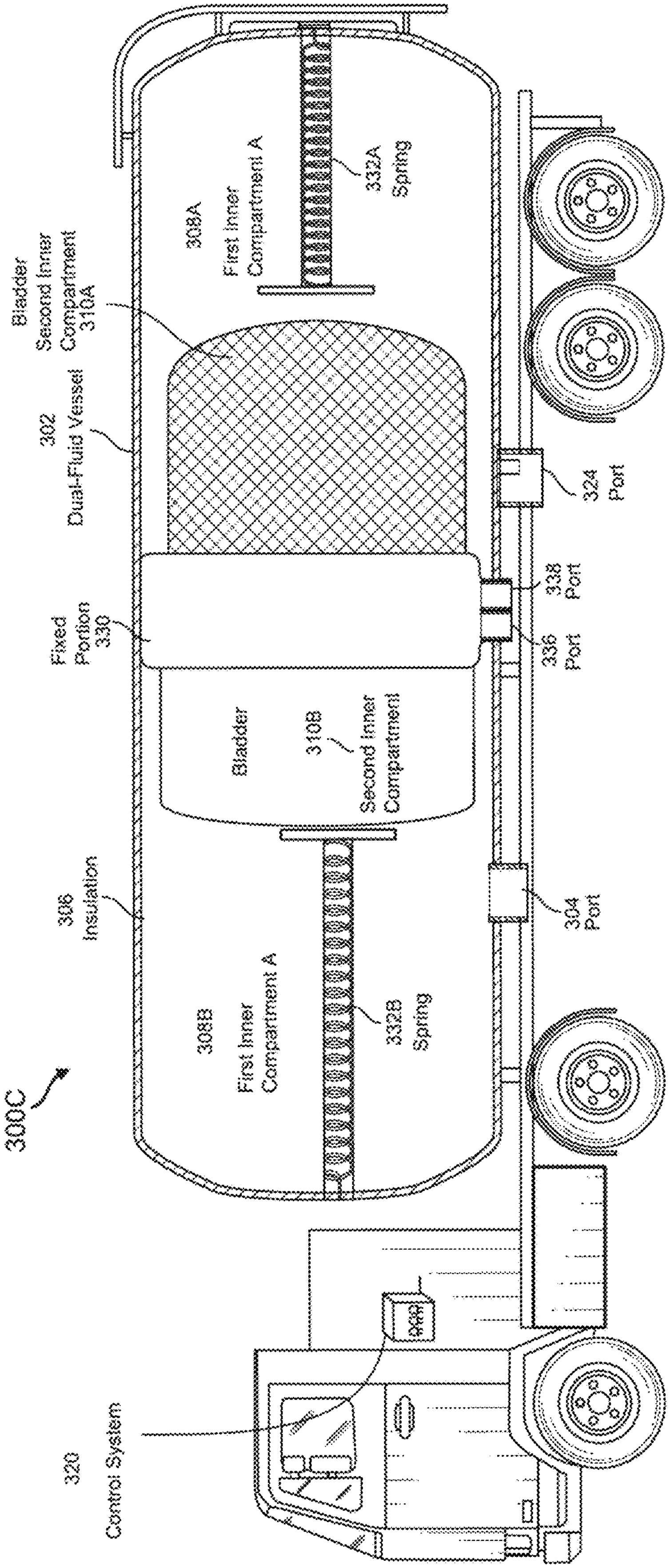
FIG. 3C is a schematic diagram of a semi-tractor with an attached dual-fluid vessel having a fixed portion with a horizontally expandable bladder on each side of the fixed inner surface controlled by a spring system, according to an embodiment of the disclosure.

In another embodiment, the system 300C may include a dual-fluid vessel 302 having a second inner compartment A 310A, a second inner compartment B 310B, a first inner compartment A 308A, a first inner compartment B 308B, a fixed portion 330, and one or more springs 332A, 332B as illustrated in FIG. 3C. The second inner compartment A 310A and The second inner compartment B 310B may be designed as described in FIG. 3B. The one or more springs 332A, 332B may further control the bladder dynamics during loading/unloading operations. The one or more spring 332A, 332B may be controlled by the one or more controllers 320. For example, as the second inner compartment A 310A is filled with fuel, the spring 332A may retract as the fuel in the second inner compartment A 310A applies pressure to the spring 332A to retract the spring 332A. As the second inner compartment B 308B rescinds back to a static position, the spring 332B releases to retract the second inner compartment 310B. In another embodiment, the one or more springs 332A, 332B may be configured to constantly apply force to the bladder, such that when the bladder is empty, each of the springs 332, 332B are in a decompressed state and the bladder does not move. In such embodiments, the one or more springs 332A, 332B may be configured so that when a bladder is being emptied, the one or more springs 332A, 332B may provide force sufficient to cause each bladder to be emptied or to continue to be emptied, for example, without the use of a pump.

In such embodiments, the one or more springs 332A, 332B may be compression springs or constant force springs. Further, a distal end of each of the one or more springs may be connected to an inner surface of each side wall of the dual fluid vessel. Each of the one or more springs may connect, attach, or be mounted to the inner surface of each side wall. For example, if a constant force spring is utilized, a cavity mount may be positioned on the inner surface of each end wall. In another example, two constant force springs may be positioned in a back-to-back configuration and mounted in such a configuration on the inner surface of each end wall. In yet another example, a compression spring may be mounted on a plate and the plate attached to the inner surface of each end wall. Further, the distal end of each spring may be adjacent to and/or attached to the bladder. The system 300C may include additional springs mounted in various configurations, including, but not limited to, two side-by-side compression springs. The mounts or plates attached to the inner surface of each side wall may be attached mechanically, such as via fasteners (e.g., via welds, bolts, etc.). In an embodiment, other configurations of the dual-fluid vessel 302 may include similar springs and mountings, such as the dual-fluid vessel illustrated in FIG. 3A (e.g., the spring may be mount on the inner surface of the top wall of the dual-fluid vessel).

In an embodiment, each of the springs 332A, 332B may be coated with or comprised of a material configured to withstand corrosion or deterioration when exposed to CO2, fuel, low temperatures, and/or high and/or low pressure.

The fixed portion 330 may be positioned at a center location within the length of the dual-fluid vessel 302. The fixed portion 330 may be positioned to the left of the center location within the length of the dual-fluid vessel 302. The fixed portion 330 may be positioned to the right of the center location within the length of the dual-fluid vessel 302. The two bladders may expand into the first inner compartment A 308A and the first inner compartment B 308B. The two bladders 310A, 310B may be filled with fuel. The two bladders may be completely filled or partially filled. One of the two bladders may be completely filled or partially filled, while the other bladder is empty.

The second inner compartment A 310A may be filled independently of the second inner compartment B 310B using port 338. The second inner compartment B 310B may be filled independently of the second inner compartment A 310A using port 336. The first inner compartment A 308A may be filled independently of the first inner compartment B 308B using port 324. The first inner compartment B 308B may be filled independently of the first inner compartment A 308A using port 304.

Figure 3D:
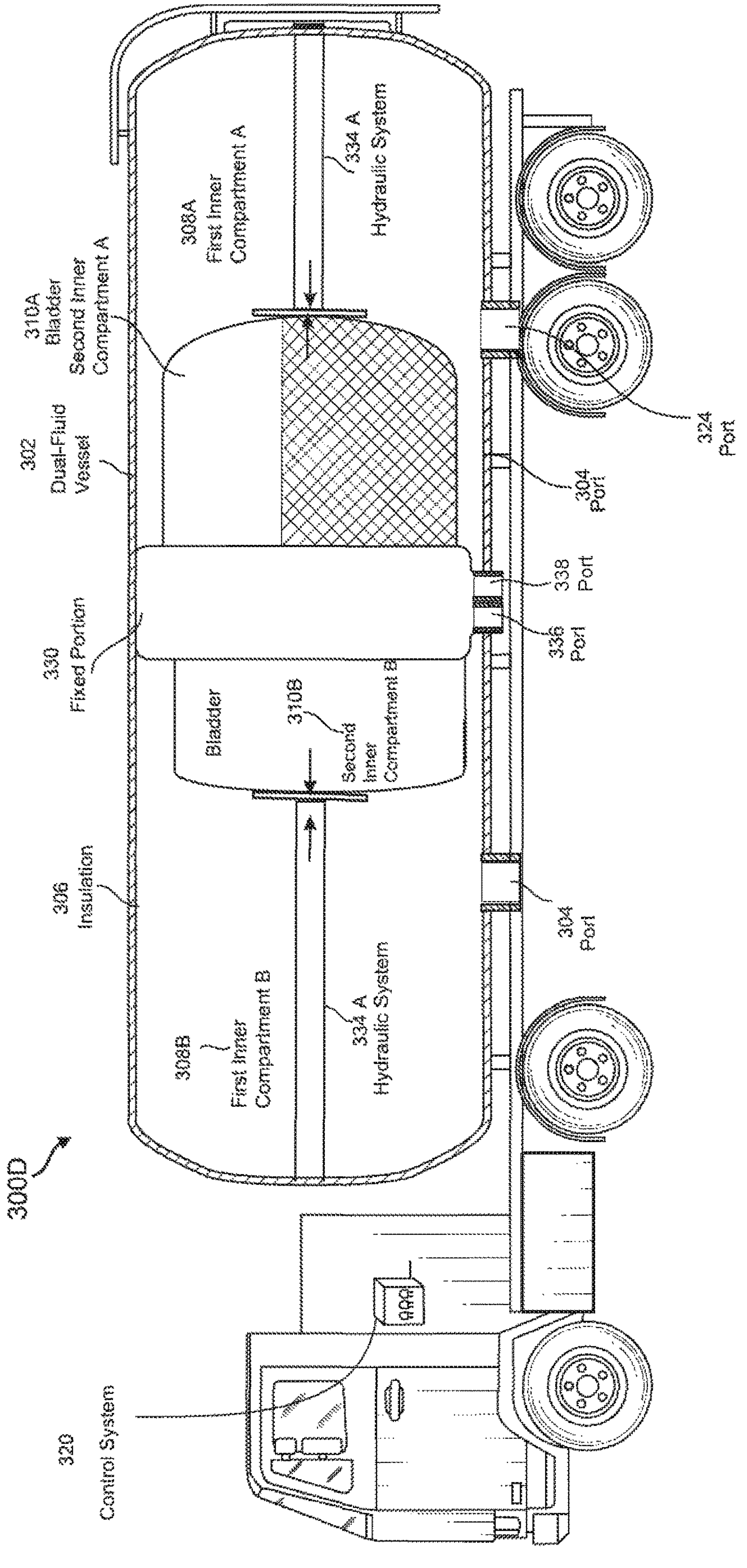
FIG. 3D is a schematic diagram of a semi-tractor with an attached dual-fluid vessel having a fixed portion with a horizontally expandable bladder on each side of the fixed inner surface controlled by a hydraulic system, according to an embodiment of the disclosure.
Figure 3E:
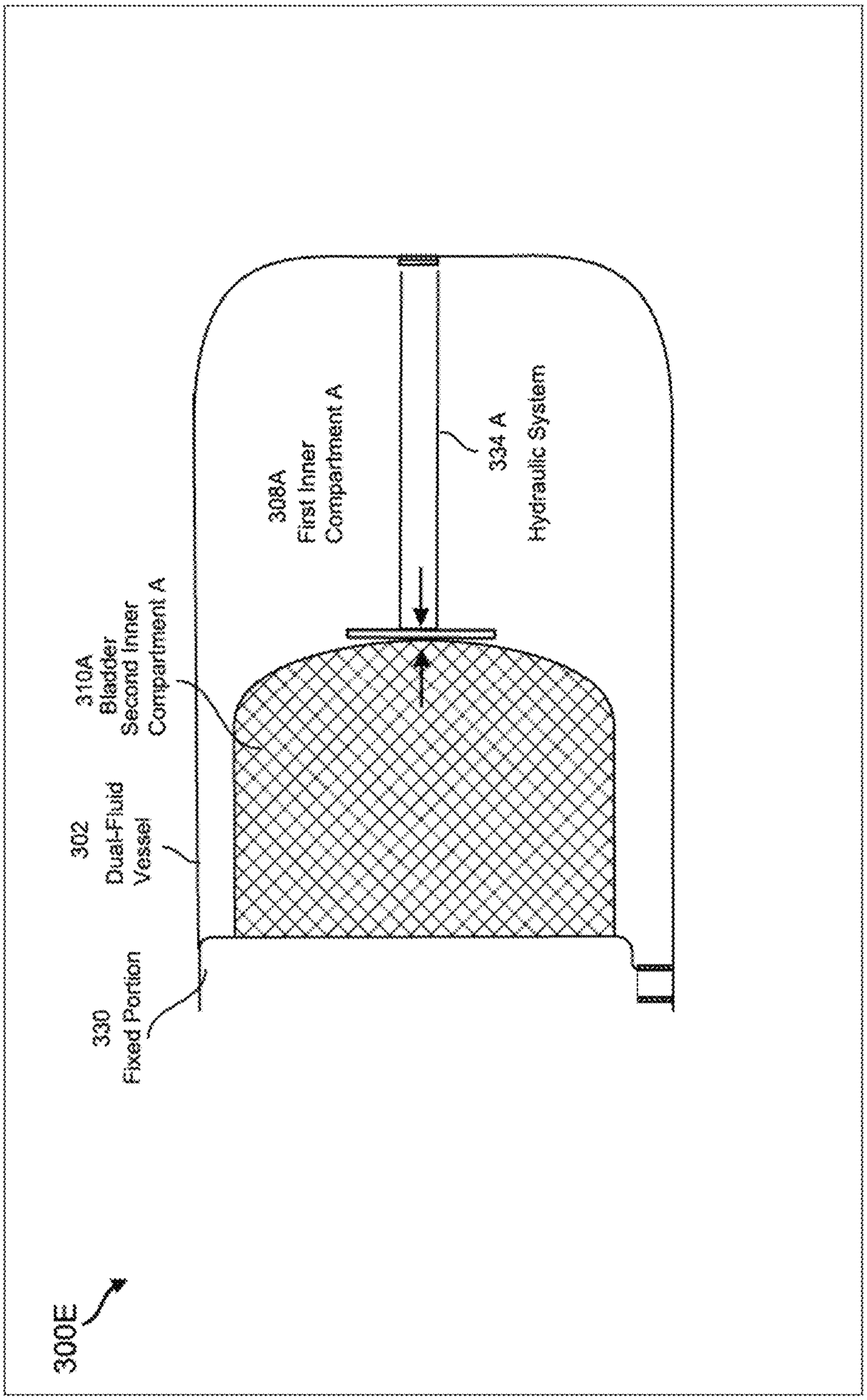
FIG. 3E is a schematic diagram of a fixed portion with a horizontally expandable bladder controlled by a hydraulic system, according to an embodiment of the disclosure.

In other embodiments, system 300D may include a semi-tractor 314 with an attached dual-fluid vessel 302 having a second inner compartment A 310A, a second inner compartment B 310B, a first inner compartment A 308A, a first inner compartment B 308B, a fixed portion 330, and a hydraulic system 334A, 334B or hydraulic subsystem or device, as illustrated in FIG. 3D. In another embodiment, rather than a hydraulic system 334A, 334B or hydraulic subsystem or device, the dual-fluid vessel may include a pneumatic device or electronically controlled device. The second inner compartment A 310A and second inner compartment B 310B may be comprised of two expanding bladders secured to a fixed portion 330 within the outer surface of the dual-fluid vessel 302. The hydraulic system 334A, 334B may further control the bladder dynamics during loading or unloading operations. The hydraulic system 334A, 334B may be controlled by the one or more controllers 320 as a function of bladder 310A, 310B and/or flow of fluids into and/or out of the dual-fluid vessel 302. For example, as the second inner compartment A 310A is filled with fuel, the hydraulic system may retract as the fuel in the second inner compartment A 310A applies pressure to the hydraulic system 334A. As the second inner compartment B 308B rescinds back to a static position, the hydraulic system 334B releases to retract the second inner compartment 310B. A detailed view of the hydraulic system is illustrated in FIG. 3E.

The hydraulic system 334A, 334B or hydraulic subsystem or device may be comprised of various components positioned within and external to the dual-fluid vessel 302. For example, the hydraulic system 334A, 334B may include a reservoir (e.g., to contain an amount of fluid), a pump to power the hydraulic system 334A, 334B, various valves (e.g., to control fluid flow through the hydraulic system 334A, 334B), actuators (e.g., to apply pressure to the bladder), and/or pressure regulators. Similar components may be utilized for pneumatic and/or electronically controlled systems and/or devices. In an embodiment, the actuator of the hydraulic system 334A, 334B may be positioned within the dual-fluid system 302 (as illustrated in FIGS. 3D and 3E). The actuator may connect to the reservoir via conduit, hoses, or pipes, and pumps and/or valves. In an embodiment, the reservoir; conduit, hoses, or pipes; and pumps and/or valves may be positioned external to the dual-fluid vessel 302. Such components may be attached to the transportation vehicle, the exterior of the dual-fluid vessel 302, or a trailer that the dual-fluid vessel 302 is positioned on. In such an embodiment, the conduit, hoses, or pipes may connect to the actuator through the outer surface of the dual-fluid vessel 302.

The fixed portion 330 may be positioned at a center location within the length of the dual-fluid vessel 302. The fixed portion 330 may be positioned to the left of the center location within the length of the dual-fluid vessel 302. The fixed portion 330 may be positioned to the right of the center location within the length of the dual-fluid vessel 302. The two bladders may expand into the first inner compartment A 308A and the first inner compartment B 308B. The second inner compartment A 310A and the second inner compartment B 310B, may fill the space of the first inner compartment A 308A and the first inner compartment B 308B, respectively, when the bladder is expanded. The two bladders may be filled with fuel. The two bladders may be completely filled or partially filled. One of the two bladders may be completely filled or partially filled while the other bladder is empty.

In another embodiment, an air vent may be fixed to the fixed portion 330 to introduce air into the bladder 310A, 310B to avoid cavitation and/or to provide a pressure release (e.g., in case of pressure exceeding the bladder's pressure rating).

Figure 4:
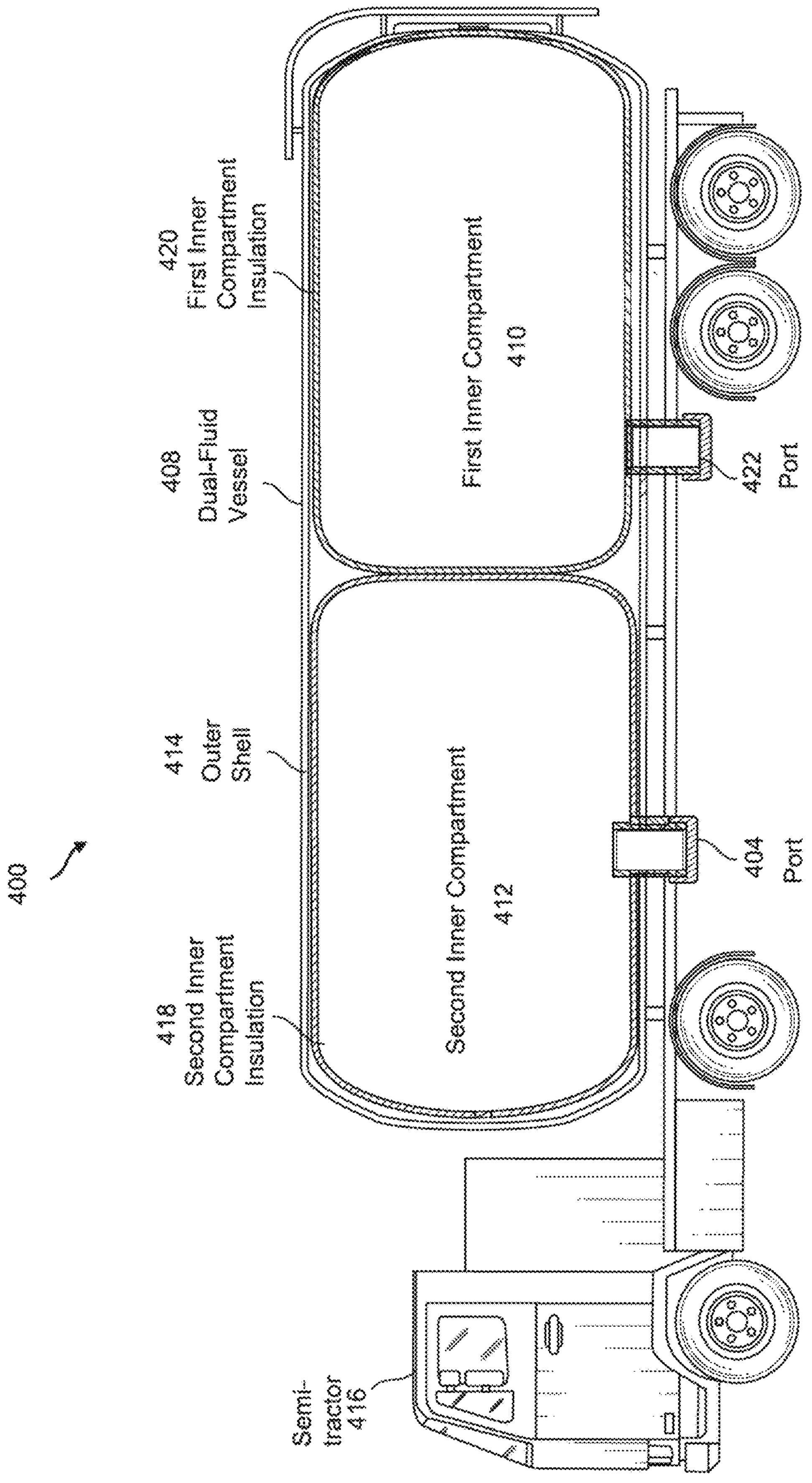
FIG. 4 is a schematic diagram illustration of a semi-tractor with an attached dual-fluid vessel having two fixed inner compartments, according to an embodiment of the disclosure.

In another embodiment, as illustrated in FIG. 4, the semi-tractor 416 may have a dual-fluid vessel 408 having an outer shell 414 including an outer surface. The dual-vessel 408 may have two or more inner compartments including a first inner compartment 410 and second inner compartment 412 positioned within the outer shell 414. The first inner compartment 410 and second inner compartment 412 may be substantially fixed in a position. In other embodiments, an outer insulation 418, 420 may be positioned between the outer surface and the two or more inner compartments to provide temperature regulation for the first and second inner compartments 410, 412.

The first inner compartment 410 and the second inner compartment 412 may be fixed in size within the outer shell 414. The first inner compartment 410 may be sized larger than the second inner compartment 410. The second inner compartment 412 may be sized larger than the first inner compartment 412. The first inner compartment 410 and second inner compartment 412 may be the same size. The dual-fluid vessel 408 may transport the fuel and CO2 simultaneously.

The embodiment of the dual-fluid vessel 408 may further include one or more ports 404, 422. Each of the one or more ports 404, 422 may have an opening in and through the outer shell 414 and a fluid pathway with the first inner compartment 410 or the second inner compartment 412. The one or more ports 404, 422 may provide fluid communication between the first inner compartment 410 and CO2 through the opening for offloading or loading of CO2. Additionally, the port 404 may provide fluid communication between the second inner compartment 412 and fuel through the opening for loading or offloading of the fuel.

Figure 5:
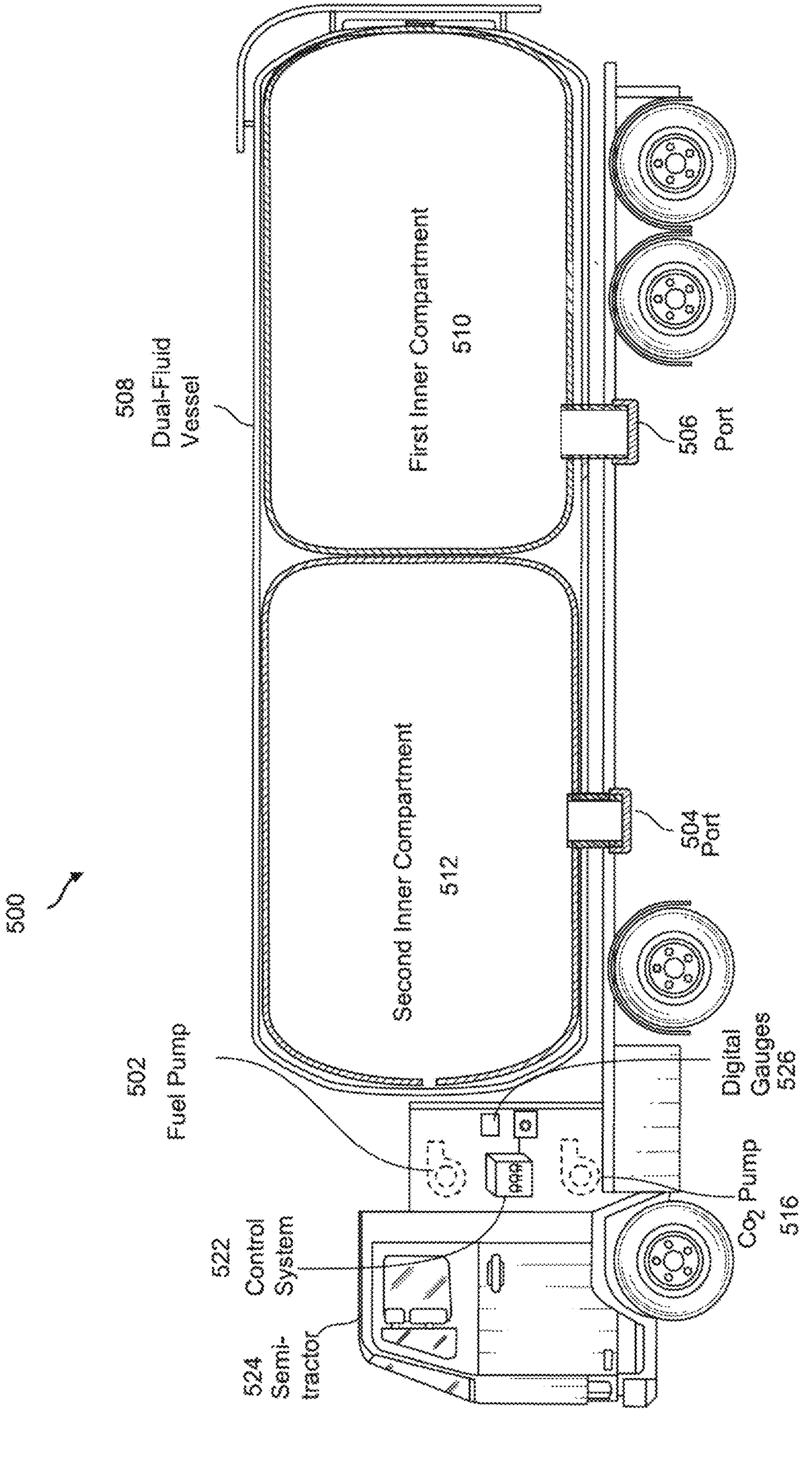
FIG. 5 is a schematic diagram illustration of a semi-tractor with one or more controllers or a control system, pumps, and an attached dual-fluid vessel having two fixed inner compartments, according to an embodiment of the disclosure.

As illustrated in FIG. 5, in one or more embodiments, the dual-fluid vessel 508 may further include a fuel pump 502 that may connect to the second inner compartment 512. In some embodiments, one or more external hoses may connect to the second inner compartment 512. The fuel pump 502 may be used to pump the fuel into the second inner compartment 512. Additionally, the fuel pump 502 may be used to remove the fuel from second inner compartment 510 to the fuel storage tanks at a location. The port 504 extending into the opening in the second inner compartment 512 may be used to offload or load fuel.

In some embodiments, the semi-tractor 524 may also include a CO2 pump 516. One or more external hoses may be used to connect the CO2 storage tanks to fill the first inner compartment 510 with CO2 through the port 506. The one or more external hoses may have a proximal end portion attached to a first adapter and a distal end portion attached to a second adapter. The proximal end portion may be positioned to be in fluid communication therebetween the first inner compartment 510 and the CO2 pump 516. The distal end portion may be positioned to be in fluid communication with CO2 tanks of the one or more storage tanks. The proximal end portion may also be positioned to be in fluid communication therebetween the first inner compartment 510 and the CO2 pump 516. The distal end portion may be positioned to be in fluid communication with CO2 storage tanks. The distal end portion and proximal end of the one or more hoses may include locking mechanisms. The locking mechanisms may ensure the pressure of the CO2 remains above the critical point. In another embodiment, the distal end portion of one of the external hoses may comprise a nozzle connector configured to assist with or enable removal of CO2 from the vessel when positioned in the first inner compartment.

In some embodiments, a CO2 piping may be positioned adjacent to the dual-fluid vessel 508. The CO2 piping may connect to the first inner compartment 510 through an opening extending into the first inner compartment 510. CO2 may be removed from the first inner compartment through the port 506 extending through the outer shell of the dual-fluid vessel 508 into the first inner compartment 510. CO2 may further be removed using the CO2 piping.

The semi-tractor 524 may further contain one or more digital gauges 526. The digital gauges 526 may display one or more of pressures, flow rates, or the compartment level in the two or more inner compartments.

An embodiment of system 500 may further include one or more controllers 522. The one or more controllers 522 may be configured to control the offloading or loading operation of the fuel and CO2. The one or more controllers 522 may include or may be in signal communication with a user interface configured to allow an operator to select offloading/loading operations of the fuel and CO2. The fuel pump 502 in fluid communication with the fuel may be controlled by the one or more controllers 522. Additionally, the CO2 pump 516 in fluid communication with the CO2 may also be controlled by the one or more controllers 522. The one or more controllers 522 may include a fail-safe switch to turn off the fuel pump 502 when the second inner compartment 512 reaches a selected threshold level or pressure. The one or more controllers 522 may further include a fail-safe switch to turn off the fuel pump 502 and the CO2 pump 516 during the offloading process when the compartment level of the first inner compartment 510 reaches a selected threshold level or pressure.

The embodiment of system 500 may include sensors. The sensors may measure some characteristic of the system 500 and communicate the data to the one or more controllers 522. The sensors may send or transmit a signal to the one or more controllers 522, the signal indicative of some characteristic (e.g., temperature, pressure, etc.). The one or more controllers 522 may send an alert to notify an operator when the pressure (e.g., measured or indicated by a sensor) of the first inner compartment 510 and second inner compartment 512 is above a selected threshold or below a selected threshold. The one or more controllers 522 may also send alerts for temperature and level inside the first inner compartment and second inner compartment. The system may further include meters. The meters may monitor the flowrate of the fuel and CO2 during the offloading and loading process. The sensors and meters may be in signal communication with the one or more controllers 522.

Figure 6A:
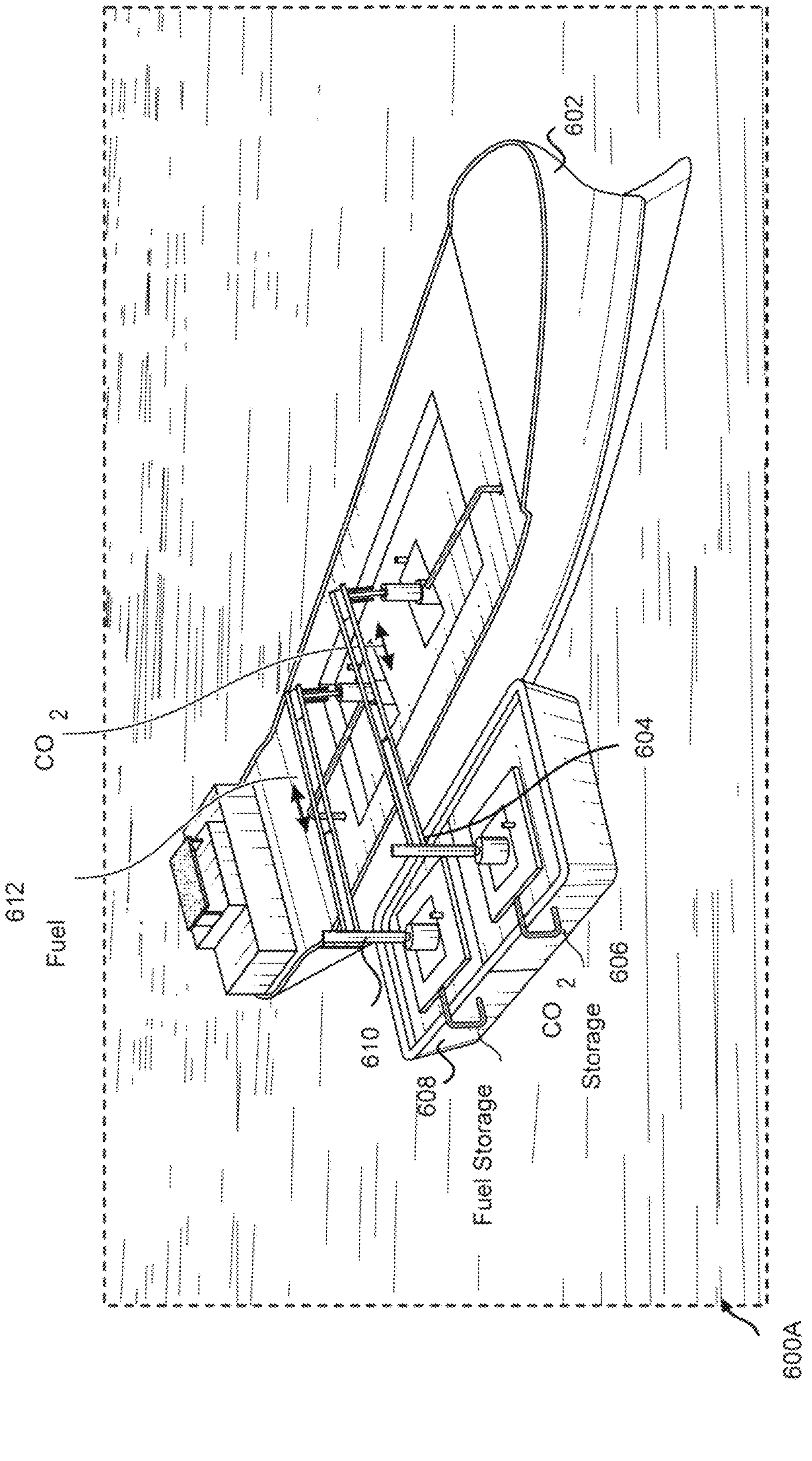
FIG. 6A is a schematic diagram illustration of a marine vessel for transporting fuel and CO2 in a dual-fluid vessel, according to an embodiment of the disclosure.

In other embodiments, the dual-fluid vessel may be positioned on a marine vessel 602, as illustrated in FIG. 6A. The marine vessel 602 may transport the stored fuel and CO2 from the dual-fluid vessel in offshore bunkers to hold for future use or transport to offshore sequestration site(s). In some embodiments, fuel may be offloaded from the second inner compartment 612 on the marine vessel 602 with a stationed pipe 610 connected to the marine vessel 602 that may attach to the fuel storage 608. A fuel pump on the marine vessel 602 may pump the fuel from the second inner compartment 612 to the fuel storage 608. In other embodiments, fuel may be loaded from the fuel storage 608 to the marine vessel 602 into the fuel bunker 612. In another embodiment, the second inner compartment may be a bladder. In other embodiments, the second inner compartment 612 and the first inner compartment 614 may be filled with fuel. In some embodiments, the second inner compartments 612 may be a bladder. The bladder may expand to fill the first inner compartment 614.

In some embodiments, CO2 may be offloaded from the CO2 bunker 606 on the marine vessel 602 with a stationed pipe 604 connected to the marine vessel 602 that may attach to the CO2 storage 606. A CO2 pump on the marine vessel 602 may pump the CO2 from the first inner compartment 606 to the CO2 storage 614. In other embodiments, CO2 may be loaded from the CO2 storage 606 to the marine vessel 602 into the first inner compartment 614. In another embodiment, the first inner compartment 614 and the second inner compartment 612 may be filled with CO2.

In some embodiments, the transportation vehicle, e.g., the marine vessel 602, may be configured to carry both fuel and CO2 at separate times in the same tank. In this embodiment, the dual-fluid vessel may comprise an inner compartment. The inner compartment may be the entire dual-fluid vessel.

The transportation vehicle may transport fuel in the inner compartment to a location. One or more external hoses may be used to offload the fuel from the inner compartment. Nitrogen may be used between offloading the fuel and loading the CO2 to purge the inner compartment of any remaining fuel.

Figure 6B:
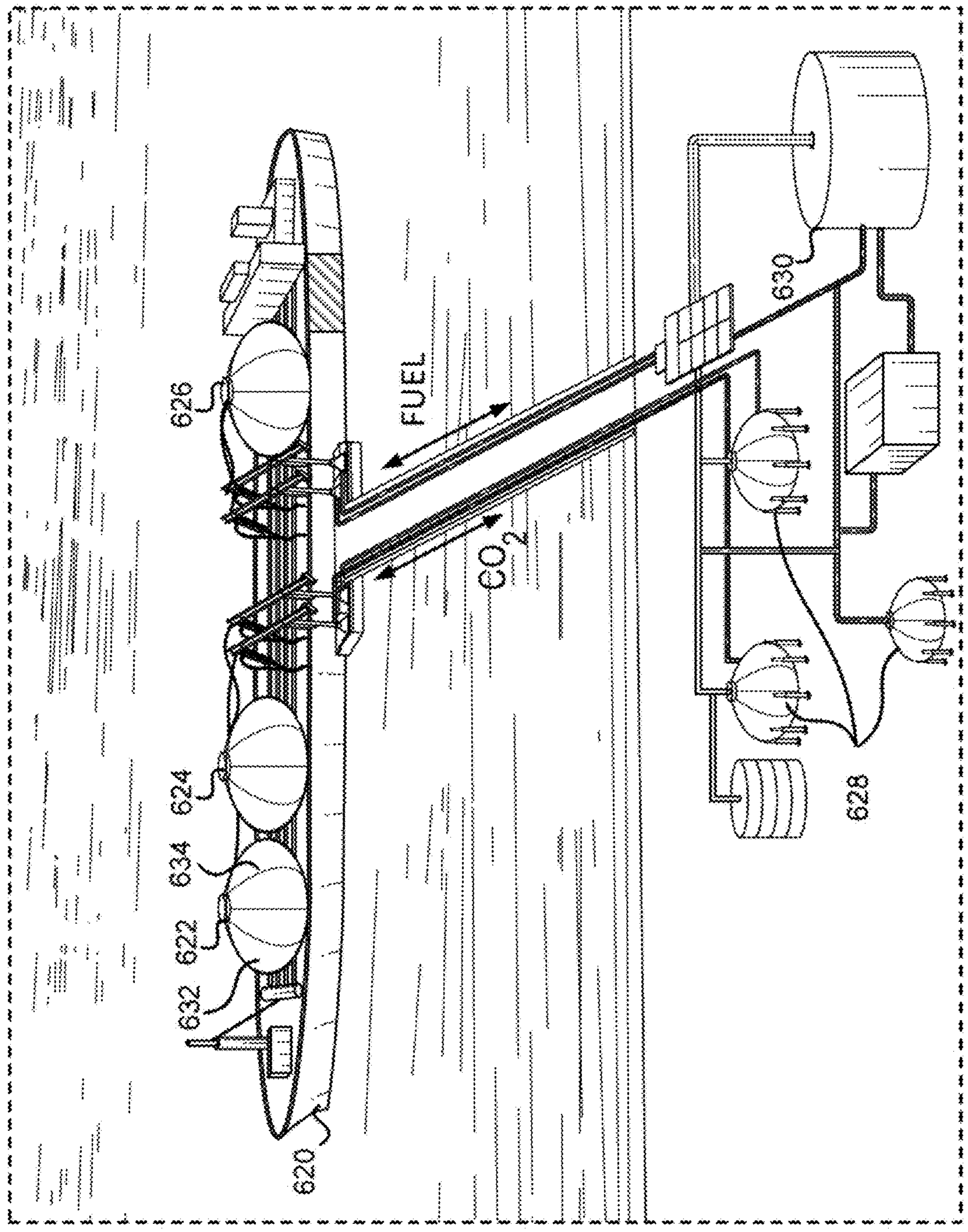
FIG. 6B is a schematic diagram illustration of a LNG vessel for transporting fuel and CO2 in a dual-fluid vessel, according to an embodiment of the disclosure.

According to an embodiment of the present disclosure, the marine vessel 620, including one or more dual-fluid vessels 622, 624, 626, may transport fuel and carbon dioxide as illustrated in FIG. 6B. The one or more dual-fluid vessels 622, 624, 626 may each have an outer shell including an outer surface. The one or more dual-fluid vessels 622, 624, 626 may further include two or more inner compartments including a first inner compartment 634 and a second inner compartment 632 positioned within the outer shell. The one or more dual-fluid vessels 622, 624, 626 may be compatible with liquefied natural gas (LNG), liquefied petroleum gas (LPG), or other liquid fuel and CO2. The one or more dual-fluid vessels 622, 624, 626 may be designed having high-pressure bearing capacity and lower inner temperature, which may include fully pressurized vessel(s), semi-pressurized and refrigerated vessel(s), and fully refrigerated vessel(s). The one or more dual-fluid vessels 622, 624, 626 may be designed with multiple spherical tanks, self-supporting prismatic tank(s), membranes, waffles, or barriers which could be constructed with Invar, Triplex, and other suitable alloys. The one or more dual-fluid vessels 622, 624, 626 may be designed to handle both LNG or other liquid fuel and CO2, whereas nitrogen or another inert gas may be used to displace residual LNG or other liquid fuel after unloading and prior to filling the vessel with CO2. Such embodiments may include transportation across domestic and foreign boundaries.

In an embodiment, the marine vessel 620 may be a Moss type vessel (e.g., as illustrated in FIG. 6B). or a membrane type vessel. The Moss type vessel may include one or more tanks. As noted, the tanks may be dual-fluid vessels configured to hold or contain different fuels, liquids, or gases, as well as liquid CO2. In another embodiment, the Moss type vessel may include a number of tanks (e.g., three tanks, four tanks, five tanks, etc.). In such an embodiment, one or more of the tanks may be configured to hold or contain different fuels, liquids, or gases, as well as liquid CO2. In other words, the pressure and/or temperature rating for those tanks may be higher or lower than other tanks on the Moss type vehicle. However, such dual-fluid tanks may include an increased weight (e.g., due to materials used to construct those tanks). In a further embodiment, those tanks may be comprised of stainless steel, while the remaining tanks may be comprised of aluminum. Since stainless steel is heavier than aluminum, the dual-fluid tanks may be positioned at selected portions of the Moss type vessel to evenly distribute the additional weight. For example, the second and fourth tanks of five total tanks may be comprised of stainless steel, while the first, third, and fifth tanks may be comprised of aluminum. In such embodiments, all the tanks may be filled for a fuel delivery operation (e.g., filled with LNG, LPG, or other fluids). After delivering those fuels, the two stainless steel tanks (e.g., which may be configured to withstand higher pressure and/or lower temperatures than that of an aluminum tank) may be filled with liquid CO2 for transport to a selected location.

In another embodiment, the CO2 may be offloaded from the marine vessel 620 at a port (e.g., as illustrated in FIG. 6B) or at a preselected off-shore CO2 sequestration site. The preselected off-shore CO2 sequestration site may comprise a platform or abandoned offshore drilling rig. The marine vessel 620 may offload the CO2 to the platform or abandoned offshore drilling rig, causing the CO2 to flow into an abandoned well and/or designated CO2 sequestration formation.

Figure 7:
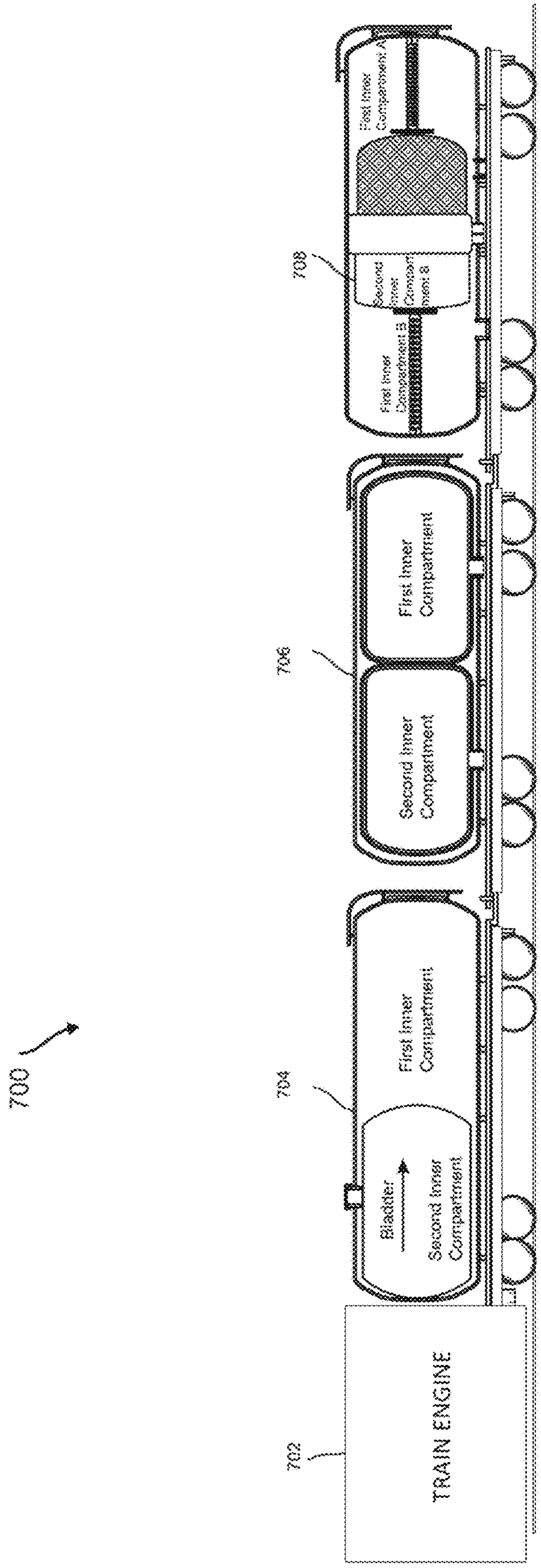
FIG. 7 is a schematic diagram illustration of a rail locomotive for transporting fuel and CO2 in a dual-fluid vessel, according to an embodiment of the disclosure.

In another embodiment, the dual fluid vessel may be positioned on a rail locomotive 706, as illustrated in FIG. 7. The rail locomotive 700 may transport fuel and CO2 in a dual-fluid vessel 704, 706, 708 to another location. In the embodiment, the second inner compartment may be a bladder. The bladder may contain fuel. The bladder may expand to fill the first inner compartment In other embodiments, the second inner compartment and the first inner compartment may be filled with fuel. In another embodiment, the first inner compartment and the second inner compartment may be filled with CO2. In some embodiments, the first inner compartment may be filled with CO2, nitrogen, or an inert gas.

Figure 8A:
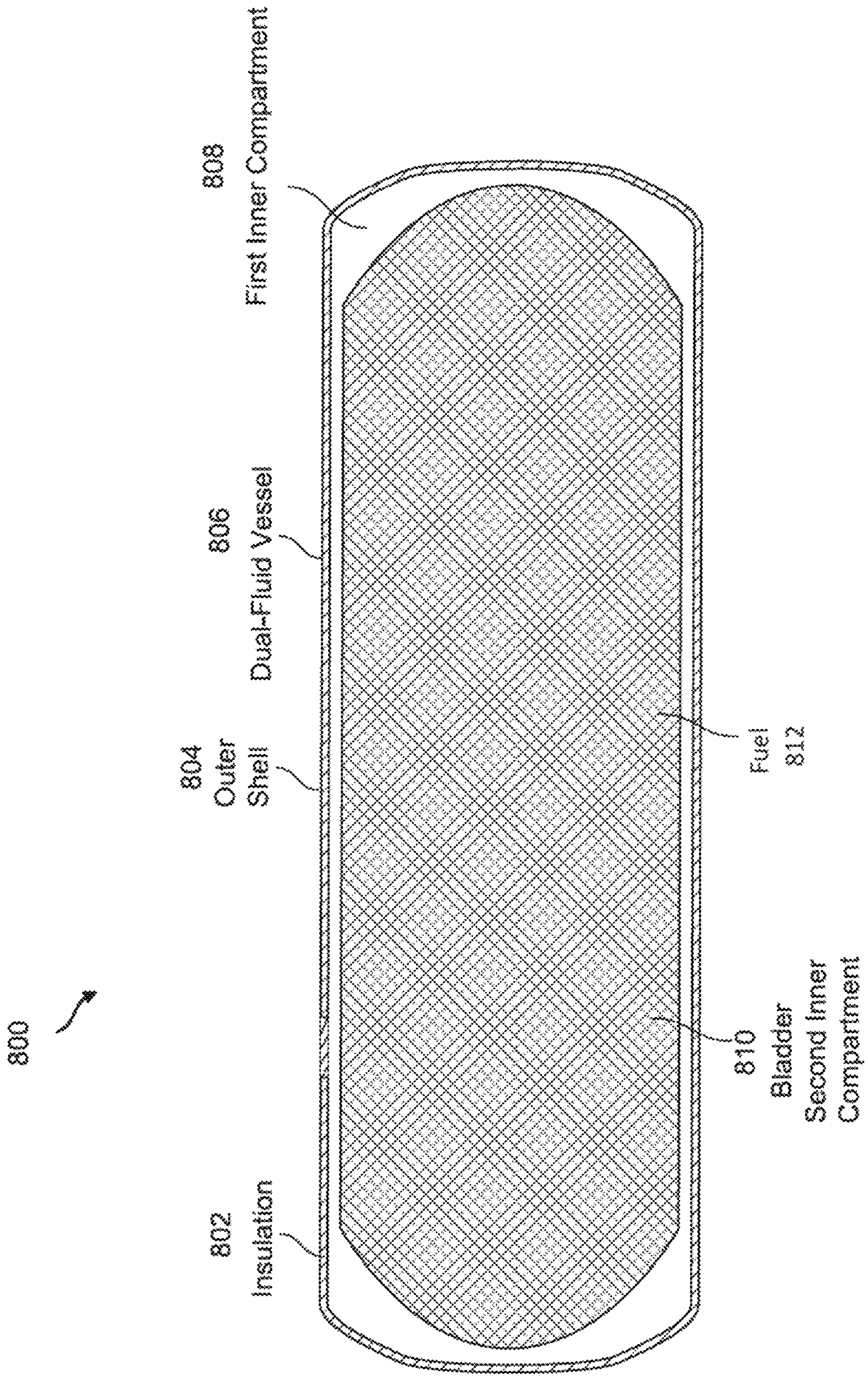
FIG. 8A is a schematic diagram illustration of a dual-fluid vessel with an expanded partially-full bladder of fuel, according to an embodiment of the disclosure.

In some embodiments, the bladder of the second inner compartment 810 is full, as illustrated in FIG. 8A. In the embodiment, the first inner compartment 808 may not contain CO2 during transportation to a location to supply a location with fuel. After offloading such fuel, the first inner compartment 808 may be filled with CO2. When the bladder is filled with fuel 812, the fuel 812 may fill a majority or substantially all of the space defined within the outer shell 804. The dual-fluid vessel may further be surrounded by insulation 802 to control temperature within the second inner compartment 810 and for the first inner compartment 808.

Figure 8B:
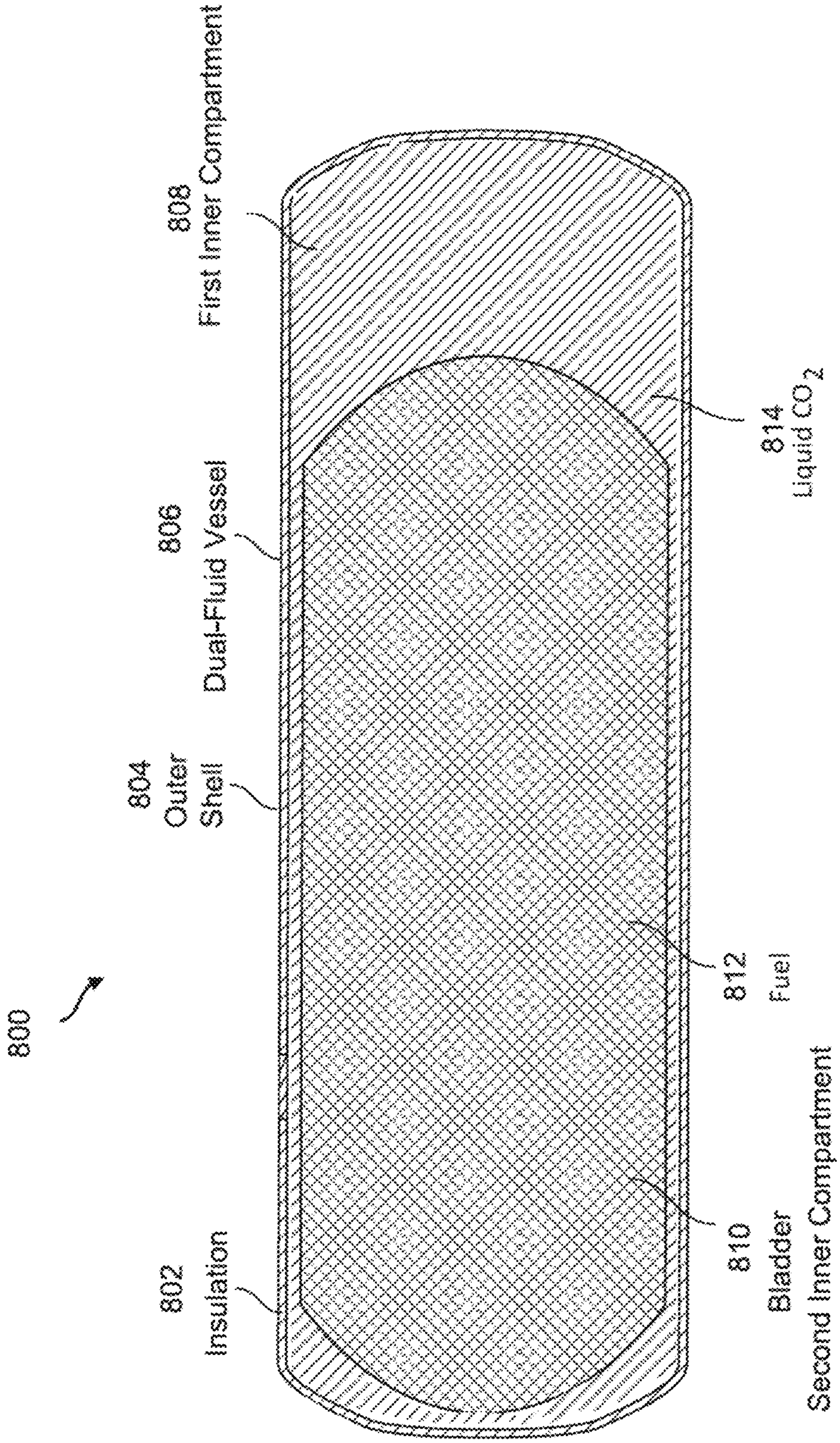
FIG. 8B is a schematic diagram illustration of a dual-fluid vessel with an expanded partially-full bladder of fuel and liquid CO2 in the first inner compartment, according to an embodiment of the disclosure.

In other embodiments, the dual-fluid vessel 806 may contain fuel 812 and liquid CO2 814, as illustrated in FIG. 8B. In such an embodiment, the bladder may be partially filled with fuel 812. The bladder of the second inner compartment 810, may contract, rescind in size, retract, or shrink as the fuel 812 is offloaded into the fuel storage tanks. Offloading the fuel 812 may occur simultaneously or substantially simultaneously as the first inner compartment 808 is filled with liquid CO2 814, emptying the space within the bladder 810 as the bladder 810 contracts, rescinds, retracts, or shrinks.

Figure 8C:
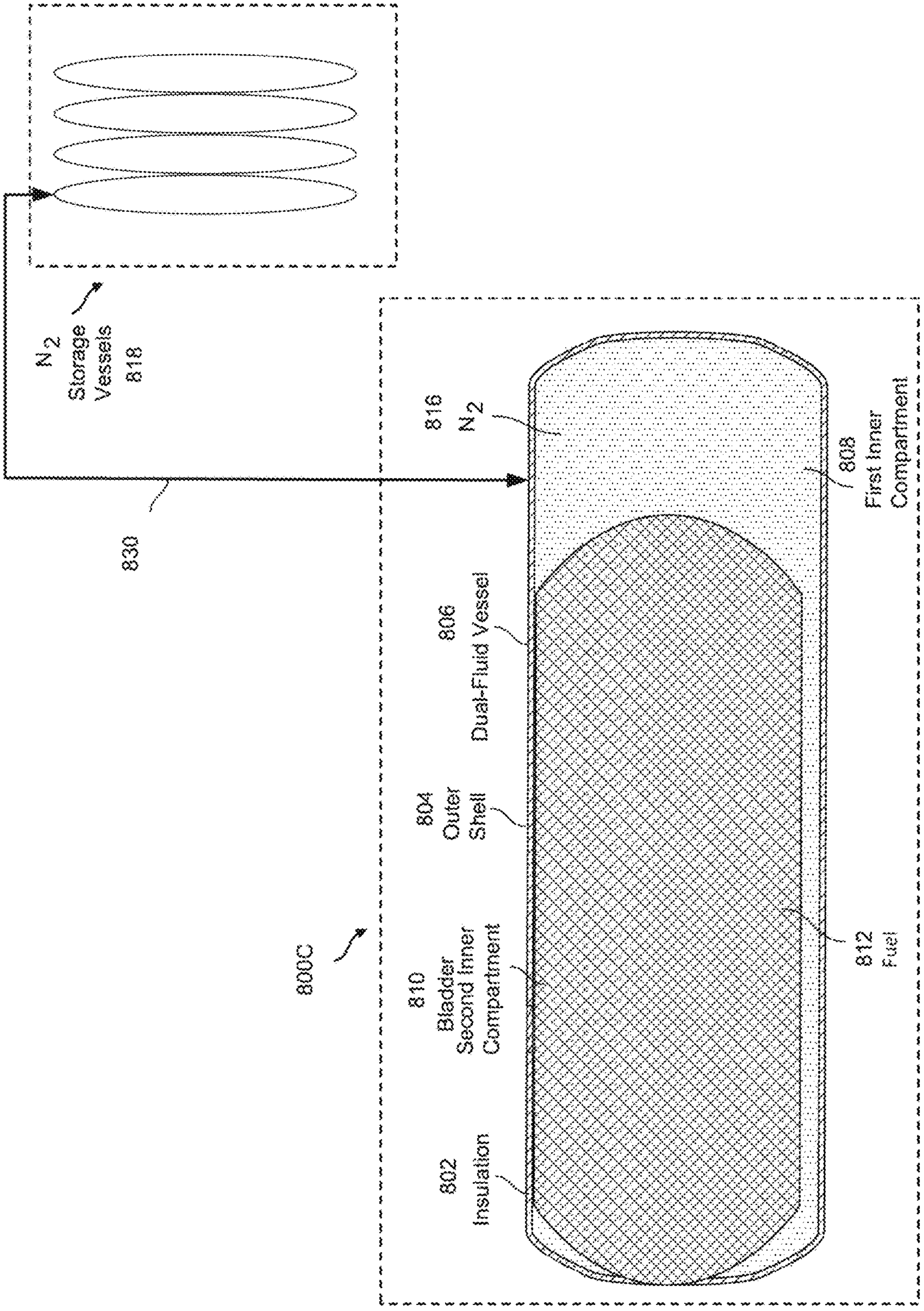
FIG. 8C is a schematic diagram illustration of a dual-fluid vessel with an expanded partially-full bladder of fuel and nitrogen in the first inner compartment filled with external nitrogen storage vessels, according to an embodiment of the disclosure.

In some embodiments, the dual-fluid vessel 806 in system 800C, may contain fuel 812 and nitrogen (N2), as shown in FIG. 8C. The bladder of the second inner compartment 810, may contract, rescind in size, retract, or shrink as the fuel 812 is offloaded into the fuel storage tanks. At this time, the pressure in the bladder 810 may be greater than the pressure in the first inner compartment 808. In such an embodiment, the bladder of the second inner compartment 810 may be filled with fuel 812. As the bladder contracts, rescinds in size, retracts, or shrinks, the first inner compartment 808 may be filled with N2 816, filling the space of the bladder as the bladder rescinds in size, retracts, or shrinks. The addition of N2 816 equalizes the pressure between the first inner compartment 808 and the second inner compartment 810 when the first inner compartment 808 is not filled with CO2. N2 816 may be loaded into the dual-fluid vessel 806 from nitrogen storage vessels 818 stored at the location and connected through a fluid conduit 830 to the first inner compartment 808. The fluid conduit 830 may directly connect to the dual-fluid vessel 806. The fluid conduit 830 may have bi-directional flow to and from the first inner compartment 808 and the nitrogen storage vessels 818. In these embodiments, the nitrogen 816 may be used to purge the first inner compartment 808 of any residual fluid that previously filled the first inner compartment 808. In some embodiments, the first inner compartment 808 may be filled with fuel. The fuel may include liquids and/or solids. To prevent cross-contamination of different fuels, nitrogen may purge first inner compartment 808 after offloading of fuel. The outer shell 804 of the dual-fluid vessel 806 may also be surrounded by insulation 802.

Figure 8D:
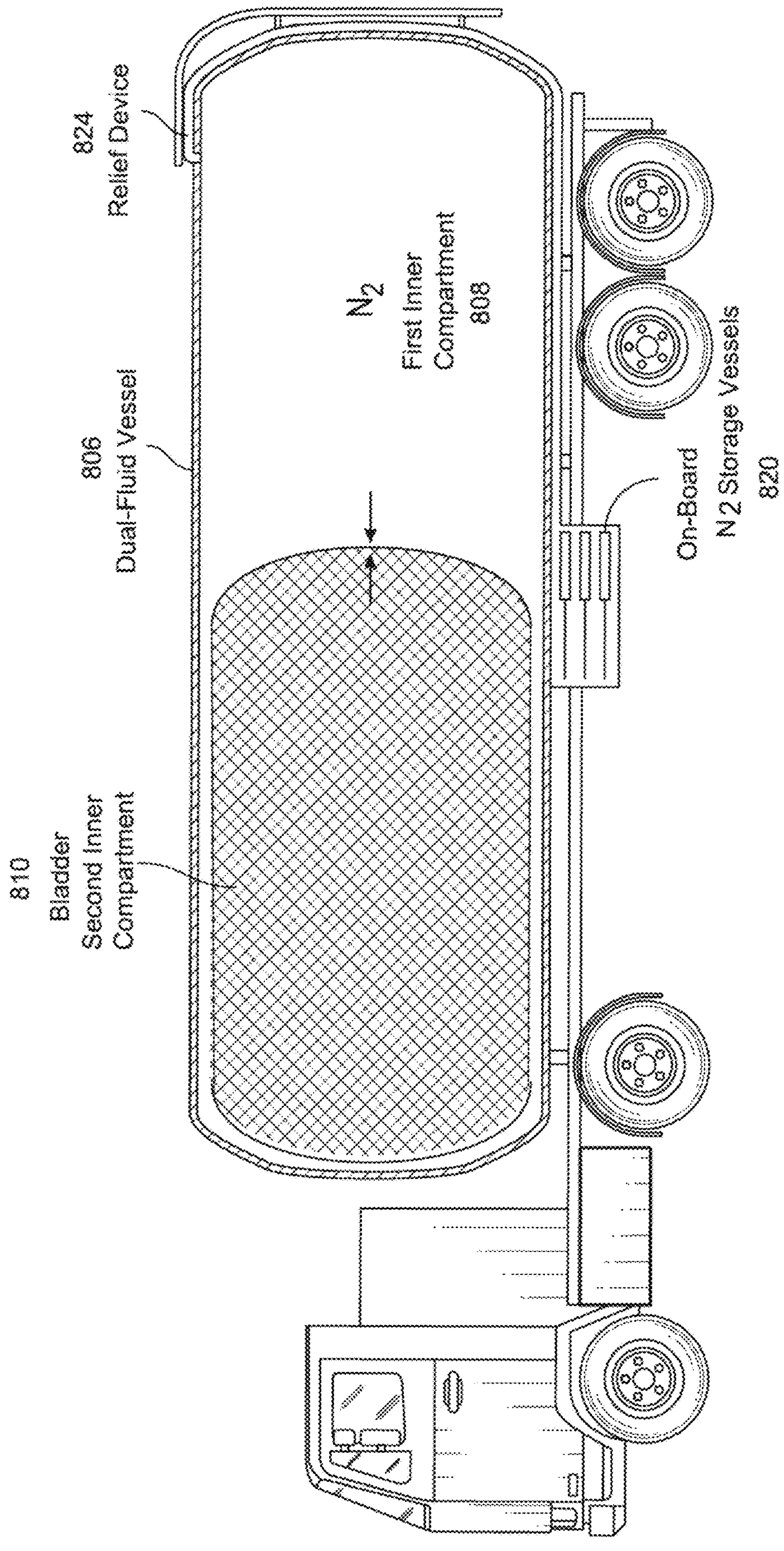
FIG. 8D is a schematic diagram illustration of a semi-tractor having a dual-fluid vessel with an expanded partially-full bladder of fuel and nitrogen in the first inner compartment filled with on-board nitrogen storage vessels, according to an embodiment of the disclosure.

In other embodiments, on-board N2 storage vessels 820 may supply N2 to the first inner compartment 808 from nitrogen storage vessels 818 located on the semi-tractor, as illustrated in FIG. 8D. The N2 816 may equalize the pressure between the second inner compartment 810 and the first inner compartment 808 when the first inner compartment 808 does not contain CO2. N2 816 may be recycled back to the on-board N2 storage vessels 820 when the second inner compartment 810 is emptied. A pressure relief device 824 may be positioned on the dual-fluid vessel 806.

Figure 9A:
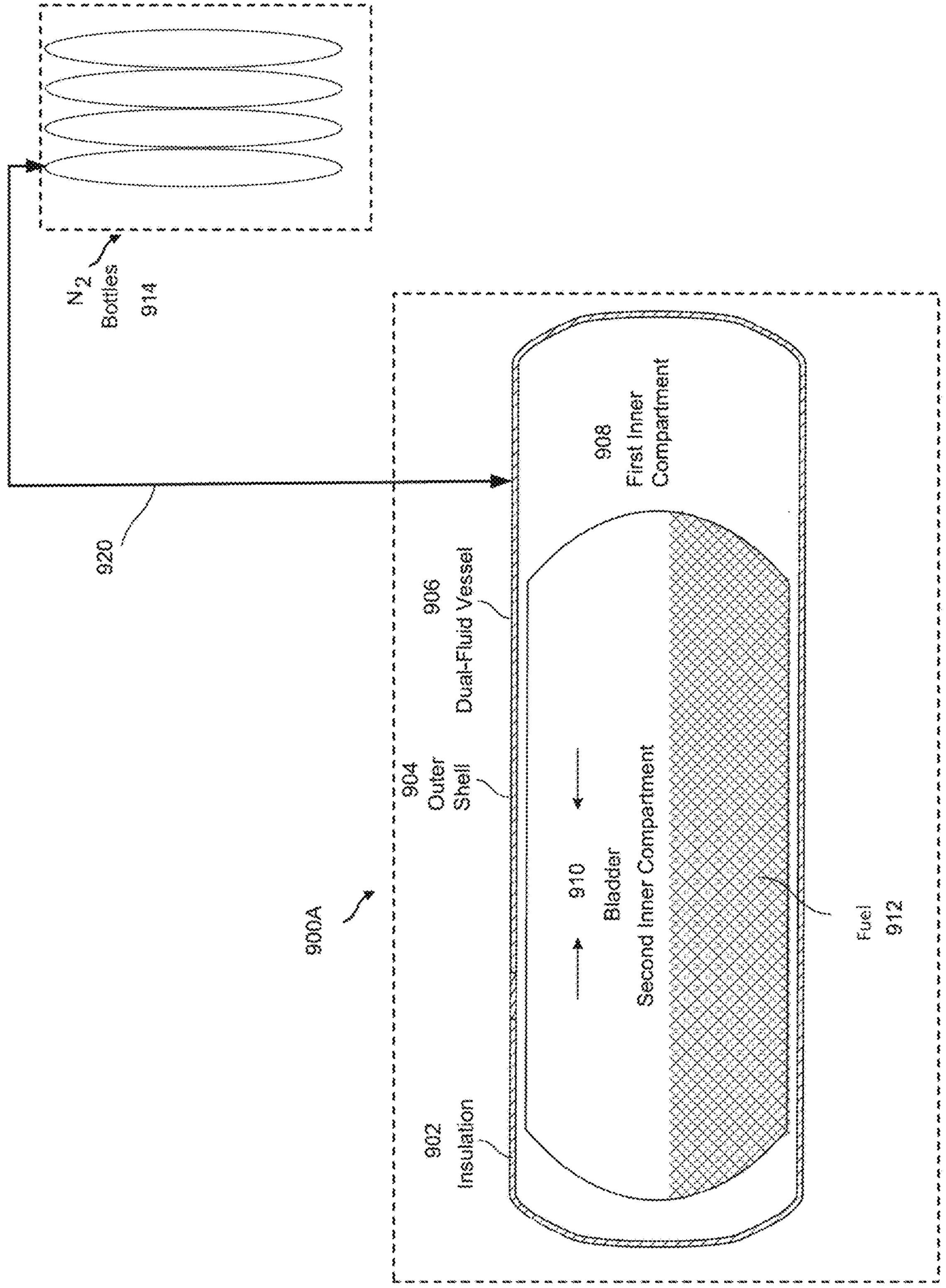
FIG. 9A is a schematic diagram illustration of a dual-fluid vessel with a partially-full bladder of fuel and a first inner compartment with a negligible amount of N2, according to an embodiment of the disclosure.

In one or more embodiments, the dual-fluid vessel 906 in system 900A, may have a bladder 910 that is partially full, as shown in FIG. 9A. During transport, a bladder 910 that is partially full may move (e.g., the fluid within the bladder 910 may move around irregularly, in any direction, based on a transportation vehicles direction and speed, in other words the liquid may slosh within the bladder 910) around the dual-fluid vessel 906. Without CO2 in the first inner compartment 908, the movement of the fluid within the bladder 910 may cause an imbalance of the transportation vehicle or inadvertent wear of the bladder 910. To minimize such movement of the fuel 912 inside the bladder 910, thereby stabilizing the bladder 910, nitrogen storage vessels 914 at the location may be connected through a fluid conduit 920 or pipe to the first inner compartment 908. The fluid conduit 920 may directly connect to the dual-fluid vessel 906. The fluid conduit 920 may have bi-directional flow to and from the first inner compartment 908 and the nitrogen storage vessels 914. Nitrogen may also be supplied to the vessel from on-board nitrogen storage vessels located on the transportation vehicle.

In other embodiments, the bladder 910 may have or include specific material and engineering properties to safely store fuel. The bladder 910 may contain or include fail safe controls. The bladder 910 may be tested e.g., cycled between a retracted and expanded state thousands of times, to ensure the bladder 910 is capable of withstanding extended use. In some embodiments, the bladder 910 may have a sensor embedded within the material to provide wear patterns, properties, etc. on and within the outer surface.

In some embodiments, the N2 volume may be controlled by a control board and logic and/or a controller as a function of the volume, pressure, temperature, and material of fuel 912 within the bladder 910 which is measured and known. The control board or controller may calculate the volume of N2 for the first inner compartment 908 to equalize the pressure within 906 by filling the first inner compartment 908 with N2. Filling the second compartment 910 with a selected volume of N2 may occur automatically based on the control board or controller calculations. In other embodiments, the dual-fluid vessel 906 may further include a pressure relief device that vents to the atmosphere.

Figure 9B:
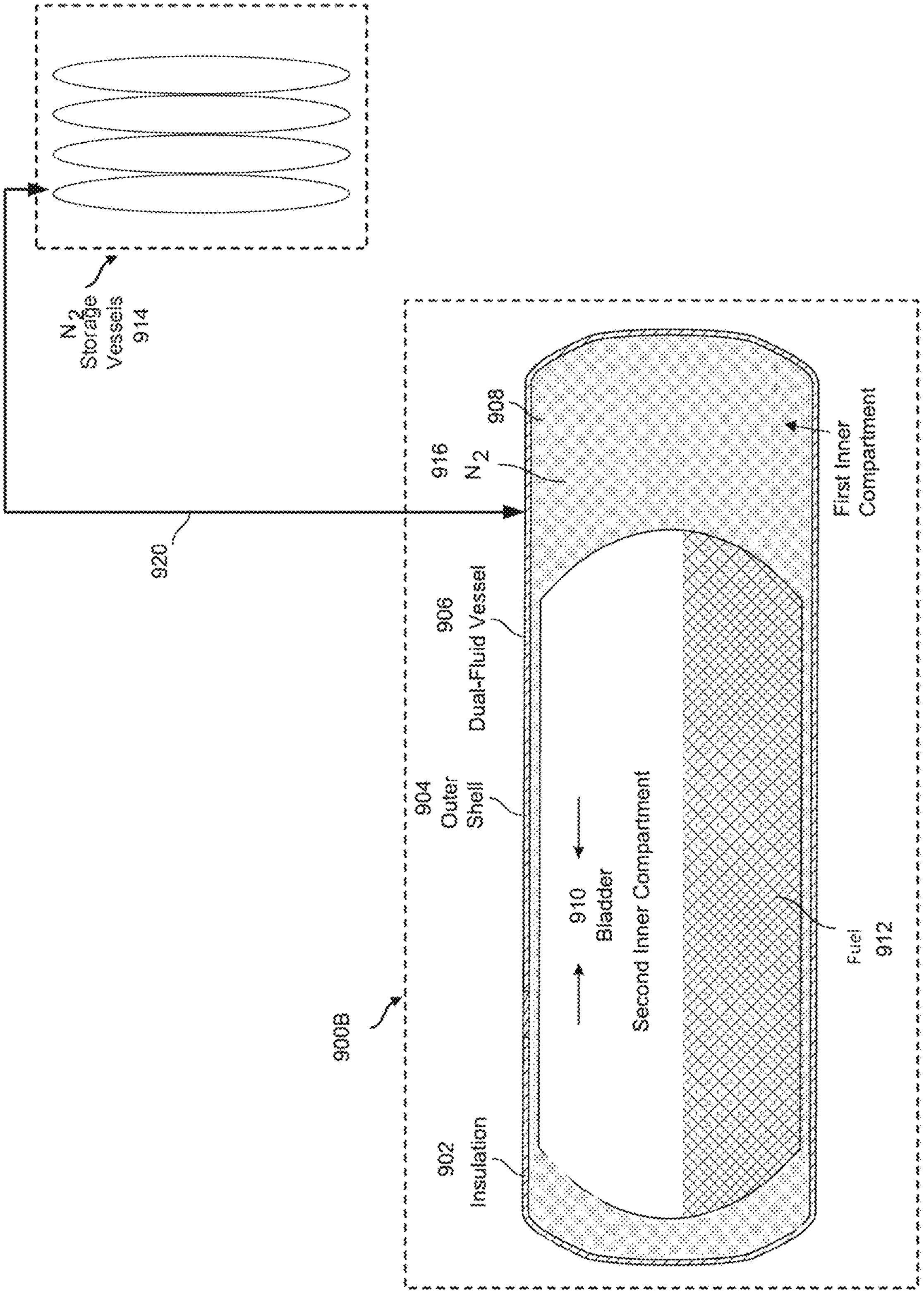
FIG. 9B is a schematic diagram illustration of a dual-fluid vessel with a partially-full bladder of fuel and nitrogen in the first inner compartment, according to an embodiment of the disclosure.
Figure 9C:
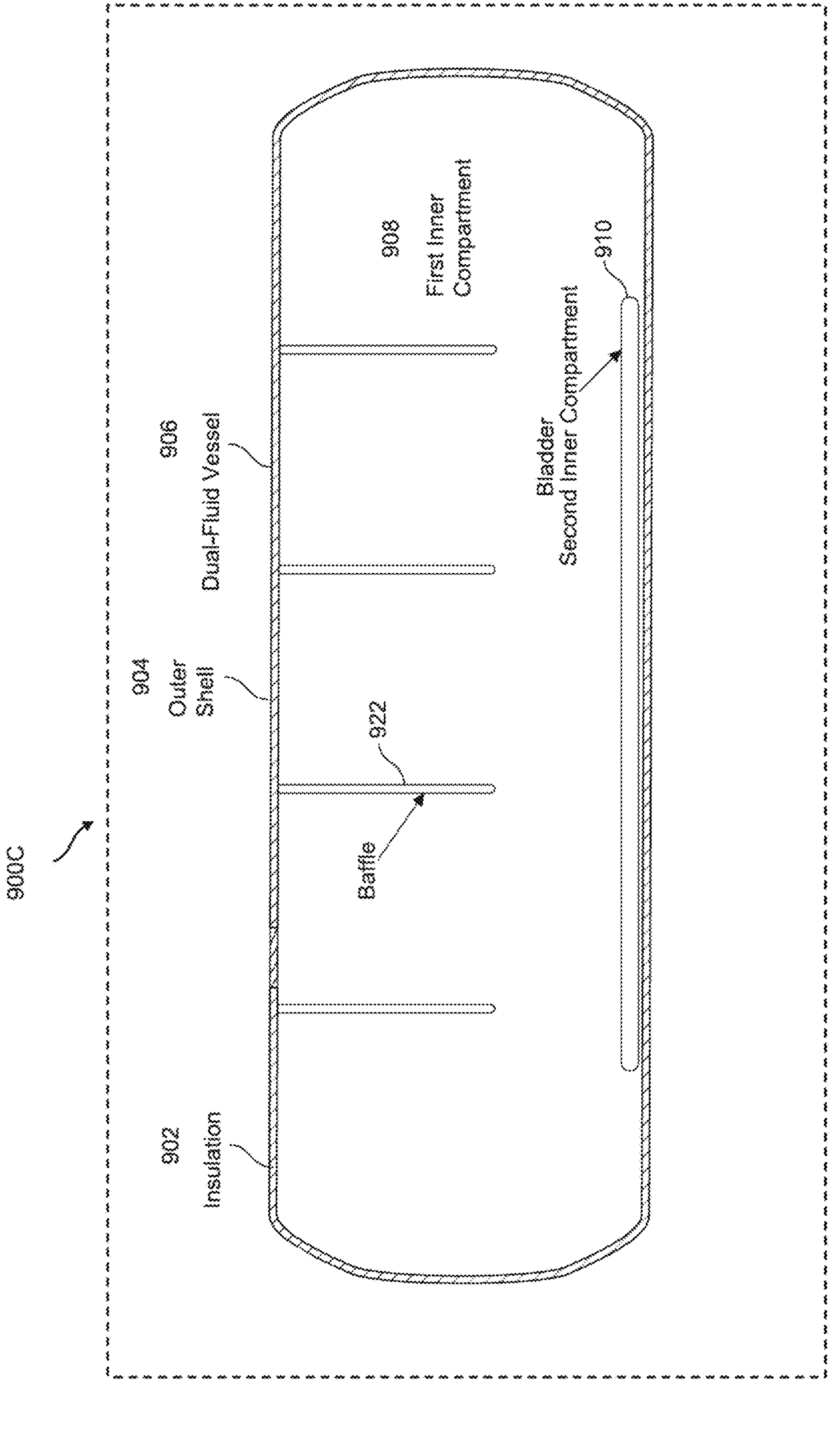
FIG. 9C is a schematic diagram illustration of a dual-fluid vessel with a partially-filled or empty bladder of fuel in the first inner compartment, according to an embodiment of the disclosure.
Figure 9D:
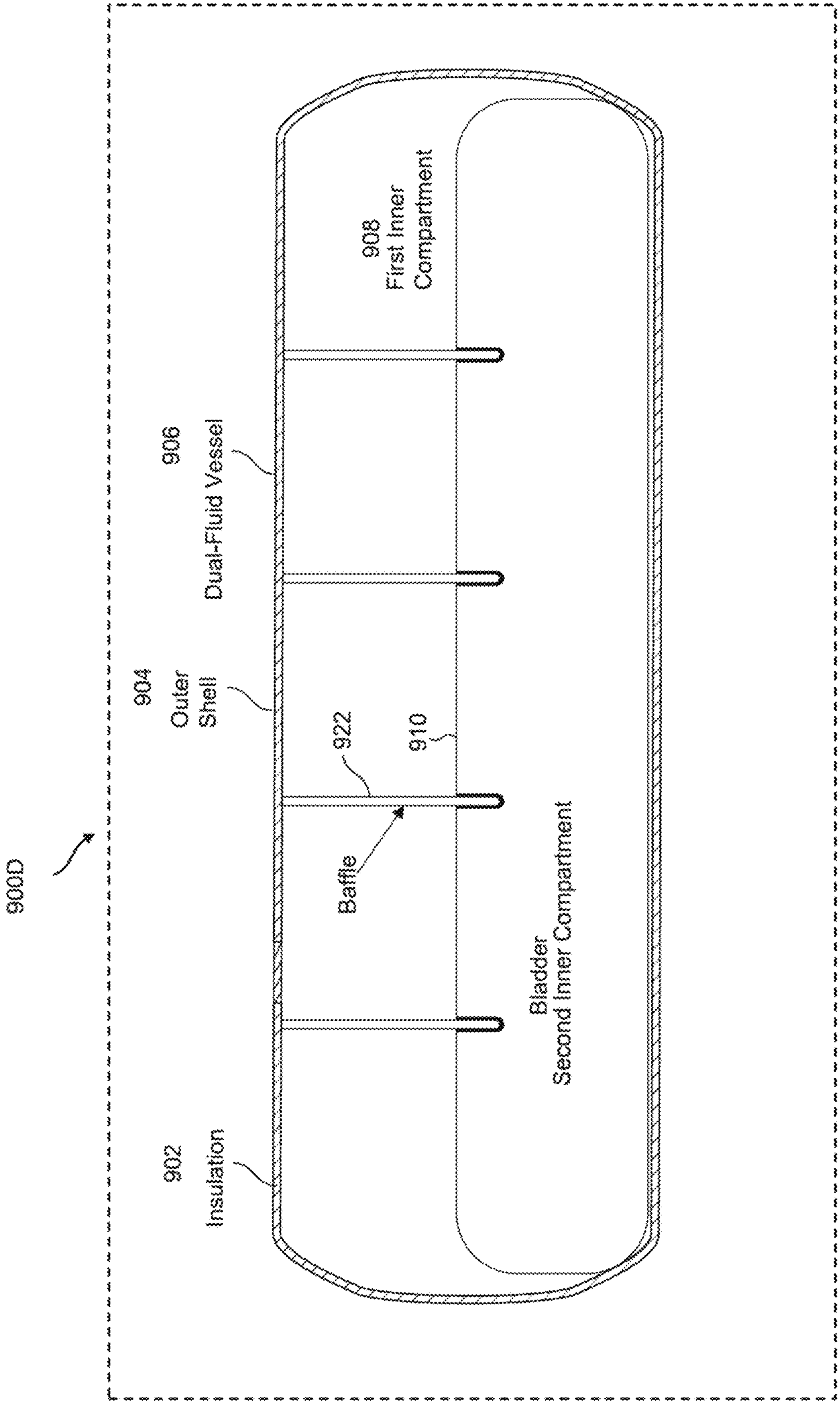
FIG. 9D is a schematic diagram illustration of a dual-fluid vessel with a partially-filled bladder of fuel in the first inner compartment, according to an embodiment of the disclosure.

As illustrated in FIG. 9C and 9D, baffles 922 may be positioned within the outer shell to reduce movement of fluid within the dual-fluid vessel. As the bladder 910 expands within the dual-fluid vessel 902, the bladder 910 may expand around the each of the baffles 922, thus preventing a partially filled bladder 910 from moving as a transportation vehicle transports the dual-fluid vessel 902. The baffles 922 may be installed along the upper wall or portion of the outer shell 904 of the dual-fluid vessel 902. The baffles 922 may be fixedly or removably attached to the upper wall or portion of the outer shell 904 of the dual-fluid vessel 902. The 922 baffles may be configured to allow the bladder 910 to expand around the baffles. The baffles 922 may include rollers to aid the bladder 910 in expanding around the baffles 922. The baffles 922 may be solid bars or rods comprised of a material (e.g., plastic or metal) that is configured to withstand exposure to fuel and/or CO2, low temperatures, and/or high and/or low pressure. In an embodiment, the dual-fluid vessel may include one baffle, two baffles, three baffles, four baffles, or more. In yet another embodiment, each of the baffles 922 may include holes or apertures positioned at varying locations of each of the baffles 922. The holes or apertures of each of the baffles 922 may allow for fluid flow between each of the baffles 922.

In FIG. 9B, the dual-vessel 906 in system 900B may have or include a bladder 910 that is partially full and surrounded by nitrogen 916 in the first inner compartment 908. The nitrogen 916 may stabilize the bladder 910 partially filled with fuel 912. Nitrogen 916 may be supplied to the first inner compartment 908 through a fluid conduit 920 that is directly connected to the dual-fluid vessel 906. The fluid conduit 920 may have bi-directional flow to and from the first inner compartment 908 and the nitrogen storage vessels 914. In other embodiments, the pressure from the nitrogen 916 may displace the fuel 912 from the bladder 910 into the fuel storage tanks at the location. A control valve may control the flow from the bladder into the fuel storage tanks. In some embodiments, one or more external hoses may connect to the bladder 910 to direct the flow from the bladder 910 into the fuel storage tanks. In this embodiment, the system may utilize pressure and gravity to move the fuel 912. In other embodiments, fuel pumps may move the fuel 912 into the storage tanks.

Figure 10:
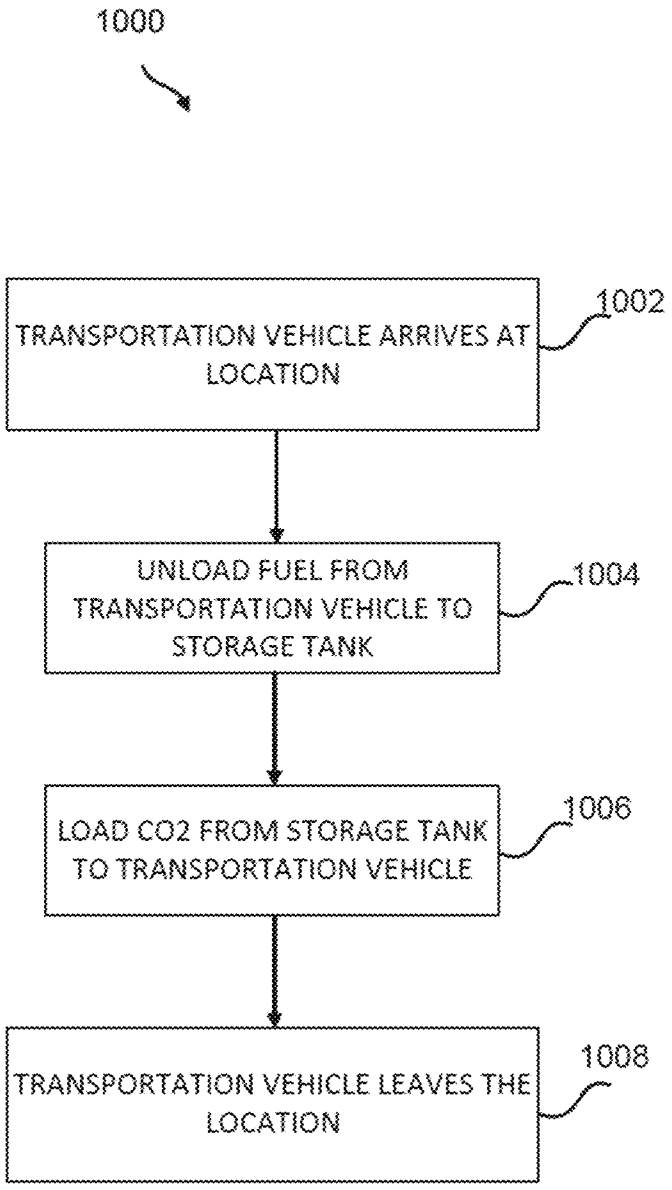
FIG. 10 is a simplified block diagram for transporting a fuel and carbon dioxide, according to an embodiment of the disclosure.

In one or more embodiments, the present disclosure is directed to a method of offloading or loading fuel and CO2 at a location. FIG. 10 is a simplified block diagram for transporting fuel and CO2. As described in the present disclosure, blocks 1002, 1004, 1006, and 1008 are not required to be executed in order. The blocks may be performed at different times or simultaneously. At block 1002, the method begins with a transportation vehicle with an attached dual-fluid vessel arriving at a location. The dual-fluid vessel may be filled with fuel. The transportation vehicle may arrive empty to the location.

At block 1004, the fuel may be offloaded from the transportation vehicle. In one or more embodiments, one or more external hoses may be used to connect the dual-fluid vessel to fuel storage tanks at the location. In other embodiments, a pump may be used to remove the fuel from the dual-fluid vessel and into the fuel storage tanks.

At block 1006, CO2 may be loaded into the transportation vehicle. In one or more embodiments, one or more external hoses may be used to connect the dual-fluid vessel to the CO2 storage tanks. In other embodiments, a pump may be used to remove the CO2 from the CO2 storage tanks and into the dual-fluid vessel. At block 1008, the transportation vehicle may leave the location, transporting the CO2 to another location. In some embodiments, the transportation vehicle leaves the location with fuel and the CO2.

In another embodiment, a controller or one or more controllers may determine an amount of CO2 in the first inner compartment (e.g., via a sensor or meter) and an amount of fuel in the second inner compartment (e.g., via another sensor or meter). The controller or one or more controllers may initiate an operation to fill the one or more fuel storage tanks at a location or determine whether the operation to fill the one or more fuel storage tanks at the location is initiated. Based on such an initiation and the fuel tank level, the controller may send a signal to a fuel pump to begin pumping an amount of fuel from the second inner compartment to the one or more fuel storage tanks at the location. The removal of fuel from the second inner compartment may cause the second inner compartment to contract. Further, the controller may initiate loading of an amount of the CO2 into the first inner compartment, based on the amount of fuel in the second inner compartment and the current amount of CO2 in the first inner compartment.

FIG. 11 is a flow diagram of an embodiment of a method for offloading/loading the fuel and CO2 at a location. The method, for example, also is described with reference to system 200 of FIG. 2. At block 1102, the method may be initiated by a transportation vehicle arriving at a location. The transportation vehicle may be empty or filled with fuel. The transportation vehicle may be stationed near the CO2 storage tanks and fuel tanks.

At block 1004, an operator may confirm the contents of the dual-fluid vessel. The dual vessel may have two or more inner compartments positioned within the outer shell of the dual-fluid vessel. The first inner compartment may contain CO2. The second inner compartment may contain fuel. At block 1106, if the dual-fluid vessel is filled with fuel, the operator may proceed to at block 1108 to connect one or more external hoses to the fuel storage tanks, the fuel pump on the transportation vehicle, and the second inner compartment. In other embodiments, an external fuel pump may be stationed near the fuel storage tanks at the location. At block 1106, if the second inner compartment is not filled with fuel, at block 1116, an operator may connect one or more external hoses to the CO2 storage tanks and to the inlet of the CO2 pump on the transportation vehicle. In other embodiments, an external fuel pump may be stationed near the CO2 storage tanks at the location. The external fuel pump may be connected to the fuel storage tanks and the second inner compartment to offload the fuel.

At block 1110, an operator may activate the one or more controllers on the transportation vehicle. In some embodiments, the one or more controllers may control the fuel pump and the CO2 pump. In other embodiments, the one or more controllers may be configured to send alerts when the pressure or temperature of the fuel or CO2 reaches a selected threshold. Above the threshold, the one or more controllers may activate a fail-safe switch to turn off the pump or to stop the flow to or from the first inner compartment or the second inner compartment.

With the external hoses attached to the second inner compartment of the dual-fluid vessel, the fuel pump may be activated to offload fuel from the dual-fluid vessel to the fuel storage tanks, at block 1112. The fuel pump may run until the contents of the second inner compartment are empty or until the fuel storage tanks is full. In some embodiments, the second inner compartment may be partially full. In other embodiments, the fuel may be offloaded into the bladder of the second inner compartment, using the pressure from filling the first inner compartment with CO2 to displace the fuel in the bladder into the fuel storage tanks. A control valve may regulate the flow from the bladder into the fuel storage tanks. The bladder may contract, rescind in size, retract, or shrink as the fuel is displaced with CO2. In some embodiments, the first inner compartment may be filled with nitrogen.

At block 1114, the one or more external hoses may be disconnected from the fuel storage tanks and the second inner compartment. The one or more external hoses may be exclusively used for offloading or loading fuel.

In other embodiments, after the operator at block 1108 connect one or more external hoses to the fuel storage tanks, the fuel pump on the transportation vehicle, and the second inner compartment where the second inner compartment is a bladder, an operator may connect nitrogen storage vessels to the first inner compartment. As the first inner compartment fills with nitrogen, the pressure may offload the fuel into the fuel storage tank. After the second inner compartment is emptied, the nitrogen in the first inner compartment may be recycled back to nitrogen storage vessels. In other embodiments, the nitrogen may be released to the atmosphere. In some embodiments, the second inner compartment may be filled with other fluids.

At block 1116, one or more external hoses may be connected to the CO2 storage tanks, the first inner compartment, and the CO2 pump. In other embodiments, an external CO2 pump may be stationed near the CO2 storage tanks at the location. The external CO2 pump may be connected to the CO2 storage tanks and the first inner compartment. When the transportation vehicle arrives at a location without having to offload fuel, the one or more controllers may be activated to control the operability of the CO2 pump and monitor the pressure, temperature, and flow of the CO2 .

At block 1118, an operator may confirm the pressure of the CO2 storage tank. With the external hoses attached to the first inner compartment of the dual-fluid vessel, the CO2 pump may be turned on to load CO2 from the CO2 storage tanks to the first inner compartment, at block 1120. An operator may monitor the pressure, flow, and temperature of the CO2, the CO2 storage tanks, and the second inner compartment, at block 1122. If the pressure is above a set threshold at block 1124, the CO2 pump may run until the contents of the CO2 storage tanks are empty or until the first inner compartment is full at block 1128. In some embodiments, the first inner compartment may be partially full or filled. If the pressure is not above the set threshold at block 1124, (e.g., such as the critical point) the first inner compartment may be pressurized to above the threshold, at block 1136. The first inner compartment may also be pressurized by an external compressor at the location. In some embodiments, the first inner compartment may be cooled by a refrigeration unit until the temperature is below the set threshold at block 1136. In other embodiments, the refrigeration unit may be used during transportation to hold the low pressure liquid CO2 at or below the threshold value. At block 1130, the one or more controllers may be deactivated. The one or more external hoses may be disconnected from the CO2 storage tanks, the CO2 pump, and the first inner compartment at block 1132. The transportation vehicle may leave the location at block 1134.

In some embodiments, the one or more external hoses may be connected to the fuel pump, the fuel storage tanks, the second inner compartment, the CO2 pump, the CO2 storage tanks, and the first inner compartment. The one or more controllers may activate the fuel pump and the CO2 pump such that offloading of the fuel and loading of CO2 occurs simultaneously or substantially simultaneously. In other embodiments, the fuel pump and the CO2 pump may activate at staggered times, or different times.

Figure 12:
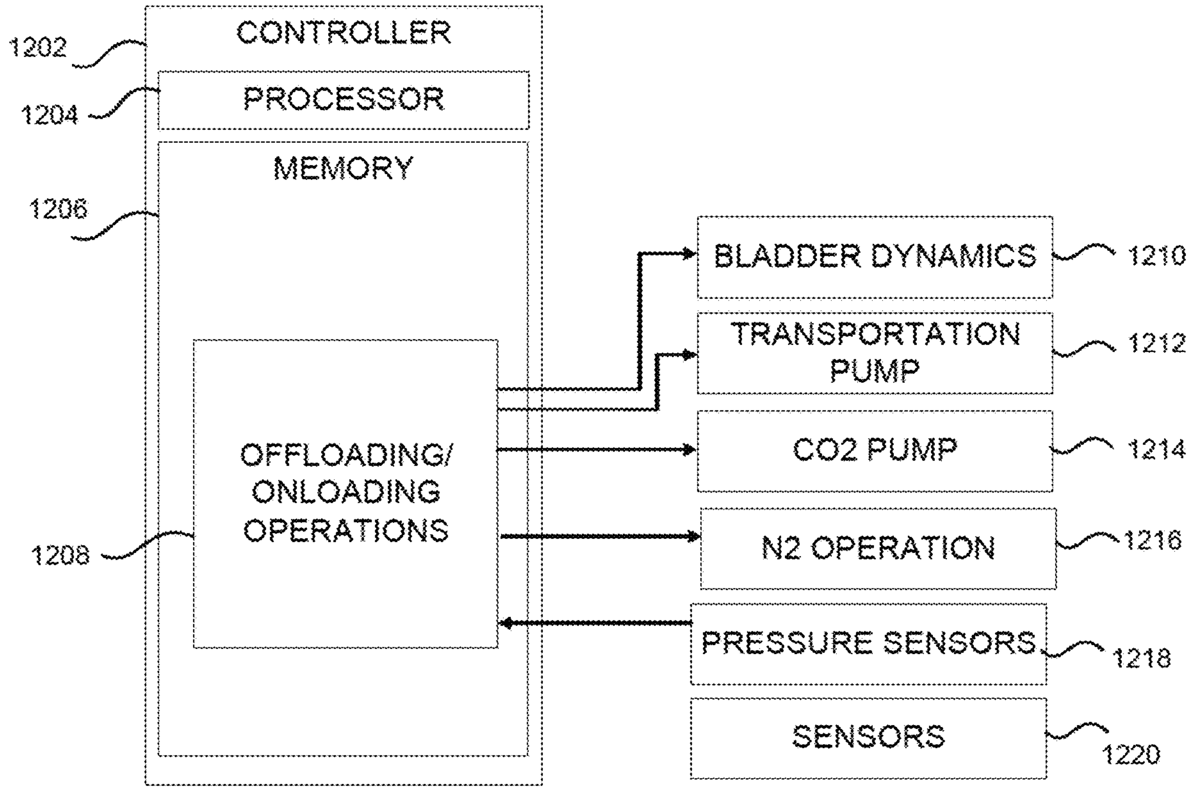
FIG. 12 is a simplified diagram implemented in a controller, for controlling offloading and onloading operations, according to an embodiment of the disclosure.

In some embodiments, the one or more controllers may include controller 1202, as illustrated in FIG. 12. The controller may include a processor 1204, a memory 1206, and offloading or onloading operations instructions 1208. The controller 1202 may include memory 1206 and one or more processors 1204. The memory 1206 may store instructions executable by one or more processors 1204. In an example, the memory 1206 may be a non-transitory machine-readable storage medium. As used herein, a "machine-readable storage medium" may be any electronic, magnetic, optical, or other physical storage apparatus or cyber-physical separation storage to contain or store information such as executable instructions, data, and the like. For example, any machine-readable storage medium described herein may be any of random access memory (RAM), volatile memory, non-volatile memory, flash memory, a storage drive (e.g., hard drive), a solid-state drive, any type of storage disc, and the like, or a combination thereof. As noted, the memory 1206 may store or include instructions executable by the processor 1204. As used herein, a "processor" may include, for example, one processor or multiple processors included in a single device or distributed across multiple computing devices. The processor 1204 may be at least one of a central processing unit (CPU), a semiconductor-based microprocessor, a graphics processing unit (GPU), a field-programmable gate array (FPGA) to retrieve and execute instructions, a real-time processor (RTP), other electronic circuitry suitable for the retrieval and execution instructions stored on a machine-readable storage medium, or a combination thereof.

As used herein, "signal communication" refers to electric communication such as hard wiring two components together or wireless communication, as understood by those skilled in the art. For example, wireless communication may be Wi-Fi®, Bluetooth®, ZigBee, or forms of near field communications. In addition, signal communication may include one or more intermediate controllers or relays disposed between elements in signal communication.

As noted, the memory 1206 may include instructions for offloading/onloading operations 1208. The pressure sensors 1218 and sensor 1220 may send a signal to the controller 1202 indicating pressure or another characteristic (e.g., temperature, etc.) within a bladder or other compartment. The controller 1202 may perform, execute, or adjust execution of the offloading/onloading operations 1208 based on such indications. The offloading/onloading operations 1208 may include instructions may utilize characteristics or signals provided relating to bladder dynamics 1210 (e.g., wear, numbers of use, etc.), transportation pump 1212 (e.g., flow rate of fuel), CO2 Pump 1214 (e.g., flow rate of CO2), and N2 Operation 1216 (e.g., amount of nitrogen to purge and/or fill the bladder or other compartment). Offloading operations may include controlling the flow from the first inner compartment and second inner compartment and shutting off pumps when pressure is outside of safe operating conditions. Onloading operations may include controlling flow from storage tanks at a location and shutting off pumps when pressure is outside of safe operating conditions. The offloading/onloading operations 1208 may utilize the bladder dynamics to control the operation of a spring system and hydraulic system of a bladder and may further include reducing the hydraulic system pressure when fuel is loaded into the bladder to expand the surface area of the bladder. When the fuel is offloaded, the hydraulic system may increase in pressure to reduce the capacity of the bladder. In some embodiments, the controller 1202 may control the operation of the transportation pump 1212 and CO2 pump 1214. In other embodiments, the controller 1202 may control N2 operation 1216 from nearby nitrogen storage vessels or on-board nitrogen tanks. The controller 1202 may determine, based on signals from the pressure sensors 1218, when N2 may be added to the first inner compartment.

In a further embodiment, the controller 1202 may include instructions to maintain a specified temperature range and/or pressure range within one or more of the first inner compartment and/or second inner compartment during transit. Such instructions may utilize the same or similar components utilized for offloading/onloading operations. Upon execution of the instructions, during transit, the controller 1202 may determine a current temperature of a first inner compartment and/or second inner compartment (e.g., via sensors 1220 for example and/or other temperature sensors positioned throughout a dual-fluid vessel), a current pressure of the first inner compartment and/or second inner compartment (e.g., via pressure sensors 1218), a fluid level of a first inner compartment (e.g., via sensors 1220 for example and/or other temperature sensors positioned throughout a dual-fluid vessel), and/or a fluid level of the second inner compartment (e.g., via sensors 1220 for example and/or other temperature sensors positioned throughout a dual-fluid vessel). The controller 1202 may include or store (e.g., for example, in memory 1206) various pressure ranges for different fluids. After an offloading/onloading operation, the controller 1202 may receive an indication on the type of fluid currently contained in the dual-fluid vessel and in which compartment. The controller 1202 may determine the pressure and/or temperature ranges based on the type of fluid (e.g., liquid CO2 and/or liquid fuel) and how much of that type of fluid is in one of the compartments. The controller 1202 may monitor the current temperature and/or pressure continuously or substantially continuously. If the current temperature and/or pressure is less than the temperature and/or pressure range, the controller 1202 may cause a pump or compressor attached to or proximate to the dual-fluid vessel to activate and operate until pressure is within the range. If the current temperature and/or pressure is greater than the temperature and/or pressure range, the controller 1202 may cause a relief valve to actuate to decrease pressure within the dual-fluid vessel. The controller 1202 may also control a refrigeration unit to maintain the temperature range.

Although specific terms are employed herein, the terms are used in a descriptive sense only and not for purposes of limitation. Embodiments of systems and methods have been described in considerable detail with specific reference to the illustrated embodiments. However, it will be apparent that various modifications and changes can be made within the spirit and scope of the embodiments of systems and methods as described in the foregoing specification, and such modifications and changes are to be considered equivalents and part of this disclosure.

What is claimed is:

1. A vessel to transport a fuel and carbon dioxide (CO2), the vessel comprising:
- an outer shell;
- an inner compartment positioned within the outer shell to store the CO2 or the fuel;
- a flexible bladder positioned within the inner compartment to store the other of the CO2 or the fuel therein;
- insulation positioned between the outer shell and the inner compartment; and
- a pressure regulation device positioned to regulate pressure within at least a portion of the inner compartment.

2. The vessel of claim 1, wherein the flexible bladder comprises one or more of (1) an expandable bladder configured to expand when the fuel or the CO2 is positioned therein or (2) a contractible bladder configured to contract when the fuel or the CO2 is removed therefrom, and wherein the fuel comprises one or more of ultra-low sulfur diesel (ULSD), diesel, gasoline, renewable diesel, hydrogen, ammonia, ethanol, or liquefied natural gas (LNG).

3. The vessel of claim 1, further comprising a nozzle connector positioned to assist with removal of the CO2 from the inner compartment when positioned therein.

4. The vessel of claim 1, wherein one or more of the inner compartment or the bladder is refrigerated, and wherein the pressure regulation device maintains pressure at a specified pressure range based on current temperature of the CO2 stored within the inner compartment.

5. The vessel or claim 1, further comprising one or more ports to allow fluid communications therethrough, the one or more ports having an opening in and through the outer shell and a fluid pathway to one or more of (a) the inner compartment or (b) the bladder, so that fluid flows through the opening for one or more of the fuel or the CO2 during operation.

6. The vessel of claim 1, wherein the bladder is configured to expand when the fuel or the CO2 is positioned therein and configured to contract when the fuel or the CO2 is removed therefrom.

7. The vessel of claim 1, further comprising a hydraulic system disposed to apply pressure to the bladder.

8. The vessel of claim 1, wherein the inner compartment is substantially surrounded by the insulation.

9. The vessel of claim 8, wherein the CO2 comprises liquid CO2, wherein the inner compartment maintains a temperature below a critical point of the liquid CO2 when stored therein, and wherein the liquid CO2 comprises low pressure liquid or high-pressure liquid CO2.

10. The vessel of claim 1, further comprising a spring disposed to apply force to the bladder.

11. The vessel of claim 10, wherein a first end of the spring is connected to the the inner compartment and a second end of the spring is adjacent the bladder.

12. The vessel of claim 1, further comprising a second bladder positioned within the inner compartment to store the CO2 or the fuel therein.

13. The vessel of claim 12, wherein the second bladder is filled independently of the bladder.

14. The vessel of claim 12, further comprising a fixed portion disposed within the inner compartment, wherein the bladder and the second bladder are secured to the fixed portion.

15. The vessel of claim 14, further comprising an air vent to provide a pressure release in the event that a pressure within the bladder or the second bladder exceeds a pressure rating.

16. The vessel of claim 1, further comprising a baffle positioned within the outer shell to reduce movement of fluid within the vessel.

17. The vessel of claim 16, wherein when the bladder is expanded, the bladder abuts the baffle to limit movement of the bladder during movement of the vessel.

18. The vessel of claim 17, wherein the baffle includes a roller configured to aid the bladder in expanding around the baffle.

19. The vessel of claim 16, wherein the baffle includes an aperture disposed to permit a flow of fluid through the aperture in the baffle.

20. The vessel of claim 16, wherein the baffle is installed along an upper portion of the inner compartment.

* * * * *